United States Patent
Bray et al.

(10) Patent No.: US 9,285,134 B2
(45) Date of Patent: Mar. 15, 2016

(54) CONFIGURABLE WALL MODULE SYSTEM

(75) Inventors: William J. Bray, Minneapolis, MN (US); Ankur Jhawar, Bangalore (IN); Gary P. Kasper, Champlin, MN (US); Jason C. Laberge, Lauderdale, MN (US); Jakub Andrzejewski, Minneapolis, MN (US); Paul C. Wacker, Plymouth, MN (US); Siddharth Ghule, Bangalore (IN); Stalin Gutha, Crystal, MN (US); Bruce S. Johnson, Excelsior, MN (US)

(73) Assignee: Honeywell International Inc., Morris Plains, NJ (US)

( * ) Notice: Subject to any disclaimer, the term of this patent is extended or adjusted under 35 U.S.C. 154(b) by 1170 days.

(21) Appl. No.: 11/957,253

(22) Filed: Dec. 14, 2007

(65) Prior Publication Data

US 2009/0158188 A1 Jun. 18, 2009

(51) Int. Cl.
- G06F 3/048 (2013.01)
- F24F 11/00 (2006.01)
- G05B 19/042 (2006.01)
- G05B 19/10 (2006.01)
- G05D 23/19 (2006.01)

(52) U.S. Cl.
CPC ............ F24F 11/001 (2013.01); G05B 19/042 (2013.01); G05B 19/102 (2013.01); G05D 23/1902 (2013.01); F24F 2011/0091 (2013.01); G05B 2219/25092 (2013.01)

(58) Field of Classification Search
CPC ... G06F 3/0481; G06F 9/4443; G06F 3/0482; G06F 3/04847; G06Q 10/10
USPC ......... 715/771, 864, 810, 717, 740, 817, 818, 715/702, 764; 700/83, 278, 16, 65, 276, 700/299; 165/200
See application file for complete search history.

(56) References Cited

U.S. PATENT DOCUMENTS 4,298,946 A * 11/1981 Hartsell et al. ............... 700/278
4,373,664 A * 2/1983 Barker et al. ............... 236/46 R
4,388,692 A * 6/1983 Jones et al. .................. 700/278

(Continued)

FOREIGN PATENT DOCUMENTS

EP 0793104 A2 9/1997

OTHER PUBLICATIONS

Wikipedia: http://en.wikipedia.org/wiki/HVAC, dated Dec. 12, 2007, last accessed on Apr. 13, 2012 from http://web.archive.org/web/20071212030542/http://en.wikipedia.org/wiki/HVAC#Heating.*

(Continued)

*Primary Examiner* — Jessica Chuang
(74) *Attorney, Agent, or Firm* — Seager, Tufte & Wickhem, LLP

(57) ABSTRACT

A configurable wall module having selectable home screens, custom menu navigation, and incorporating functional design. The display utilizes fixed segments. menu navigation and configuration which may be facilitated with soft keys having indicative labels associated with them. The parameters may be accessed from categories by soft keys via two-level menu navigation. Certain parameter value and setpoint entries may be effected with up/down keys. Module configuration may be performed by a user. To provide such user capability, the module may be programmed and configured by an installer with a software configuration tool used in connection with the building automation system associated with the module.

24 Claims, 99 Drawing Sheets

(56) References Cited

U.S. PATENT DOCUMENTS

| | | | | |
|---|---|---|---|---|
| 4,428,528 | A * | 1/1984 | Renault | 236/46 R |
| 4,442,972 | A * | 4/1984 | Sahay et al. | 236/1 EA |
| 4,479,604 | A * | 10/1984 | Didner | 236/49.3 |
| 4,639,881 | A * | 1/1987 | Zingher | 715/839 |
| 4,811,240 | A * | 3/1989 | Ballou et al. | 715/763 |
| 4,839,636 | A * | 6/1989 | Zeiss | 345/30 |
| 4,994,653 | A * | 2/1991 | Kadwell et al. | 219/508 |
| 5,086,385 | A * | 2/1992 | Launey et al. | 700/83 |
| 5,218,399 | A * | 6/1993 | Izumi et al. | 396/292 |
| 5,459,374 | A * | 10/1995 | Thoeny et al. | 315/169.1 |
| 5,505,377 | A * | 4/1996 | Weiss | 236/47 |
| 5,609,770 | A * | 3/1997 | Zimmerman et al. | 210/739 |
| 5,661,658 | A * | 8/1997 | Putt et al. | 702/68 |
| 5,689,669 | A * | 11/1997 | Lynch et al. | 715/848 |
| 5,796,945 | A * | 8/1998 | Tarabella | 709/219 |
| 5,884,248 | A * | 3/1999 | Hall | 704/8 |
| 6,339,429 | B1 * | 1/2002 | Schug | 345/589 |
| 6,366,832 | B2 * | 4/2002 | Lomonaco et al. | 700/276 |
| 6,437,692 | B1 * | 8/2002 | Petite et al. | 340/540 |
| 6,487,457 | B1 * | 11/2002 | Hull et al. | 700/17 |
| 6,546,400 | B1 * | 4/2003 | Aberson | |
| 6,559,882 | B1 * | 5/2003 | Kerchner | 348/61 |
| 6,619,555 | B2 * | 9/2003 | Rosen | 236/46 R |
| 6,741,915 | B2 * | 5/2004 | Poth | 700/276 |
| 6,772,018 | B2 * | 8/2004 | Juntunen | G05B 19/042 318/560 |
| 6,862,499 | B1 * | 3/2005 | Cretella et al. | 700/299 |
| 6,988,671 | B2 * | 1/2006 | DeLuca | 236/49.3 |
| 7,025,281 | B2 | 4/2006 | DeLuca | |
| 7,028,912 | B1 * | 4/2006 | Rosen | 236/1 C |
| 7,047,092 | B2 * | 5/2006 | Wimsatt | 700/83 |
| 7,055,759 | B2 * | 6/2006 | Wacker et al. | 236/51 |
| 7,083,109 | B2 * | 8/2006 | Pouchak | 236/1 E |
| 7,130,719 | B2 * | 10/2006 | Ehlers et al. | 700/276 |
| 7,150,408 | B2 * | 12/2006 | DeLuca | 236/94 |
| 7,181,317 | B2 * | 2/2007 | Amundson et al. | 700/276 |
| 7,187,986 | B2 * | 3/2007 | Johnson et al. | 700/17 |
| 7,222,800 | B2 * | 5/2007 | Wruck | 236/51 |
| 7,225,054 | B2 * | 5/2007 | Amundson et al. | 700/276 |
| 7,232,075 | B1 * | 6/2007 | Rosen | 236/51 |
| 7,274,972 | B2 * | 9/2007 | Amundson et al. | 700/276 |
| 7,279,659 | B2 * | 10/2007 | Gagas et al. | 219/400 |
| 7,296,426 | B2 * | 11/2007 | Butler et al. | 62/181 |
| 7,434,742 | B2 * | 10/2008 | Mueller et al. | 236/46 C |
| 7,455,240 | B2 * | 11/2008 | Chapman et al. | 236/91 D |
| 7,575,179 | B2 * | 8/2009 | Morrow et al. | 236/91 D |
| 7,584,897 | B2 * | 9/2009 | Schultz et al. | 236/1 C |
| 7,600,694 | B2 * | 10/2009 | Helt et al. | 236/1 B |
| 7,644,869 | B2 * | 1/2010 | Hoglund | F24F 11/006 236/46 C |
| 7,734,476 | B2 * | 6/2010 | Wildman et al. | 705/2 |
| 7,740,184 | B2 * | 6/2010 | Schnell et al. | 236/44 C |
| 7,775,454 | B2 * | 8/2010 | Mueller | F24F 11/0012 236/1 C |
| 7,793,510 | B2 * | 9/2010 | Perry | F24F 11/0012 236/44 C |
| 7,845,576 | B2 * | 12/2010 | Siddaramanna et al. | 236/94 |
| 7,913,180 | B2 * | 3/2011 | Hoglund | F24F 11/0012 236/1 B |
| 7,918,406 | B2 * | 4/2011 | Rosen | F24F 11/0012 165/237 |
| 8,032,254 | B2 * | 10/2011 | Amundson | F24F 11/0086 165/238 |
| 8,196,185 | B2 * | 6/2012 | Geadelmann et al. | 726/4 |
| 8,544,285 | B2 * | 10/2013 | Stefanski | F24F 11/0086 236/91 D |
| 8,554,374 | B2 * | 10/2013 | Lunacek | G05D 23/1902 236/94 |
| 8,855,825 | B2 * | 10/2014 | Grohman | F24F 11/0009 700/276 |
| 8,902,071 | B2 * | 12/2014 | Barton | F24F 12/001 219/667 |
| 9,002,523 | B2 * | 4/2015 | Erickson | F24F 11/0086 236/1 C |
| 9,081,393 | B2 * | 7/2015 | Lunacek | G05D 23/1902 |
| 9,092,039 | B2 * | 7/2015 | Fadell | F24F 11/0086 |
| 2002/0075307 | A1 * | 6/2002 | Alexander et al. | 345/760 |
| 2002/0082727 | A1 * | 6/2002 | Laflamme et al. | 700/65 |
| 2002/0152298 | A1 * | 10/2002 | Kikta et al. | 709/223 |
| 2003/0150926 | A1 * | 8/2003 | Rosen | 236/51 |
| 2003/0150927 | A1 * | 8/2003 | Rosen | 236/51 |
| 2004/0074978 | A1 * | 4/2004 | Rosen | 236/1 C |
| 2004/0100481 | A1 * | 5/2004 | Muoio et al. | 345/716 |
| 2004/0133314 | A1 * | 7/2004 | Ehlers et al. | 700/276 |
| 2004/0165010 | A1 * | 8/2004 | Robertson et al. | 345/805 |
| 2004/0260427 | A1 * | 12/2004 | Wimsatt | 700/275 |
| 2005/0040247 | A1 * | 2/2005 | Pouchak | 236/44 C |
| 2005/0040248 | A1 * | 2/2005 | Wacker et al. | 236/51 |
| 2005/0040250 | A1 * | 2/2005 | Wruck | 236/51 |
| 2005/0098639 | A1 * | 5/2005 | DeLuca | 236/46 R |
| 2005/0103875 | A1 * | 5/2005 | Ashworth et al. | 236/94 |
| 2005/0116023 | A1 * | 6/2005 | Amundson et al. | 235/376 |
| 2005/0119771 | A1 * | 6/2005 | Amundson et al. | 700/86 |
| 2005/0119793 | A1 * | 6/2005 | Amundson et al. | 700/276 |
| 2005/0119794 | A1 * | 6/2005 | Amundson et al. | 700/276 |
| 2005/0125083 | A1 * | 6/2005 | Kiko | 700/19 |
| 2005/0161517 | A1 * | 7/2005 | Helt et al. | 236/1 C |
| 2005/0194456 | A1 * | 9/2005 | Tessier et al. | 236/51 |
| 2006/0030954 | A1 * | 2/2006 | Bergman et al. | 700/19 |
| 2006/0058900 | A1 * | 3/2006 | Johanson et al. | 700/83 |
| 2006/0105760 | A1 * | 5/2006 | Shamoon et al. | 455/423 |
| 2006/0185373 | A1 * | 8/2006 | Butler et al. | 62/181 |
| 2006/0186214 | A1 * | 8/2006 | Simon et al. | 236/1 C |
| 2006/0219799 | A1 * | 10/2006 | Schultz et al. | 236/1 C |
| 2006/0234698 | A1 * | 10/2006 | Fok et al. | 455/425 |
| 2006/0283965 | A1 * | 12/2006 | Mueller et al. | 236/51 |
| 2007/0045441 | A1 * | 3/2007 | Ashworth et al. | 236/94 |
| 2007/0058634 | A1 * | 3/2007 | Gupta et al. | 370/392 |
| 2007/0220907 | A1 * | 9/2007 | Ehlers | 62/126 |
| 2007/0246553 | A1 * | 10/2007 | Morrow et al. | 236/46 R |
| 2007/0278320 | A1 * | 12/2007 | Lunacek et al. | 236/94 |
| 2008/0011864 | A1 * | 1/2008 | Tessier et al. | 236/51 |
| 2008/0029611 | A1 * | 2/2008 | Schnell et al. | 236/44 C |
| 2008/0120446 | A1 * | 5/2008 | Butler et al. | 710/63 |
| 2008/0157600 | A1 * | 7/2008 | Marlenee et al. | 307/66 |
| 2008/0158210 | A1 * | 7/2008 | Boos et al. | 345/206 |
| 2008/0244582 | A1 * | 10/2008 | Brown et al. | 718/100 |
| 2008/0277487 | A1 * | 11/2008 | Mueller et al. | 236/46 A |
| 2009/0024010 | A1 * | 1/2009 | Werner et al. | 600/309 |
| 2009/0045263 | A1 * | 2/2009 | Mueller et al. | 236/51 |
| 2009/0057427 | A1 * | 3/2009 | Geadelmann et al. | 236/51 |
| 2009/0099697 | A1 * | 4/2009 | Li et al. | 700/276 |
| 2010/0106307 | A1 * | 4/2010 | Grohman et al. | 700/276 |
| 2012/0221956 | A1 * | 8/2012 | Geadelmann et al. | 715/736 |

OTHER PUBLICATIONS

Alerton Technologies, Inc., "BACtalk Microset II Wall Unit, Product Nos. MS-2000-BT & MS-2000H-BT (with Optional Humidity Sensor)," 2 pages, prior to Dec. 14, 2007.

Carrier Corporation, "3V Control System, System Pilot, Part No. 33PILOT-01, Product Specification," 4 pages, Sep. 2004.

Delta Controls, "HVAC, Network Sensors BACstatII: DNS-24/H24," 2 pages, Oct. 2004.

Honeywell, "Command Display S7760A EPROM Replacement, Installation Instructions," 2 pages, 2002.

Honeywell, "FocusPRO TH6000 Series, Installation Guide," 16 pages, Mar. 2006.

Honeywell, "S7340A System User Interface, Specification Data," 2 pages, Nov. 1999.

Honeywell, "TB220U Commercial VisionPRO Programmable Thermostat, Installation Instructions," 16 pages, Jan. 2008.

Honeywell, "T7525A and T7526A Thermostat Touchpads," 6 pages, Oct. 1994.

Invensys, "Micronet Sensors, DS 10.000, MN Sx Series, Data Sheets," 4 pages, Mar. 2003.

Johnson Controls, Inc., "TMx1600 Room Sensor with LCD Display," 4 pages, 2001.

Reliable Controls, "SMART-Sensor LCD," 2 pages, 2006.

Robertshaw, "Deluxe Programmable Thermostats, Models 9801i, 9815i and 9820i, Quick Start Installation Manual," 2 pages, prior to Dec. 14, 2007.

(56) References Cited

OTHER PUBLICATIONS

Trane, "Digital Display Zone Sensor," 2 pages, 2004.
Honeywell, "Excel Building Supervisor-Integrated R7044 and FS90 Ver. 2.0," Operator Manual, 70 pages, Apr. 1995.
Trane, "System Programming, Tracer Summit Version 14, BMTW-SVP01D-EN," 623 pages, 2002.
International Search Report for Corresponding Application No. EP08861911 dated Feb. 13, 2015.

* cited by examiner

| Area name | # of segments | Segments |
|---|---|---|
| Labels | 10 | SYSTEM:+line, ROOM (left), SETPOINT (left), OUTSIDE, HUMIDITY%, ROOM (middle), SETPOINT (middle), TEMPERATURE, OVERRIDE, REMAINING. |
| Top Alpha-numeric | 80 | 8 characters x 10 segments |
| Middle Alpha-numeric | 28 | 4 characters x 7 segments |
| System Status | 7 | flake, flame, OFF, AUTO, COOL, EM., HEAT |
| Fan Status | 7 | Blade, AUTO, OFF, ON, bar 1, bar 2, bar 3, (bar1 includes the outline of the 3 bars) |
| Occupancy Status | 4 | House+OCCUPIED, inside man, UN+outside man, STANDBY |
| Units and dots | 11 | %, PPM, AM, CFM, PM, L/S, CM , INCH, decimal1, decimal2, colon |
| Menu | 13 | PREV, DONE, FAN, SET HOME SCREEN, EDIT, CANCEL, OVERRIDE, SET VIEW MORE, NEXT, SYSTEM, &, VIEW MORE, PARAMETERS |
| TOTAL | 160 | |

*Figure 2*

CONFIGURABLE WALL MODULE SYSTEM

BACKGROUND

The present invention pertains to sensors and particularly to thermostatic sensors and wall modules. More particularly, the invention pertains to screens and menu navigation in wall modules.

SUMMARY

The invention is a configurable wall module system.

BRIEF DESCRIPTION OF THE DRAWING

FIG. 2 is a table of the various portions of the segments diagram indicating an area name, a number of segments, and segments;

DESCRIPTION

Figure 1:
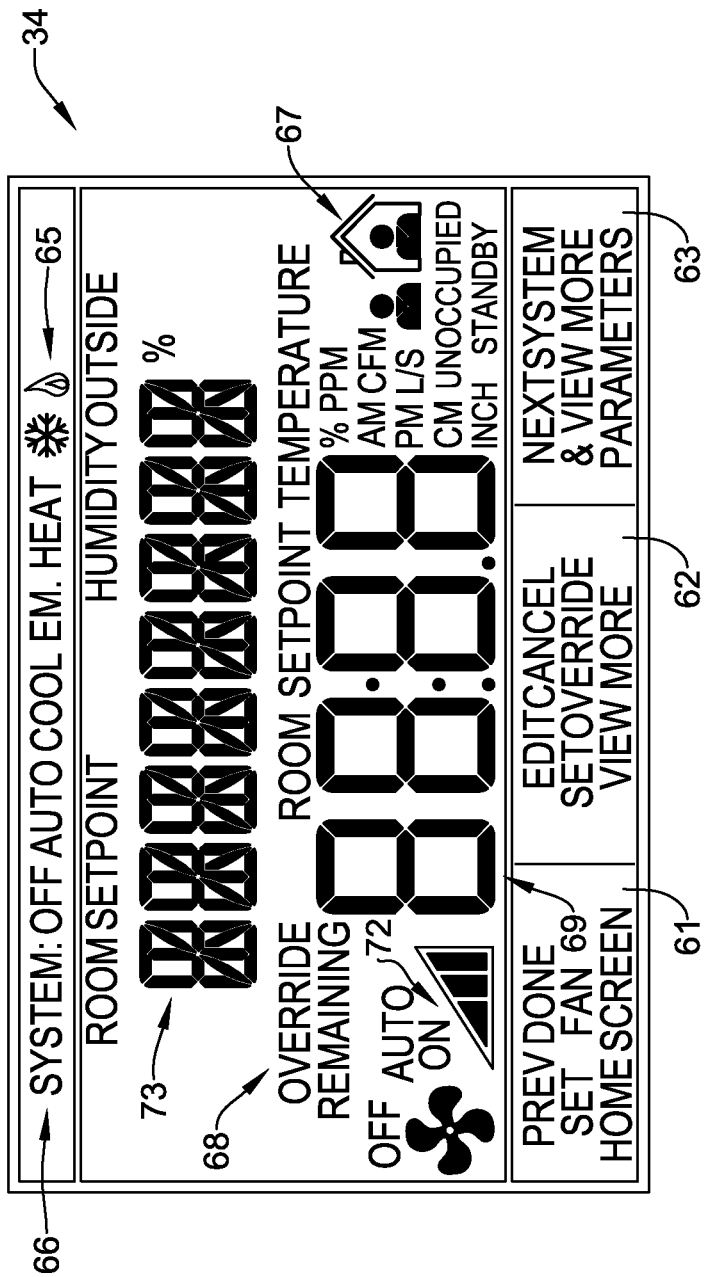
FIG. 1 is a diagram of a display showing possible segments which may relate to information in the present system.

Relative to navigation and home screen concepts, it is significant to emphasize the graphical user interface (GUI) design of the present system having critical-to-quality (CTQ) factors. Some of these factors may include ease of to navigate, generic configuration parameters, generic sensors, ease of reading, segment limits, an adaptable interface, informative feedback, aesthetics, intuitiveness, minimal number of buttons, button orientation and placements, low installation cost, flexible orientation, navigation concepts, loop concepts, a good installer, and so on.

The present invention may relate to a heating, ventilation and air conditioning HVAC system for one or more spaces having wall mounted devices which may be used by occupants to monitor and control temperature and other variables in an indoor environment. Each customer and application may differ from one another. The information that a user will prefer to see in the main display (or home screen) may vary. This invention may let the user or installer/contractor to choose the home screen information presented on a fixed segment display. The display may be an LCD, LED, or another kind of segmented display. The installer and contractor may be regarded as the same.

The user may choose from a number of different home screen options within a single device on a fixed segment display. In the present system, a user may choose to show one, two, or three parameters. Each parameter may be labeled to indicate its purpose (e.g., room temperature, humidity, setpoint, and so forth). Changes may be made to the home screen by accessing a menu from the keypad, or it can be adjusted remotely with a software tool. Changes may be made if new occupants move into a space, or if the equipment changes. If a new occupant or building owner requires a change in the home screen information to be monitored or adjusted, buying a new device might have previously been the only solution. With the present system, multiple home screen options may be configured with a single device.

Wall modules may be the primary interface to a building automation system (BAS) for building owners and tenants. A functionality is the ability to customize the controller (BAS) parameter selection that can be accessed at the wall module. In other words, the wall module may access any number of variables (the number and type is determined with the tool) and the user can view or change these variables at the wall module.

The building automation system may have a heating, ventilation and air conditioning (HVAC) system for a building and a controller connected to the HVAC. One or more present wall modules or thermostats may be connected to the controller. The present wall module, for instance, may be used not only to show local temperature, humidity, and/or $CO_2$ but also to control occupancy, fan, and setpoints for the building automation system. The wall module may contain sensors for temperatures, humidity, $CO_2$, and other sensors for other parameters.

However, many other wall modules provide only limited access to building automation system settings and thus building owners and tenants need supplementary software tools to fully monitor and control space comfort and energy usage. Similarly, contractors would need software tools to access the system for troubleshooting and balancing. This would require additional time and cost because special equipment (such as laptops and network access) is required. A related issue is that many wall modules control the features available (fan control, occupancy override) by providing separate hardware platforms with appropriate buttons, switches, labels, and so forth. The present wall module platform may have provisions for configuring the wall module based on user needs or desires. The contractor may determine the amount of access and configurability permitted to the user, which may include all that available to the contractor.

The present wall module is programmable so that building owners/tenants and contractors can access different features, functions, and parameters from a single wall module platform. A significant factor is that a fixed segment display may be used to keep cost low while also providing the flexibility needed to meet user needs. The wall module's fixed segment user interface may be programmed based on settings determined from a software tool that a contractor uses when setting up the overall building automation system. After the wall module is configured and installed, a user (e.g., building owner, tenant, contractor) may access building automation system parameters and thus do not require a separate software tool to control and monitor critical aspects of the system.

The functional design (display, function segmentation, button layout) may work to improve ease of use and access to building automation system parameters. The present programmable wall module may contain three or another number of soft key buttons located below or on the display with labels that configure, based on how the wall module is programmed in the software configuration tool. The wall module may also contain an up/down button located below proximate to the soft keys to make selections and change building automation system parameter values. Key characteristics of the present system may include a configurable home screen with local wall module selection from amongst a defined set of options (numerous values can be shown with fixed segment labels), custom home screen programming to show any number of building automation system parameters, a user-defined eight character alpha-numeric parameter description with optional fixed segment labels, configurable fan control, configurable occupancy selection, configurable system control, pre-defined wall module configurations for common applications, a two-level menu and navigation for viewing user defined categories and parameters, customizable views/permissions for building owners/tenants, and a security-controlled contractor mode for access to more advanced building automation system parameters.

The present wall module may be programmable so that contractors can access different parameters grouped into user-defined categories. The parameters that are assigned to each category and an associated category and parameter labels may be defined in a software configuration tool. The contractor may access the parameters from the present programmable wall module via a parameter menu. The menu may allow one to first identify the category of parameters one wants to access, and then go the individual parameters. This approach may minimize the probability that contractors will select the wrong parameter, improve understanding of related parameters, and allow contractors to quickly find the building automation system information they want.

The present programmable wall module may have three soft key buttons located proximate to the display with labels that show how the contractor can access the categories and parameters desired. First, the contractor may enter the contractor mode via a key combination press (specific keys or sets of key). Once in the contractor mode, the user may be shown the following soft key labels on the home screen: SET HOME SCREEN, SET VIEW MORE, and PARAMETERS. The user may select PARAMETERS and then be shown the first parameter category (as defined by the software configuration tool). Then the following soft key labels may be shown: DONE, EDIT and NEXT.

If the user presses DONE, then the user is taken back to the home screen. If the user presses EDIT, then the user is shown the parameters within the current category (again as defined by the software configuration tool). If the user presses NEXT, then the user is shown the next category (if configured) and any changes to the previous screen are committed.

Once EDIT is pressed, then the user is shown the first parameter in the category along with the following soft key labels: DONE, CANCEL and NEXT.

If the parameter is editable (as opposed to view only), then that current value flashes. The user may change the value by pressing the up/down buttons. If the user presses DONE, any changes that user made are committed and the user is taken back to the previous screen (category screens). If the user presses CANCEL, changes are not committed and the user is taken to the previous screen. If the user presses NEXT, then the user is shown the next parameter in the category (if configured) and any changes to the previous screen may be committed.

The present simple two-level menu navigation may allow users to group common parameters under a user-defined category name (generally limited to 8 characters). The present system with categorization may provide quick access to parameters and allow users to better understand how parameters relate (such as for balancing). This approach may be scaled to any number of levels using sub-categories and the NEXT, EDIT, DONE soft key labels. The lowest level of any node in the hierarchy would be the parameters that the contractor can edit or view at the wall module.

Related to the present system which can be pre-configured wall module configurations may be provided in the software configuration tool that provides pre-defined categories and parameters for common building automation system applications (such as a variable air volume control—VAV). The user may customize the defined categories and parameters, but by default the user is given some common ones.

The screens shown herein may be designed to give the reader a feeling for what the screen would look like. The exact font, size and placement of the symbols presented are illustrative instances. Screens presented are not necessarily to scale.

Figure 3:
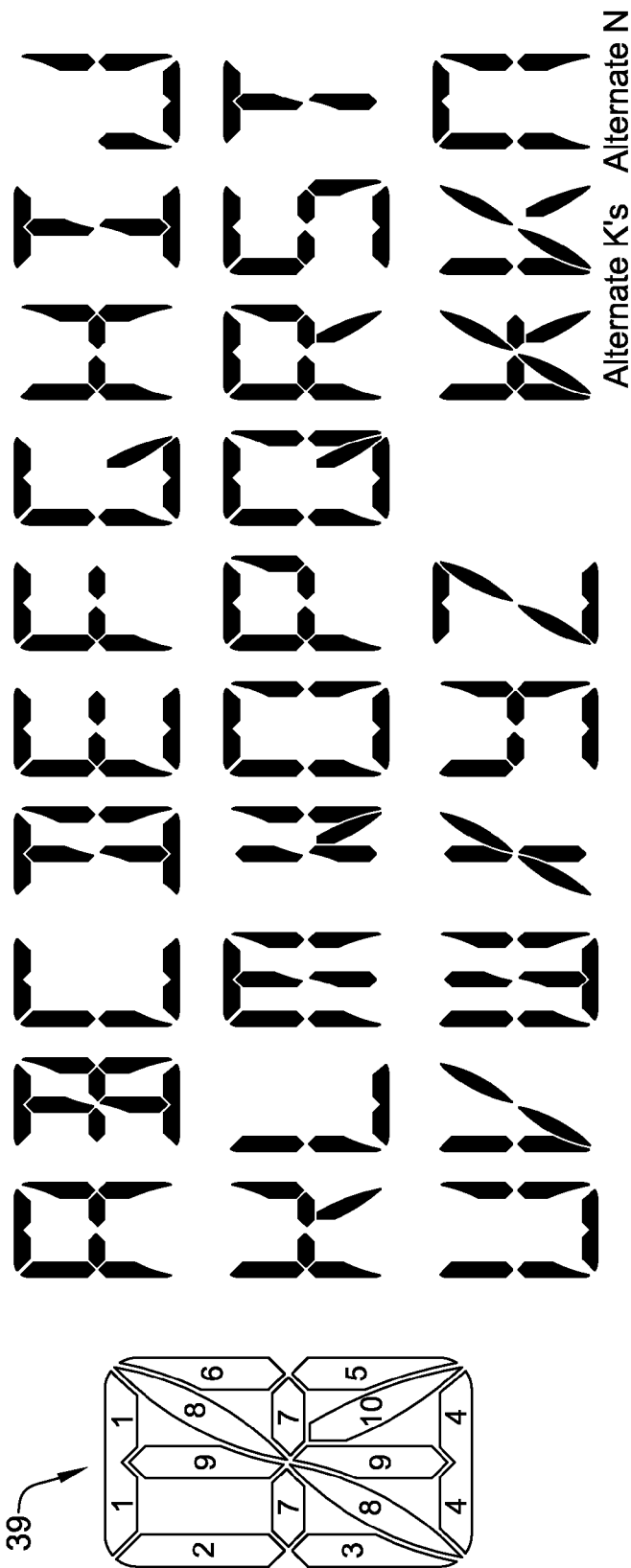
FIG. 3 is a diagram of a ten segment font.

The "All Segments" diagram of FIG. 1 may represent that of an illustrative example of a display 34 in terms of segments. The segment approach is less complex and less expensive than other approaches such as the dot matrix. FIG. 2 is a table 38 of the various portions of the segments diagram indicating the area name, number of segments and the segments. Fonts may be designed with nearly any number of segments. A smaller number may result in a lower cost display. FIG. 3 is a diagram 39 of an example ten segment font and letters it may form. Fonts may be of a varying number of segments depending on the needs of a display. Some displays may suffice with a smaller number of segments. For instance, a seven segment font may display A, b, C, c, d, E, F, G, H, I, i, J, L, n, O, o, P, r, S, t, U, u, Y, Z, 0,1,2,3,4,5,6,7,8, and 9. K, M, Q, V, W, and X may be difficult to display in the seven segment font. After Z in FIG. 3, alternates are shown for K and N.

Figure 3A:
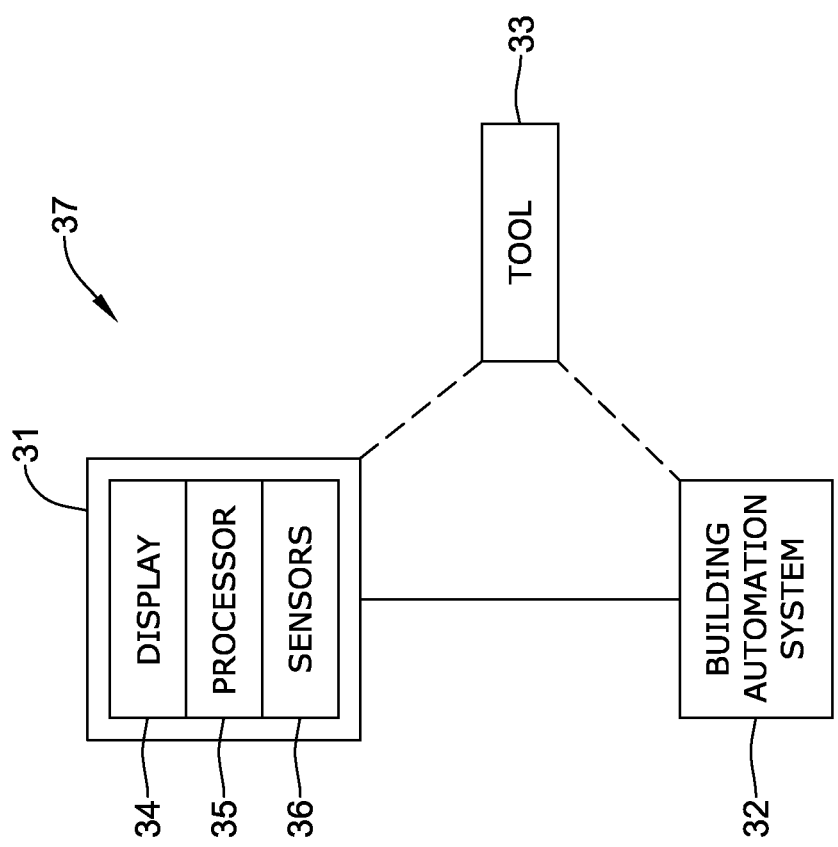
FIG. 3a is a diagram of a wall module in conjunction with a building automation system, and its connection to a tool when used.

FIG. 3a is a diagram of a wall module 31 in conjunction with a building automation system (BAS) 32, and its connection to a software configuration tool 33 when used for setup and so forth. Wall module 31, which could be referred to a structure space module and/or the like, may have a display 34, a processor 35 and sensors 36. Module 31 may have other items. Programming and configuring the wall, structure space or thermostat module may be effected with the software configuration tool having access to the building automation system. Aspects of layout 37 and its components are discussed herein.

The invention may be regarded as a control system having one or more sensors for indicating one or more values of one or more parameters sensed by the one or more sensors, a display for showing a home screen, and a processor connected to the one or more sensors and the display. It may also have one or more soft keys, and one or more labels associated with the one or more soft keys for indicating what appears on the screen if the one or more soft keys are pressed. There may also be up and down keys. The one or more parameters may be selectable by the one or more soft keys and adjustable by the up and down keys. There may be one or more fixed segment characters in the screen for displaying a value of the one or more parameters and other items.

The following SOFT KEY position guidelines should be followed in order to make the user interface work as described herein. They may include: 1) Fan state, Occupancy Override, and System & View More should be on separate keys; 2) Done, Cancel, and Next should be on separate keys; 3) Edit, Done, and Next should be on separate keys; 4) SET Home screen, SET View More, and Parameters should be on separate keys; 5) Occupancy Override and Cancel should be on the same key; and 6) Done, Cancel, and View More should be on separate keys.

There may be a number of configuration items. First, a software configuration Tool should configure the local wall module for each piece of information coming into and going out of the wall module. This may be done by the Tool when the contractor wires the wall module function block to other function blocks on a wire sheet. Second, the contractor, via the Tool, may select the engineering unit (DegF/DegC) of the temperature sensor. The wall module needs to know how to convert A/D counts into a value to display on the LCD and send to the controller. Third, there should be an engineering unit of each piece of incoming data. The contractor, via the Tool, may select the engineering unit(s) to be shown with the middle value (L/S, CFM, INCHES, CM, %, PPM, KW, H, none). This item could be made generic as to what segments (temperature, setpoint, outside, and so forth) should be shown with this piece of data. The wall module has no real knowledge of the units of a piece of data. The unit segments may be just segment(s) that are illuminated or shown.

A fourth configuration item may be a home screen choice. The contractor may select home screen choice 1 through x. This may be done at the Tool and can be changed by the contractor at the wall module. The contractor, via the Tool, may select if any of the following are also shown on the Home screen. First, there may be system status. When the contractor, via the Tool, selects this option, an input point is added to the wall module function block. The contractor wires this to controller logic may compute the current system status (off, cool, heat, reheat). The contractor may assign the value (number) via the Tool associated with each symbol. For example, Off=No segments=0, Flake=Cool=2, Flame=Heat=9, Flake+Flame=Reheat=7.

Second, there may be a system mode setpoint. When the contractor, via the Tool, selects this option, an output point may be added to the wall module function block. The contractor may wire this to controller logic that computes the system status. If selected, the system mode may be shown on the Home screen. One of the segments, OFF, AUTO, COOL, HEAT, or EMERGENCY+HEAT, may be shown. The contractor can select the value of this setpoint. This is done at the Tool and can be changed by the tenant at the wall module. If selected, the soft key segment "System" is shown. This allows the tenant to change the system mode setpoint.

When the tenant presses the System & View More key, the system mode screen may be displayed. All of the configured segments in the system mode may be displayed (OFF, AUTO, COOL, EMERGENCY, HEAT). The current system mode setpoint segment may blink. Pressing the up/down key may rotate which segment blinks. Pressing "Done" saves the selection. Pressing Cancel may discard the selection. Pressing View More may save the selection and go onto the first View More screen. The contractor, via the Tool, may assign the value (number) associated with each symbol. For example, OFF=0, AUTO=1, COOL=2, HEAT=3, EMERGENCYHEAT=4. The contractor, via the Tool, may select which symbols should be shown. That is, for example, some systems may not have EMERGENCYHEAT, thus one does not need that symbol as a choice. The wall module could do this like the fan configuration and give choices like: 1) Heat only (OFF and HEAT); 2) Cool only (OFF and COOL); 3) Heat and Cool (OFF, AUTO, HEAT, COOL); and 4) Heat pump (OFF, AUTO, HEAT, COOL, EMERGENCYHEAT). There may be other choices.

Third, there may be a fan setpoint. When the contractor, via the Tool, selects this option, an output point may be added to the wall module function block. The contractor may wire this to controller logic that computes the fan status. The contractor may configure a 2, 3 or 5 position fan. The contractor may assign the value (number) via the Tool associated with each symbol. For example OFF=0, ON=1, Speed 1=1, Speed 2=3, Speed 3=3, and AUTO=4. The contractor may select the value of the fan setpoint. This may be done at the Tool and can be changed by the tenant at the wall module.

Fourth, there may be Effective Occupancy status. When the contractor, via the Tool, selects this option, an input point may be added to the wall module function block. The contractor may wire this to controller logic that computes the effective occupancy status (occupied, unoccupied, standby). The contractor, via the Tool, may configure if the home screen reports effective occupancy, or if the home screen shows commanded override if override is in effect. If no override is in effect, then effective occupancy may be shown. The contractor may assign the value (number) via the Tool associated with each symbol. For example, Occupied=0, Unoccupied=1, Standby=3.

Fifth there may be Occupancy Override. When the contractor, via the Tool, selects this option, an output point may be added to the wall module function block. The contractor may wire this to controller logic that computes the effective override. The values are Null=wall module is not commanding override, BYP=wall module is commanding timed occupied override, OCC=wall module is commanding occupied, UNOCC=wall module is commanding unoccupied, and STDBY=wall module is commanding standby. The contractor may assign the value (number) via the Tool associated with each symbol. For example, Null=255 (−1), Occupied=0, Unoccupied=1, Bypass=2, and Standby=3. It may be necessary for the Tool to assign a value to the override, for example, Null. On the other hand, the wall module may be able to always initialize the value on power up to Null.

If a home screen is chosen with time displayed, then the contractor, via the Tool, may configure the 12/24 hour format. The Tool may add an input and output point to the wall module function block to display time and set time. The Tool may add the appropriate parameter for the user to set time. The contractor could create a series of or various parameter screens that may have time information such as year, month, day, hour, and minute on them.

The fifth configuration item may include a view of more choices. The contractor, via the Tool and contractor mode, can choose which parameters will be displayed as View More items for the Tenant. The contractor, via the Tool, may configure which parameter setpoints should be editable by the tenant in View More. Note that setpoints are editable in a Contractor mode.

The sixth configuration item may include parameter categories. The contractor, via the Tool, may select the number of parameter categories. The contractor, via the Tool, may select the name of each parameter category. This may be up to 8 characters long. The contractor, via the Tool, may select which parameters are in each category.

A seventh configuration item may include a parameter name. The contractor, via the Tool, selects the name of each parameter. This may be up to 8 characters long.

An eighth configuration item may include a parameter value. The contractor, via the Tool, may select the parameter to be displayed. The parameter may come from a function block—in which case, the wall module cannot necessarily change it. Or the value may come from the wall module, in which case there needs to be a value for the wall module to send to the controller. There may be several types of parameter values which include: 1) Inputs which include Occupancy status, System status, outside ambient (OA) temp, current time, and so forth; 2) Sensors (outputs) which include Room temp, humidity, $CO_2$, (and on non LCD/Keypad models, a setpoint knob, and perhaps an override key); 3) Setpoints (outputs) which include fan setpoint, system mode setpoint, humidity setpoint, room setpoint, $CO_2$ setpoint, time (this one is unusual, as it is both an input and output); these setpoints may have values assigned by the user through the Tool; the tenant and/or contractor can change them at the wall module; and the Tool may upload the current setpoint values from the wall module to update its database); 4) Calibration which includes temperature offset, humidity offset, and $CO_2$ offset; 5) Configuration that the wall module changes which include home screen choice and view More choices; and 6) Configuration that the wall module does not change which includes parameter categories, home screen choices, parameter names, high low, increment amount, segments, and so forth.

The contractor, via the Tool, may select what other segments should be shown. The configuration should allow for any or all of the miscellaneous segments to be shown (all but the alpha numeric). The contractor, via the Tool, may select the high and low limits for an editable value. This may include the set point on the home screen. The contractor, via the Tool, may select the increment/decrement value of each editable value. The increment decrement value may also be referred to as "one unit". For example, one unit=1, 10, 100, 0.7, 0.03. This may include the set point on the home screen. The contractor, via the Tool, may select where the decimal point is, XXXX, XXX.y, or XX.yy. This may include the number in the middle alphanumeric area of the Home screen. If the contractor fails to connect a function block output to a wall module input, then the wall module should show dashes as the value.

A ninth configuration item may include temperature, humidity and $CO_2$ sensor offsets. The Tool may create parameters and a special category for these. The contractor, via the Tool and contractor mode, may select the value of each offset. These should be in a separate area (file/table) in the wall module, so that the Tool can calibrate the device without reading or writing the other setpoints or configuration.

A tenth configuration item may include override. The contractor, via the Tool, may select what override options should be in the round robin. These options include occupied override, unoccupied override and standby override. Occupied override may be timed in hours, days or continuous. There may be network bypass time support. If "timed" is chosen, the Tool user may select either standard or delayed override. Standard timed occupied override may start the timer immediately. Delayed occupied override may start the timer when the occupancy status changes from any state to unoccupied. The timer may remain as it was set until this transition. Note that continuous is a special case of "timed" in that the timer never expires. The configured timer value may be a special value that indicates continuous. Unoccupied override can be timed in hours, days or continuous. Standby override can be timed in hours, days or continuous.

The contractor, via the Tool, may select the minimum, maximum and increment value of the timed override duration. For example the contractor may configure the min and max to be 00:30 and 8:00 with an increment of 00:30. The tenant may now create an override of 30 minutes to 8 hours. If the min and max are the same then it may be a fixed override and the tenant cannot change it. The maximum amount of timed override in hours may be 99:99 (4.16 days). For days, the range generally is 0-9999 days. If no override options are selected, this key may be ignored and not shown on the home screen. A cancel screen may be configured by the Tool after any override choices to allow the user to cancel getting into this area.

An eleventh configuration item may include inputs and outputs with respect a Tool that may allow the contractor to drop a wall module onto the wire sheet. The contractor, via the Tool, may select an OS (Order Specification) number of the wall module (and the sub-model or application).

The Tool may allow the contractor to configure the inputs and outputs of the wall module. The inputs and outputs may be Public Variable Indices (PVIDs). The options and configuration may determine the inputs and outputs of the wall module function block. The contractor may wire an output of a function block to an input of the wall module. The contractor may wire an output of the wall module to input(s) of other function block(s). Example inputs may be parameters the contractor wants to display on the wall module such as: system status, effective occupancy status, time of day, outside air temperature, number of stages on, effective setpoint, duct static pressure, and so on. Example outputs may be room temperature, room setpoint, room humidity, room humidity setpoint, room $CO_2$, room $CO_2$ setpoint, occupancy override command, fan setpoint, system mode setpoint, and so forth. Setpoints may have values that the present system sends to the controller.

A twelfth configuration item may include a balancing category with parameters. The Tool may configure the balancing screens. This may include what each screen says, what value is shown and the order of screens.

A thirteen configuration item may include sensors. The Tool may provide output points for the sensors on the present model.

It is envisioned the present Tool would automatically configure the following items. If it is a VAV application, the Tool should create a balance category. It would be the first category in the list. The parameters under this category may allow the contractor to balance the VAV box. Depending on the VAV application programmed by the user, the balancing parameters might vary. The Tool should set these parameters to be hidden and not editable on the View More screens. The Tool should create a sensors category and populate it with parameters to read the sensors on the wall module. The sensors may include those for temperature, humidity and/or CO2. There may be sensors for other parameters. These should be visible in the View More screens. The Tool should create an offsets category. This may allow the contractor to "calibrate" each sensor to a known good instrument. An offset may be needed for each sensor present in the wall module. The Tool should set these parameters to be hidden and non-editable on the View More screens. The Tool may limit the home screen to just one of the Setpoint segments being shown. The wall module may allow configuration of both the upper left and middle setpoint segments to be used. Having both segments shown may be confusing to the user since the up/down keys will only change the middle one if both are shown. The Tool should have a number of preconfigured home screen options for the contractor. The contractor should be able to modify what choices are downloaded to the controller. That is, the contractor may only want one or two choices for the wall module contractor to choose.

Figure 4:
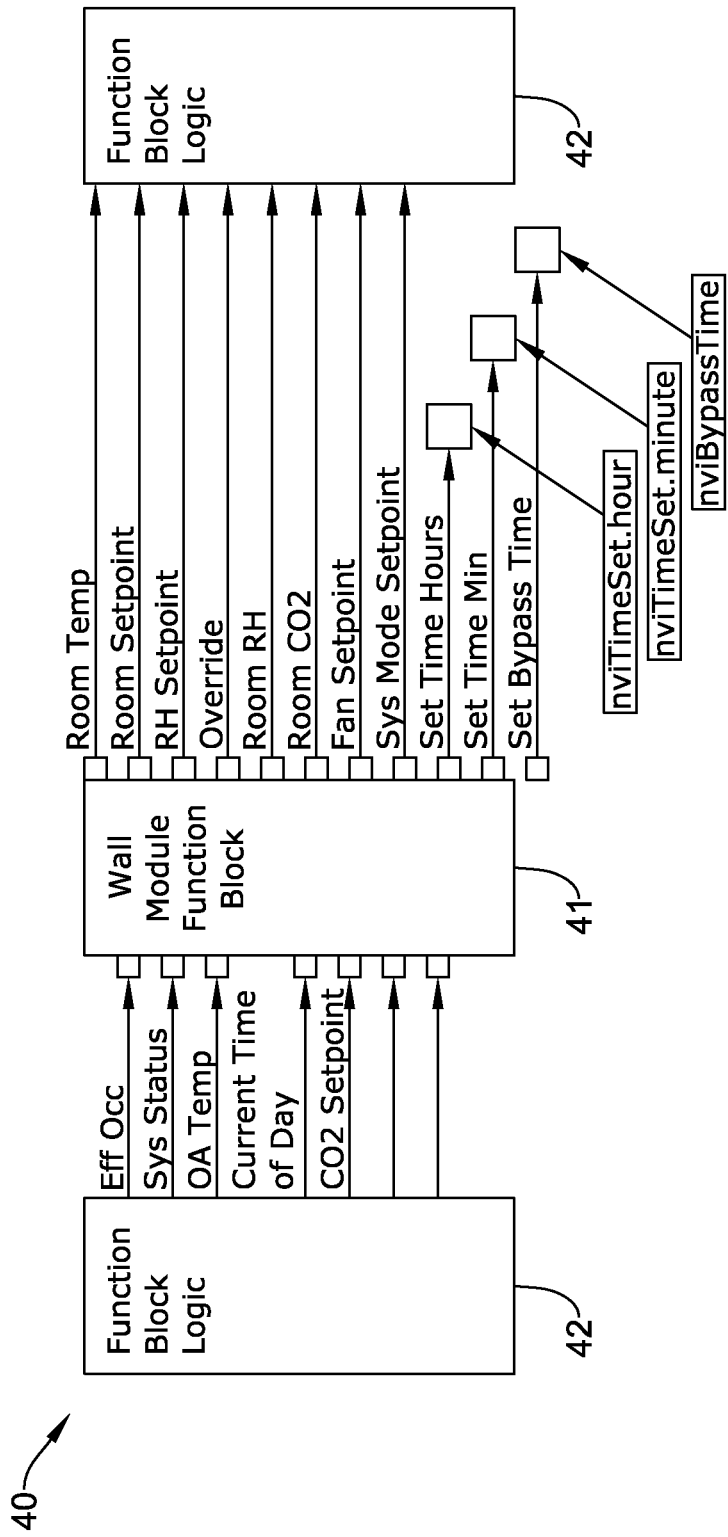
FIG. 4 is a diagram of tool wire sheet.

FIG. 4 shows what a contractor might see on a Tool wire sheet 40. A wall module function block 41 may provide information to and from other function blocks. A complete list is not necessarily presented here. The contractor, via the Tool, may configure many parameters to view and set. As an instance, a function block logic 42 may provide wall module 41 inputs such as Eff Occ, Sys Status, OA Temp, Current Time, CO2 Setpoint, and so forth. These items may be for display only on the wall module 41. Wall module 41 may provide outputs to the function block logic 42 such as Room Temp, Room Setpoint, RH Setpoint, Override, Room RH, Room CO2, Fan Setpoint, Sys Mode Setpoint, Set Time for hours, minutes and bypass time, and so forth. The output items may be determined by the wall module 41. Send rates by the wall module 41 may be periodically every 10 seconds for sensors and periodically every 60 seconds for setpoints. The times may be longer or shorter. Function block logic may periodically send inputs to the wall module every 10 seconds.

Figure 5:
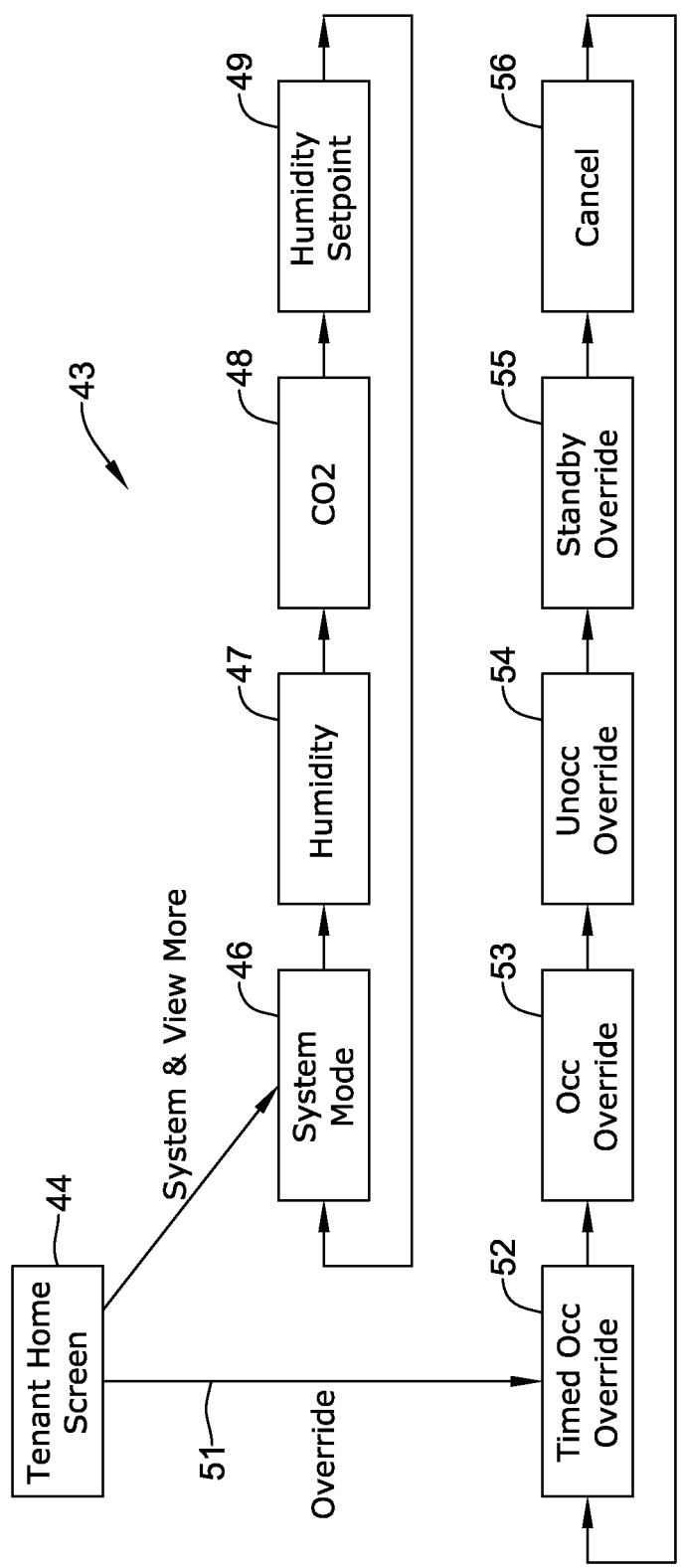
FIG. 5 is a diagram of a menu overview for a tenant scenario.

FIG. 5 is a diagram of a menu overview 43 for a tenant scenario. One may go from the tenant home screen 44 via a "system & view more" path to a system mode block 46. From block 46 one may cycle through humidity indication 47, CO2 indication 48, humidity setpoint indication 49, and back to the system mode block 46. Alternatively, one may go from the tenant home screen via an override path to a Timed Occ Override block 52 and cycle through an Occ Override block 53, an Unocc Override block 54, a Standby Override block 55, a Cancel block 56 and back to the Timed Occ Override block 52. Setpoint and fan changes may be done right on the home screen.

Figure 6A:
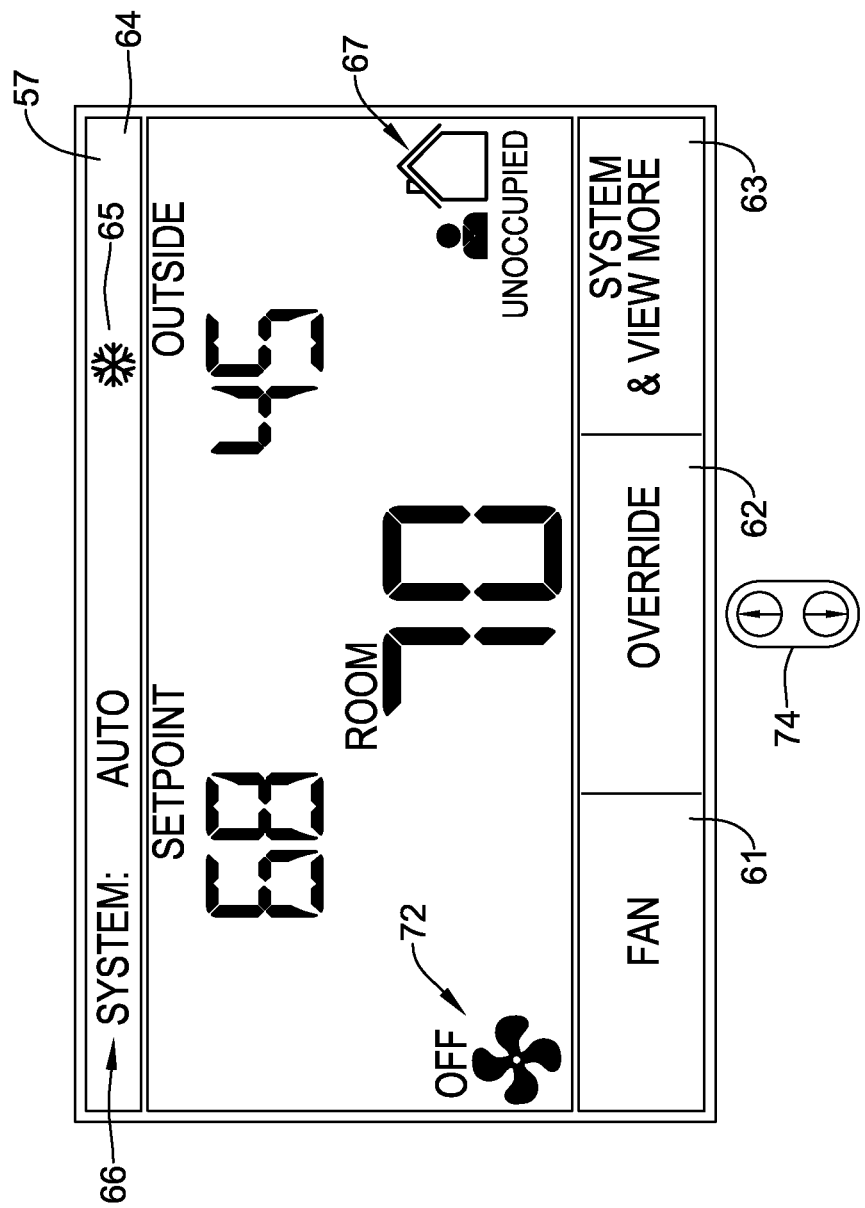
FIG. 6a shows a home screen.
Figure 6B:
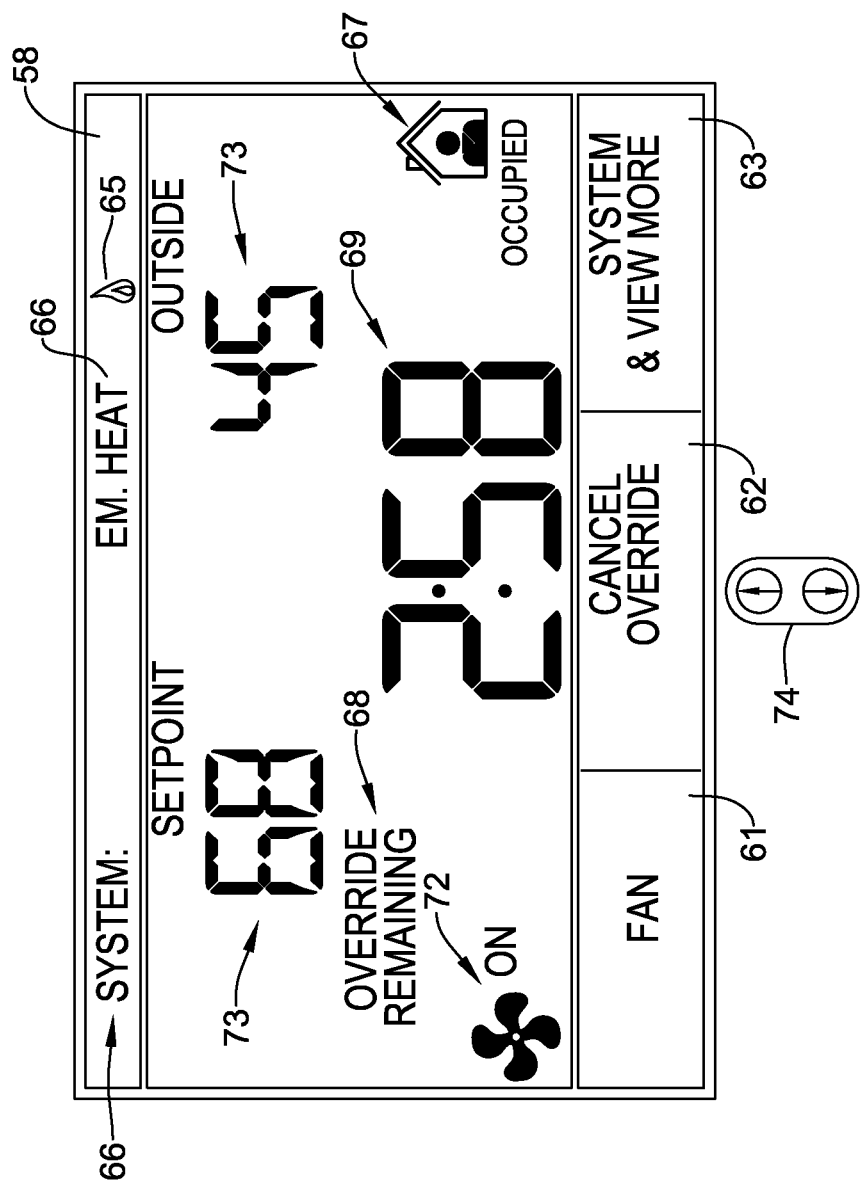
FIG. 6b shows a home screen with an override active showing remaining time.

FIG. 6a shows an illustrative example home screen 57. FIG. 6b shows an illustrative example home screen 58 with an override active symbol 68. The soft key area may display Fan state 61, Occupancy Override 62, and System & View More 63. Also on screen 57 may be up and down buttons 74. Buttons 74 are not necessarily shown in all of the Figures, but they may be assumed to be present with some screens that do not show them.

A system area may consist of two parts which are System Status 65 and System mode setpoint 66. The System symbol and line may be displayed if either system status 65 or system mode setpoint 66 is configured. The System Status 65 may be a flake, flame, or no symbol. Flake may be displayed if in COOL or REHEAT mode. Flame may be displayed if in HEAT, or REHEAT mode. No symbols are necessarily displayed if the system is OFF.

The System mode setpoint 66 may be OFF, AUTO, COOL, HEAT and/or EMERGENCY. OFF may be displayed if tenant commanded OFF from the wall module. AUTO may be displayed if tenant commanded AUTO from the wall module. COOL may be displayed if tenant commanded COOL from the wall module. HEAT may be displayed if tenant commanded HEAT or Emergency Heat from the wall module. EMERGENCY may be displayed if tenant commanded Emergency heat from the wall module. Note that the contractor may set all of the setpoints from the Tool.

There may be an occupancy status area 67. The contractor, via the Tool, may configure effective occupancy to be always displayed or instead show the commanded override if in override. If status area 67 shows an effective occupancy, then the "Occupied" symbol may be displayed if in occupied mode, the Unoccupied symbol may be displayed if in unoccupied mode, and the Standby symbol may be displayed if in standby. If the tenant is commanding an override, then the Occupied, Unoccupied or Standby symbol may be shown to indicate the command, the Override symbol 68 may be shown on screen 58 in FIG. 6b to indicate the tenant is requesting override, a time remaining symbol 69 may be shown to indicate if the tenant currently selected a timed override.

Figure 7A:
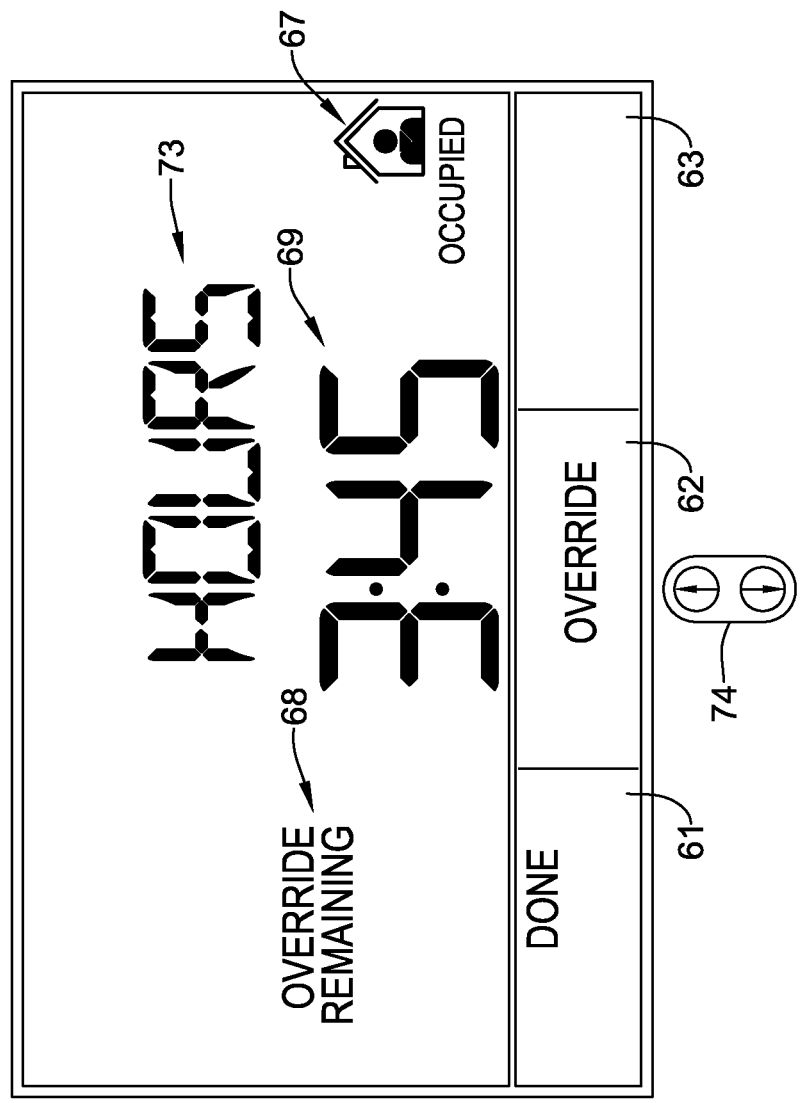
FIG. 7a shows a timed occupied override screen.
Figure 7B:
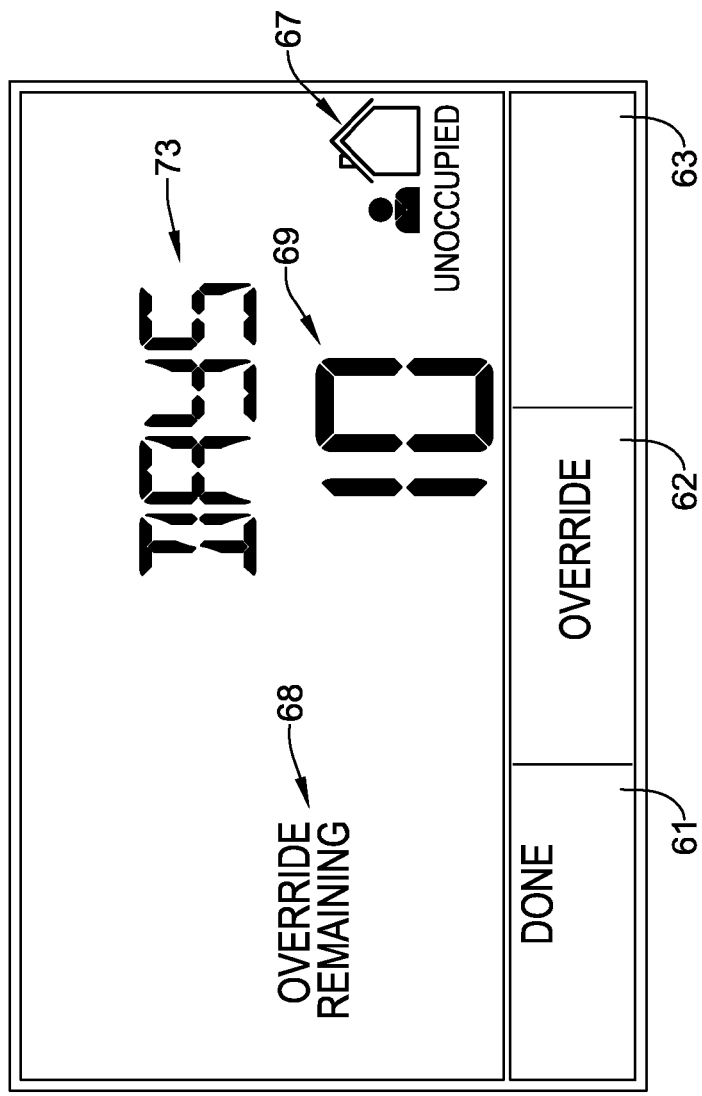
FIG. 7b shows a timed unoccupied override screen.
Figure 8A:
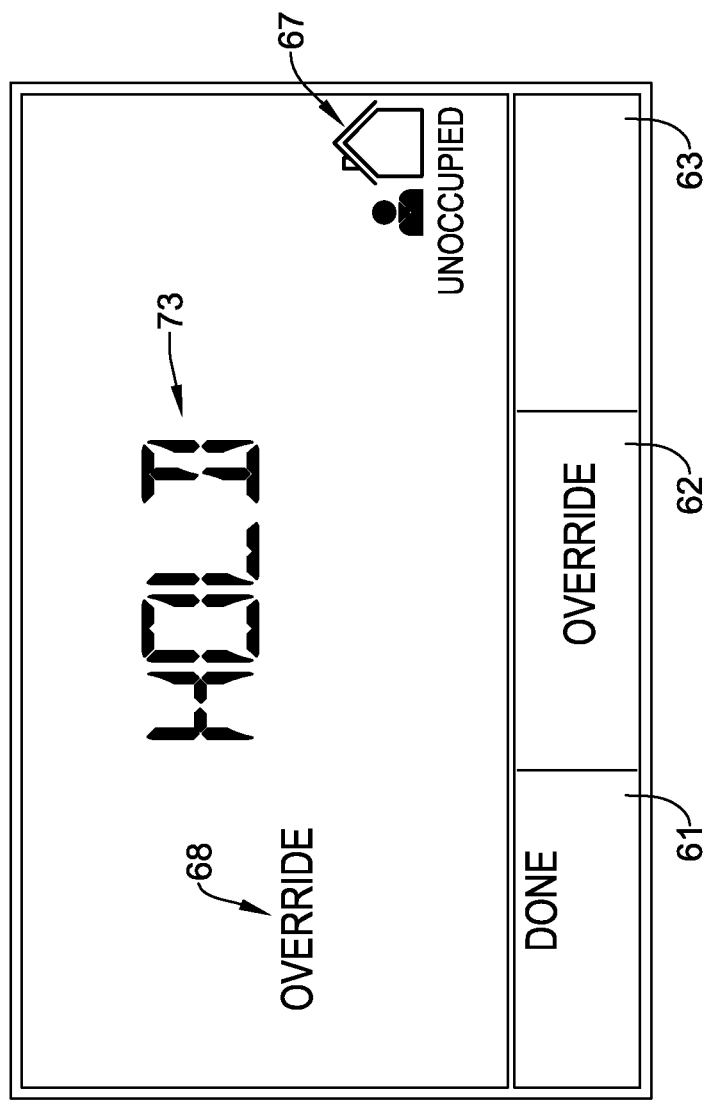
FIG. 8a shows a hold unoccupied override screen.
Figure 8B:
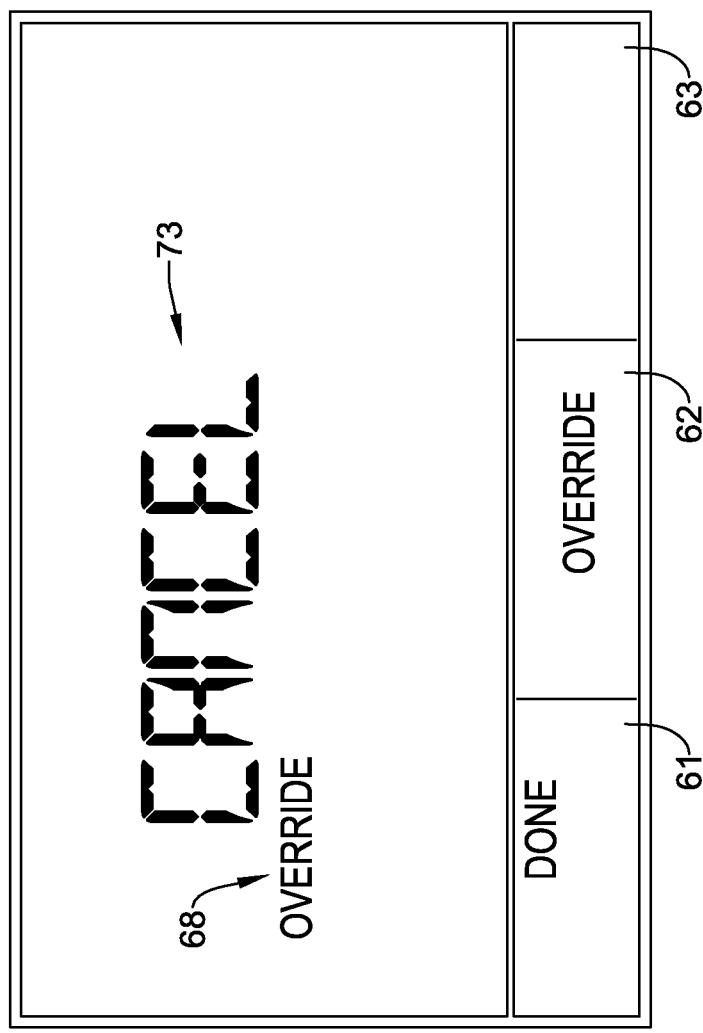
FIG. 8b shows a cancel override from an override screen.

The middle alpha numeric area 69 may display the amount of timed override entered by the tenant. This could be time or days remaining. Nothing might be shown if the time is continuous. The top alpha numeric area 73 may show "HOURS" or "DAYS", as indicated by FIGS. 7a and 7b, if the current selection is a timed override. The wall module could "HOLD" if continuous override. In other words, for continuous override, "HOLD" may be shown as in area 73 of FIG. 8a. FIG. 8b shows the cancel override from the override screen as indicated by "CANCEL" in area 73.

There may be a fan setpoint area 72. The fan symbol may be displayed if area 72 is configured by the contractor. The fan symbol does not necessarily stand alone. It may be present with at least one of the other symbols. Another symbol OFF may be displayed if the tenant or Tool commanded OFF. AUTO may be displayed if the tenant or Tool commanded AUTO. ON may be displayed if the tenant or Tool commanded ON (2 or 3 position). BAR1 may be displayed if the tenant or Tool commanded speed 1 from the wall module (5-position only). "BAR1+BAR2" may be displayed if the tenant or Tool commanded speed 2 from the wall module (5-position only). A BAR1+BAR2+BAR3 may be displayed if the tenant or Tool commanded speed 3 from the wall module (5-position only).

There may be the top alpha numeric area 73. The left portion of area 73 may contain a value with the Room or Setpoint symbol optionally displayed. The right portion of area 73 may contain a value with the Outside, Humidity %, or both symbols optionally displayed.

The middle alpha numeric area 73 may optionally display a value. The Setpoint, Temperature and/or Room symbols may be optionally displayed. A unit symbol may be optionally displayed. The appropriate decimal point may be displayed.

Area 69 may optionally displays the current time including a colon. Time may be displayed as configured by the Tool in 12/24 hour format. The AM/PM symbols may be shown as appropriate. Areas 73, 69 and 68 may optionally display the Time Remaining and Override symbols if an override is commanded.

A set of guidelines may be applied to display 58. The middle alpha numeric area 69 may be limited on the display of positive numbers X, XX, XXX, XXXX, X.yy, XX.yy, X.y, XX.y, and XXX.y. Middle alpha numeric area 69 may be limited on display of negative numbers: –X, –XX, –XXX, –X.yy, –X.y, –XX.y. Middle alpha numeric area 69 may be limited on the letters that can be displayed. If the middle value is between –99 and +99 and it is configured with zero decimal places, then the number may be centered. The minus sign, if present, may be to the left. If the value fails to meet these qualifications, it may be right justified. Examples of centering may include blank 99 blank, –9 9 blank, blank –9 blank and blank blank 9 blank. Examples of right justification may include blank 1 0 0, blank –1.3 and blank 2.34.

Top alpha numeric area 73 may be limited to integer numbers only. Positive numbers may be up to 3 digits. Negative numbers may be up to 2 digits with the middle segment of the left character serving as the minus sign. Top alpha numeric area 73 may be designed to display a label of up to 8 characters and a number on the left side or a number on the right side or numbers on both sides. The present approach does not necessarily require a mixture of labels and numbers, labels on the home screen, or more or less than two numbers.

The home screen format display may be per the contractor configuration. Except on the Home screen, a parameter that may be changed blinks at 2 seconds on and 1 second off. This indicates that it may be changed. The blinking times may be a matter of choice, or another indication may be implemented.

Home screen "Up" key 74 may increment the setpoint 73 by one unit. On the Home screen, the setpoint segment 73 may serve as the identifier of which number is the setpoint. If the middle Setpoint segment is shown, then the middle number may be considered to be the setpoint. Else if the upper left Setpoint segment is shown, then the upper left number may be considered to be the setpoint. Else if there is no setpoint on the Home screen, the up/down keys 74 may be ignored. The value may be sent to the controller when the wall module is confident that the tenant is finished. This may be either a time out (i.e., 10 seconds) with no key presses or a key other than up/down is pressed. When the tenant presses and holds the up/down keys 74, the display may slew. There may be a slow slew rate and then a fast rate.

Home screen "Down" key 74 may decrement the setpoint by one unit. Wall module may limit the setpoint number to the high limit. Wall module may limit the setpoint number to the low limit. Wall module may increment and decrement the setpoint by the increment/decrement amount. Contractor, via the Tool, may define high limit, low limit, increment/decrement value. On the Home screen, the key press may be ignored if high or low limit would be exceeded.

Middle key 62 may initiate override. If not in override, pressing the middle key 62 may show the first item in the override round robin. If already in override, the Cancel symbol may be shown in addition to the Occupancy Override symbol. Pressing the middle key 62 may cancel any override in effect. Once in the override screens (FIGS. 7a, 7b, 8a, 8b), pressing the middle key 62 may again sequence to the next override option in the round robin. The round robin may sequence to a CANCEL screen after the last option is shown. After the CANCEL screen, the round robin may sequence to the first screen. If there is only one override option, pressing the Occupancy Override key may sequence between the one option and the Cancel screen.

The Done segment may be shown (FIGS. 7a, 7b, 8a, 8b). The tenant may press key 61 when the override choice is complete to initiate the override. For timed overrides, the appropriate symbol (Occupied, Unoccupied, or Standby) may be displayed. Override and Time Remaining symbols may be displayed. The setpoint area may show the time remaining. It may be initialized to the low limit value. The times may be in Hours or Days. The top alpha numeric area 73 may display the word "Hours" or "Days", as appropriate, shown in FIGS. 7a and 7b, respectively. Up key 74 may increment the value in the setpoint area by one unit. Down key 74 may decrement the value by one unit. The Up/Down key 74 press may be ignored if high or low timed occupied override limits would be exceeded. The count down timing may occur in the wall module. A value (BYP, UNOCC, or STDBY) may be sent to the controller when the wall module is confident that the tenant is finished. This may be either a time out (i.e. 10 seconds) with no key presses or the "Done" key 61 is pressed.

For continuous overrides, the appropriate symbol (Occupied, Unoccupied, or Standby) may be displayed. The Override symbol may be displayed. Continuous override may be a special case of timed override in that the timer never counts down. The up/down keys 74 may be ignored. The wall module may send the value (OCC, UNOCC, STDBY) to the controller when the wall module is confident the tenant is finished.

In FIG. 6b, left key 61 may change fan state 72. It may toggle between a 2-position Auto/On, a 3-position Auto/Off/On, and a 5-position Auto/Off/bar1/bar1+2/bar1+2+3. The contractor, via the Tool, may define fan selection as none, 2-position, 3-position, or 5-position. If none is chosen, then it may be that none of the fan symbols 72 is displayed, the software key 61 Fan state is not shown, and the left key 61 is ignored in the Home screen. If a 2, 3 or 5 position fan selection is chosen then the Blade symbol may be shown with the fan setpoint value. The fan setpoint value may be sent to the controller when the wall module is confident that the tenant is finished. This may be either a time out (e.g., 10 seconds) with no key presses or a key other than up/down 74 is pressed.

Right Key 63 may be the "System & View More" key. If only the system mode setpoint is configured, then only the System symbol may be displayed. If only View More is configured, then only the View More symbol may be displayed. If both are configured, then the System, &, and View More symbols may be displayed.

If system mode setpoint is configured, then pressing the System & View more key 63 may go to the system mode setpoint screen. The right key may change from "System & View More" to "View More". If there are no View More items, then the "&" and "View More" symbols are not necessarily displayed. The left key 61 may display "Done". The middle key 62 may display Cancel. Top alpha numeric area 73 may display a label such as "SYS MODE" as in FIG. 9a. The system mode symbols configured by the Tool user (OFF, AUTO, COOL, HEAT, EMERGENCY+HEAT) and setpoint symbol may be shown. The current system mode selection may blink. The up/down keys 74 may enable the tenant to change the selection. If the tenant leaves the wall module in system mode setpoint for more than several (e.g., 10) seconds without a key press, then it may go back one level (i.e., it returns to the Home screen). Any change made to this screen may be saved.

If the system mode setpoint is not configured or if the View More key 63 is pressed from the system mode setpoint screen, then the system may go to the first "View More" screen. In FIG. 9b, top alpha numeric area 73 may display a label. Middle alpha numeric area 69 may display a value. A unit area may display the appropriate unit. Other symbols such as Temperature, Outside, Humidity %, and so on may be displayed as configured by the contractor via the Tool. If the value can be edited, the number may blink. The up/down keys 74 may enable the tenant to change the number. The contractor, via the Tool, may define the label, pointer to the value, unit, editable, min, max, and increment/decrement value. If there are no entries in the list, then & and View More are not necessarily displayed on the Home screen or on the System mode setpoint screen. If the tenant leaves the wall module in System & View More mode for more than several (e.g., 10) seconds without a key press, then it may go back one level (i.e., returns to the Home screen). Any change made to this screen may be saved.

The middle key 62 may be a Cancel. The value changed on the current screen may be canceled (discarded). Note all other changes made at this level may be saved. One may go back one level (i.e., return to Home screen).

The left key 61 may be labeled "Done". The value changed on this screen may be saved and sent to the controller. One may go back one level (i.e., return to Home screen).

When in the View More screen, in FIG. 9b, the right key 63 may be labeled "Next". One may save any changes made to the value on the current screen. One can go to next View More screen in the list. If there is only one entry in the View More list, then the Next key 63 is not necessarily shown.

Up Key 74 may increment the number in a middle alphanumeric area 69 by one unit (increment amount). On View More screens, the middle number should be of type "Setpoint" (i.e., an output) and be editable in order for the up/down keys 74 to work. Note that the Setpoint segment need not be shown for a number to be of type Setpoint.

Figure 10A:
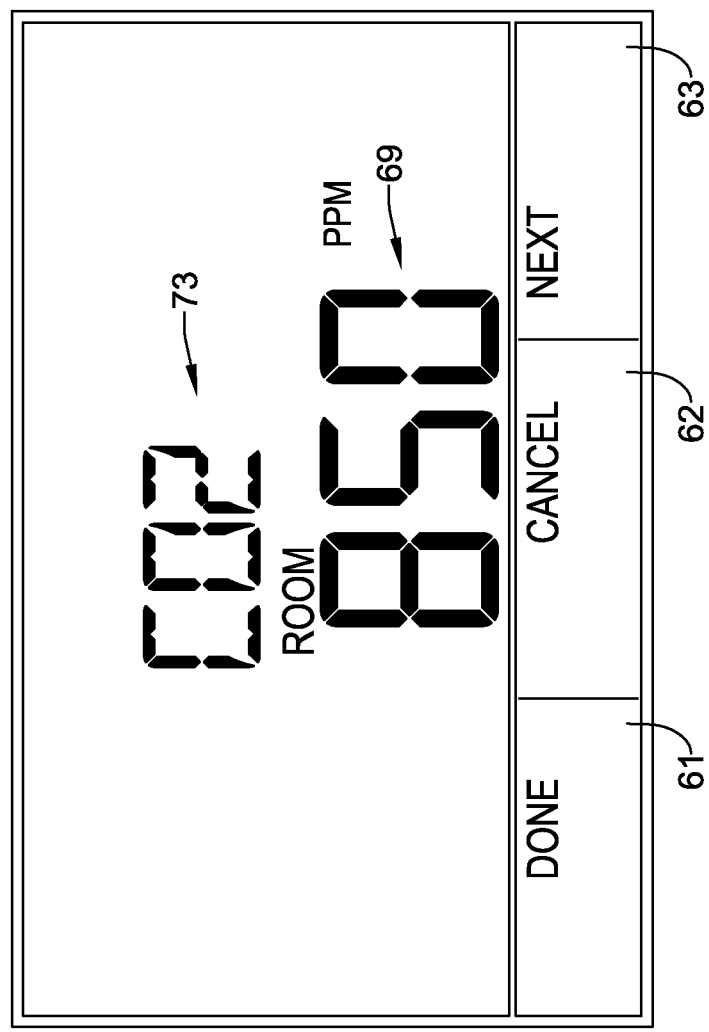
Figure 10B:
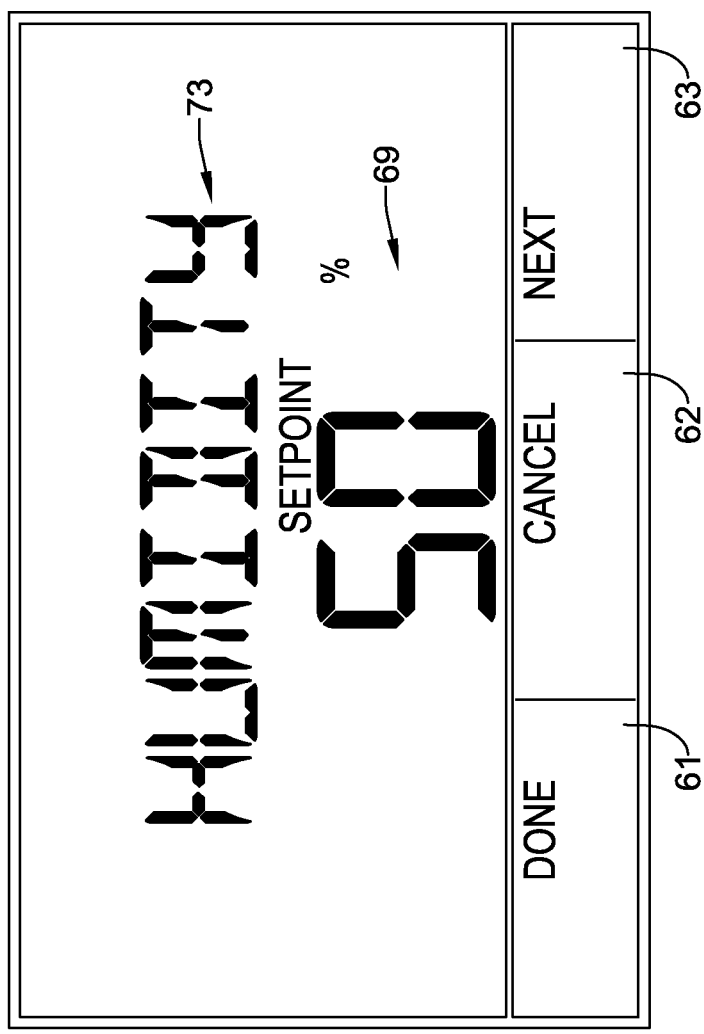
Figure 10C:
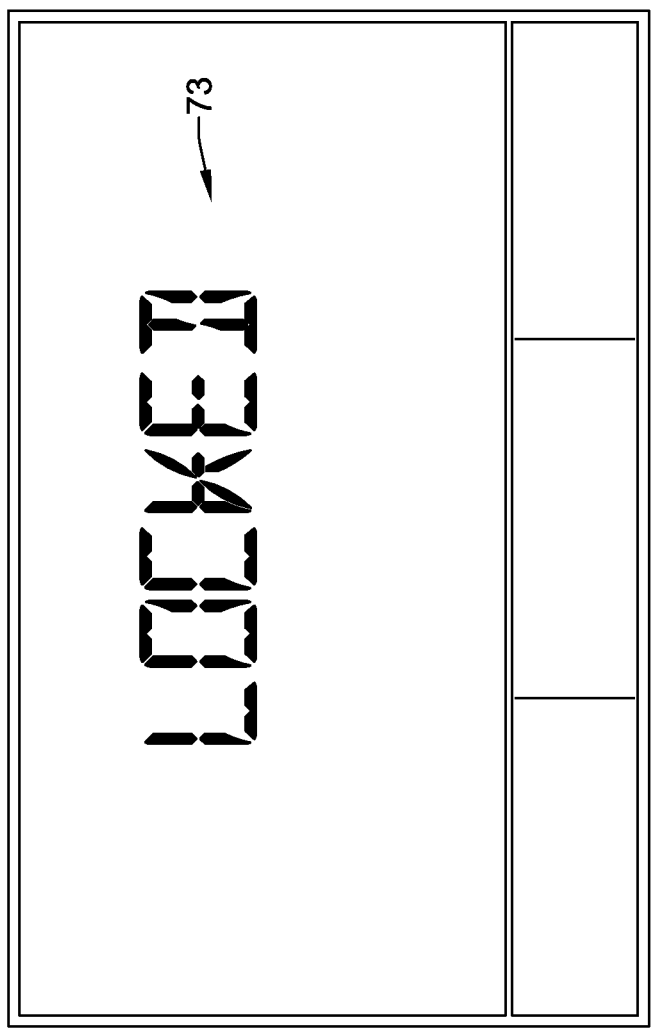
Figure 11A:
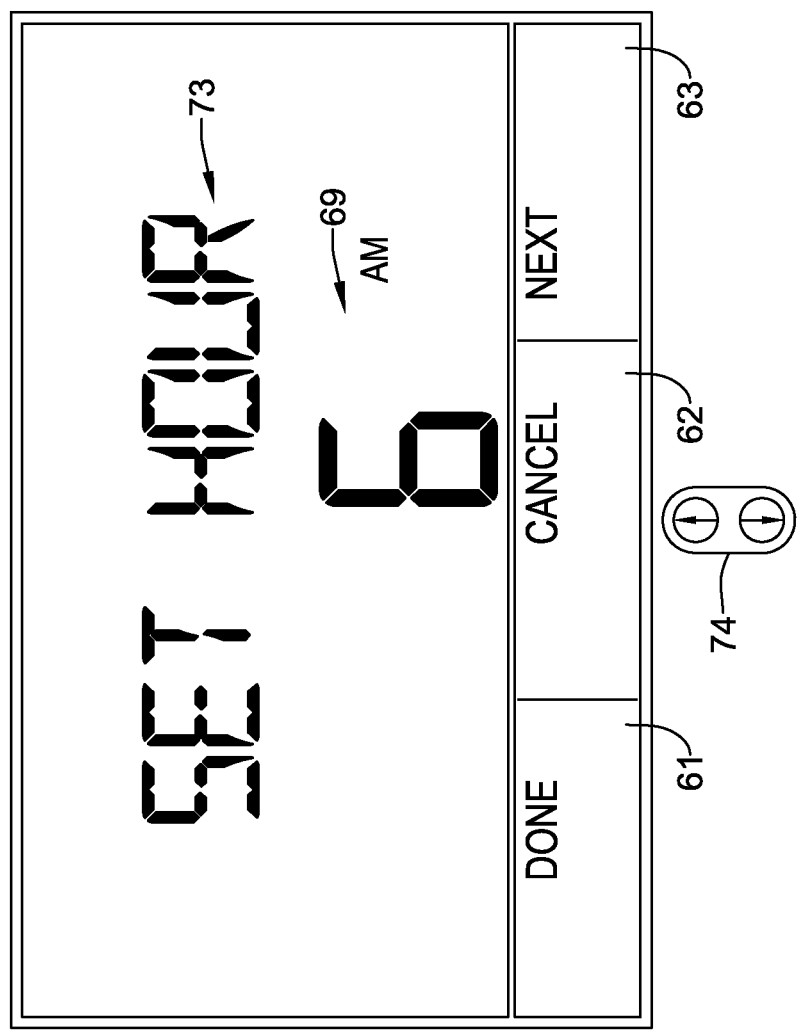
Figure 11B:
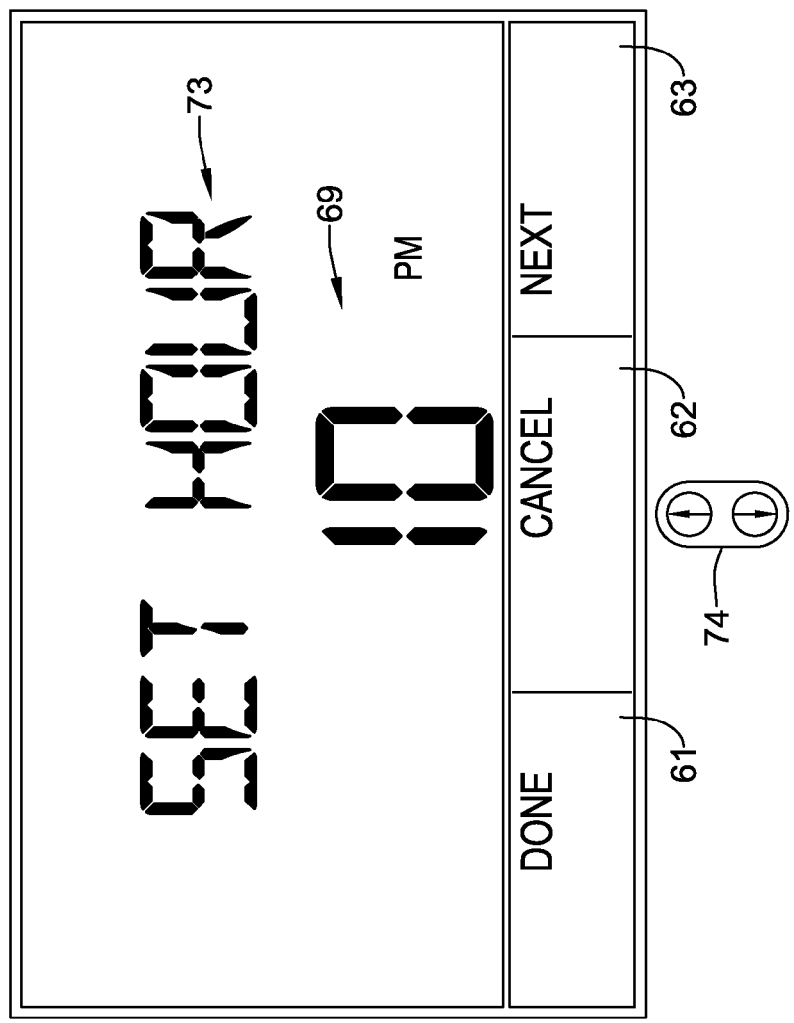
Figure 11C:
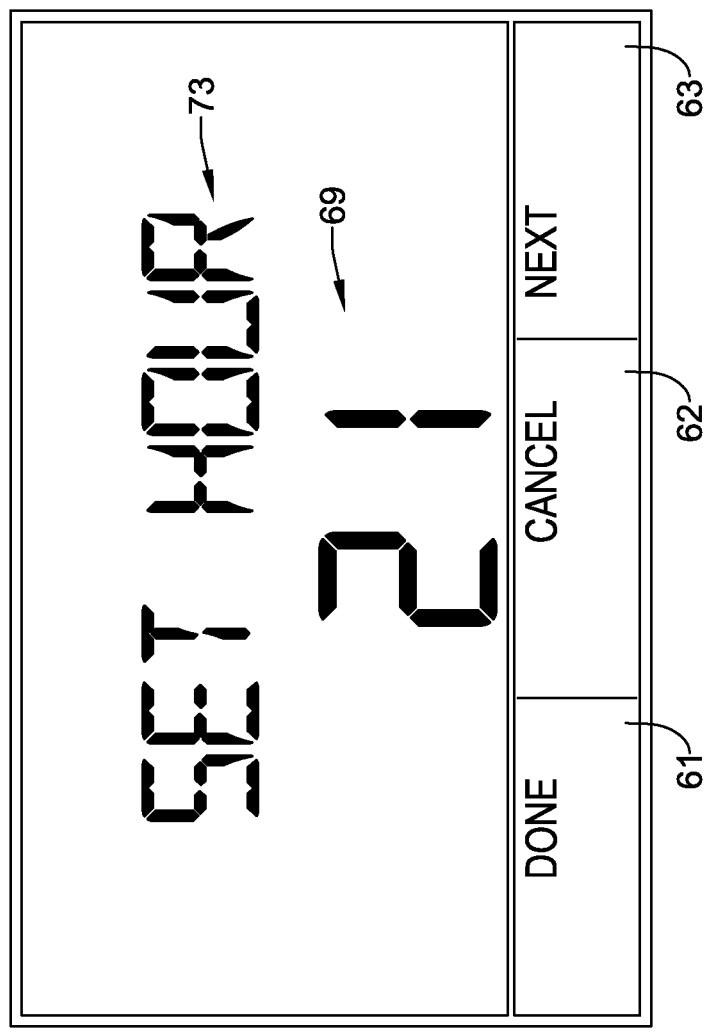
Figure 11D:
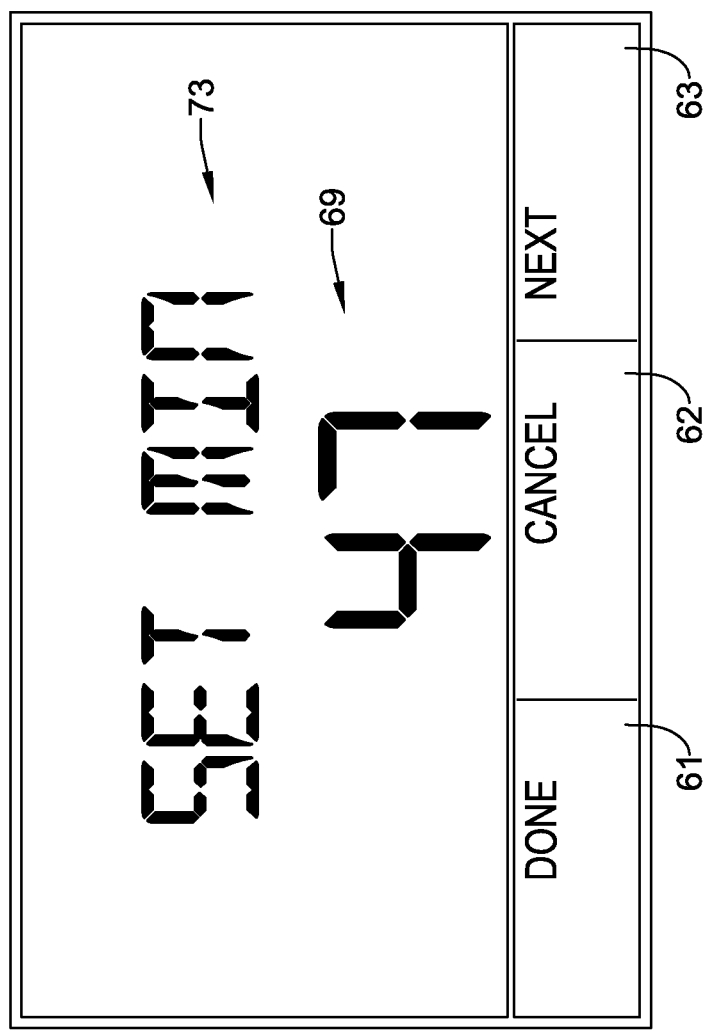

Down key 74 may decrement the number in middle alpha numeric area 69 by one unit. Wall module may limit editable numbers to high limit. Wall module may limit editable numbers to low limit. Contractor, via the Tool, may define high limit, low limit, and increment/decrement amount. Key press may be ignored if the high or low limit would be exceeded. If the setpoint value is not editable, then "LOCKED" (e.g., FIG. 10c) may be displayed in the alpha numeric area for 2 seconds (more or less) before returning to the same screen. When the tenant presses and holds the up/down keys 74, the display may slew. There may be a slow slew rate and then a fast rate.

The following figures are examples of override screens some of which have been noted herein. FIG. 7a shows a timed occupied override screen. FIG. 7b shows a timed unoccupied override screen. FIG. 8a shows a continuous unoccupied override screen. FIG. 8b shows a cancel override from an override screen.

Figure 9A:
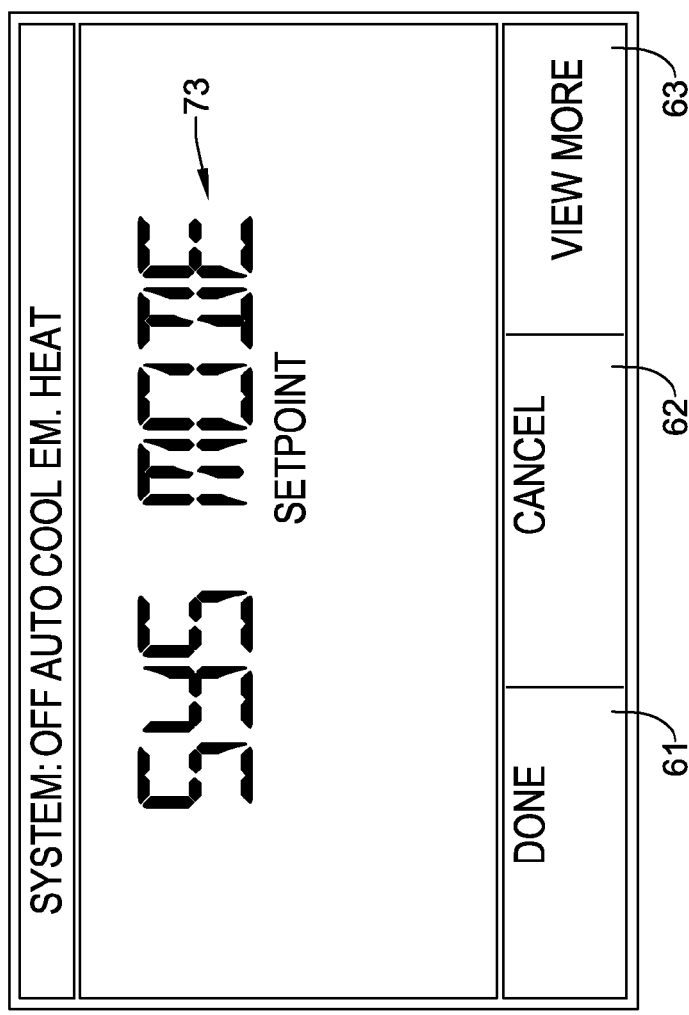
FIG. 9a shows an example of a system mode screen.
Figure 9B:
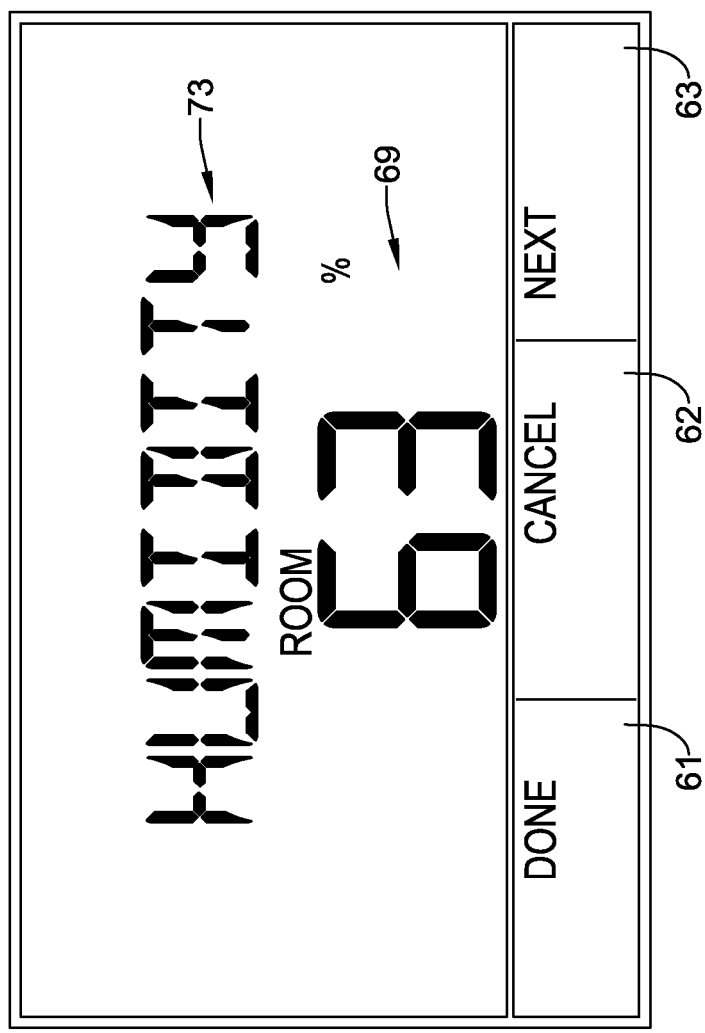
FIGS. 9b, 10a-10c and 11a-11d show screens of room humidity percent, room CO2 PPM, humidity setpoint, locked and set time, respectively.

FIG. 9a shows an example of a "system mode" in area 73 of the screen and a set from a "view more" right key 63. The contractor, via the tool, may enable the tenant to be able to set the system mode. The symbols configured by the tool user may be displayed. The present mode selected may blink. Pressing the left "done" key 61 may save the selection and return one to the home screen. The middle "cancel" key 62 may discard any changes and return one back to the home screen. Up/Down keys 74 may allow the tenant to change the selection. The "View More" key may save and go to the "View More" screens. Examples of "view more" screens, as shown in FIGS. 9b, 10a, 10b, 11a, 11b, 11c and 11d, may include room humidity percent, room CO2 PPM, humidity setpoint and set time screens, respectively. As to the screens of FIGS. 11a-11d, the contractor may configure the tenant to be able to view and/or set the time from the "View More". Time may be presented on the screens of FIGS. 11a-11c as configured by the Tool user in either 12 or 24 hour format. The Up/Down keys 74 may be used to scroll time.

Figure 12:
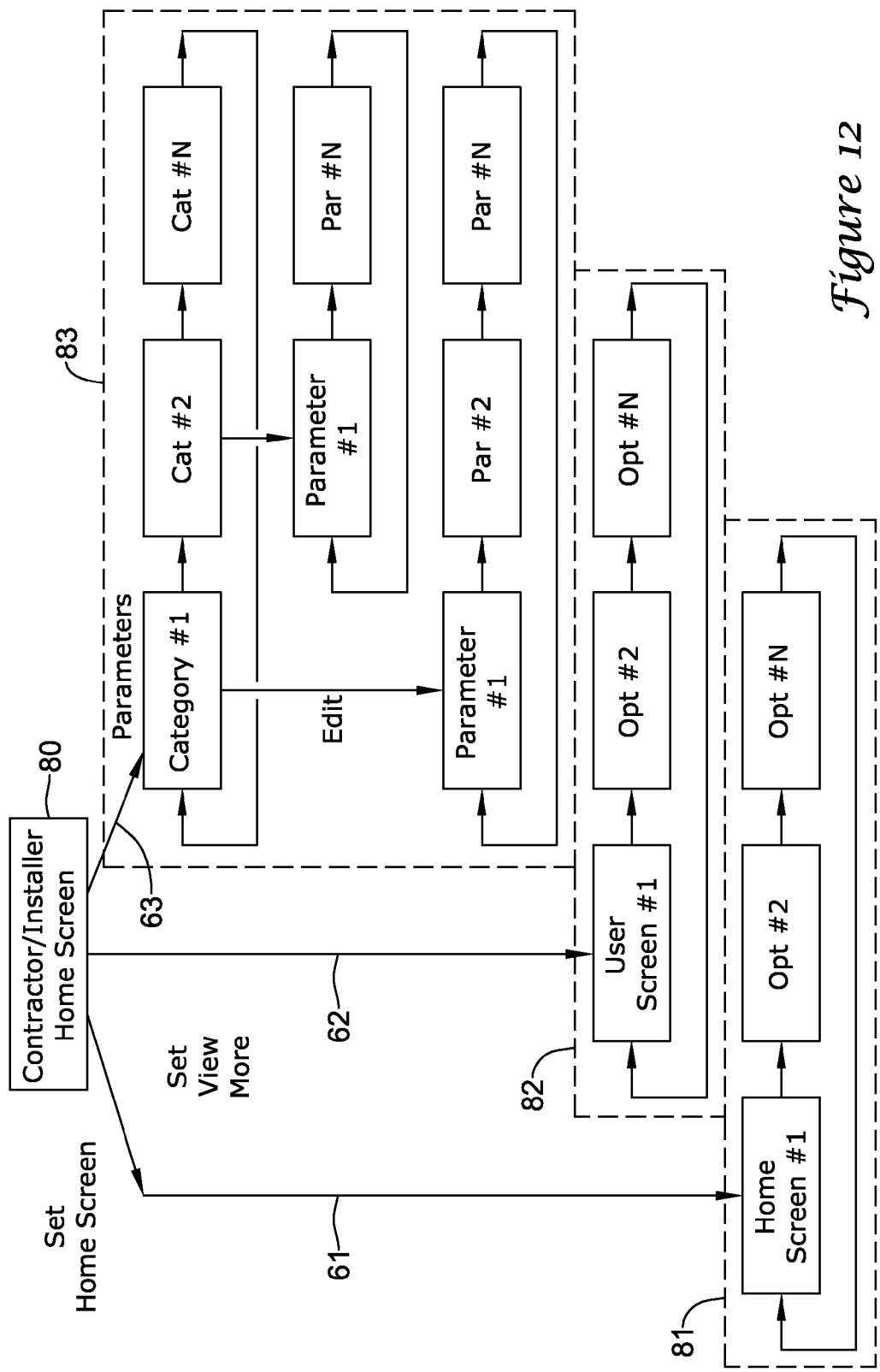
FIG. 12 is a flow diagram of a menu of a contractor/installer scenario.

FIG. 12 is a flow diagram of a menu overview of a contractor/installer scenario. One may start with a contractor/installer home screen block 80. Keys 61, 62 and 63 may be available for selecting "Set home screen", "Set view more" and "parameters", as shown in screen 77 of FIG. 13. The arrows may be labeled 61, 62 and 63, respectively, for the home screen options block 81, the view more settings block 82 and the parameters block 83. Selection 61 may go to block 81 having home screen #1, option #2 and so on to option #N, where N may be the number of options available in the system. Selection 62 may go to block 82 having a user screen #1, option #2 and so on to option #N. Selection 63 may go to block 83 having a category #1, category #2 and so on to category #N. Each category may have a parameter #1, parameter #2 and so on to parameter #N. A connection between a category and a parameter in FIG. 12 may be effected with an edit.

A set of rules may be resorted to for the contractor/installer. The contractor may enter Contractor/Installer mode by pressing a special key sequence using keys 61, 62, 63, up and down keys 74, and/or possibly other keys if available. The key sequence could be a number of keys pressed in a specified order or two or more keys pressed simultaneously. The contractor may know that the wall module is in a Contractor/Installer mode because the keys 61, 62 and 63 will be labeled "Set Home screen", "Set View More", and "Parameters". The contractor home screen 77 of FIG. 13 may have the same format as the tenant home screen 57 of FIG. 6a. The contractor may exit Contractor/Installer mode by pressing the same special key sequence used for entering the mode. If the wall module is left in Contractor/Installer home screen 77 for (e.g., 4) minutes with out a key press, then the module may exit Contractor/Installer mode screen 77 and return the Tenant Mode screen 57. The timeout for the parameters screen should be sufficiently long to allow for the balancers to do their work.

Figure 13:
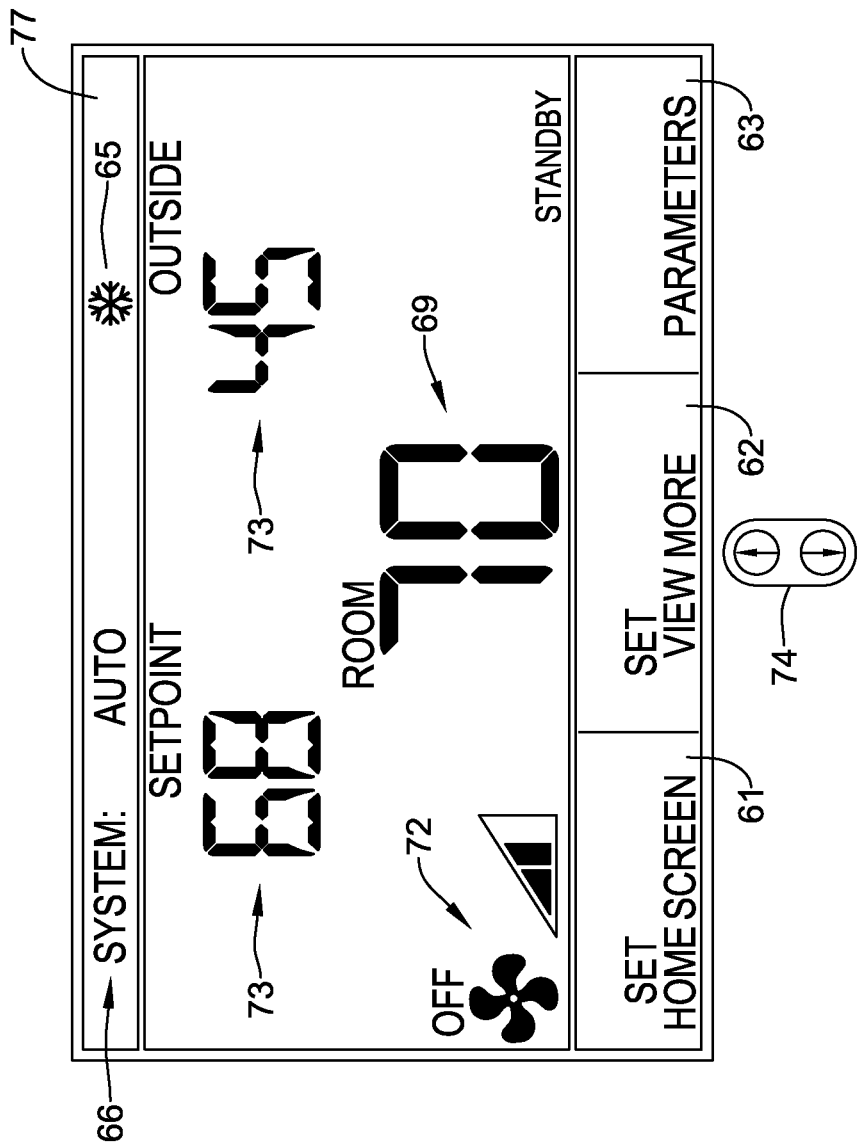
FIG. 13 shows an example of a contractor/installer home screen.
Figure 14A:
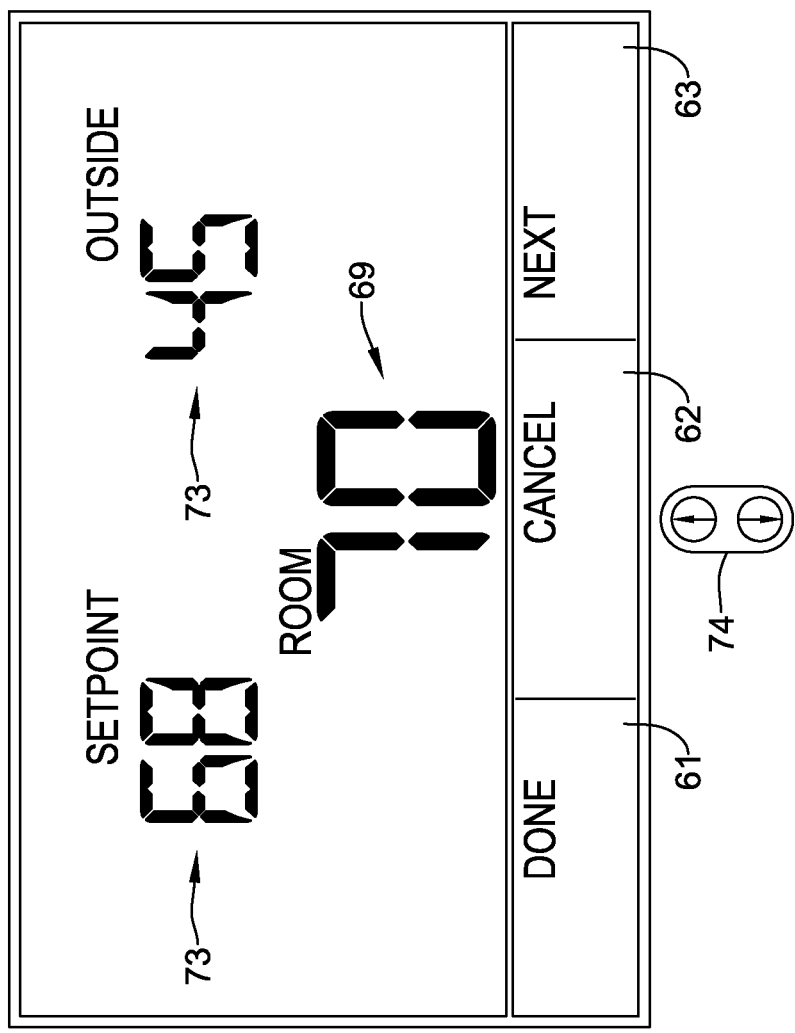
FIGS. 14a-20 show various home screen options.
Figure 14B:
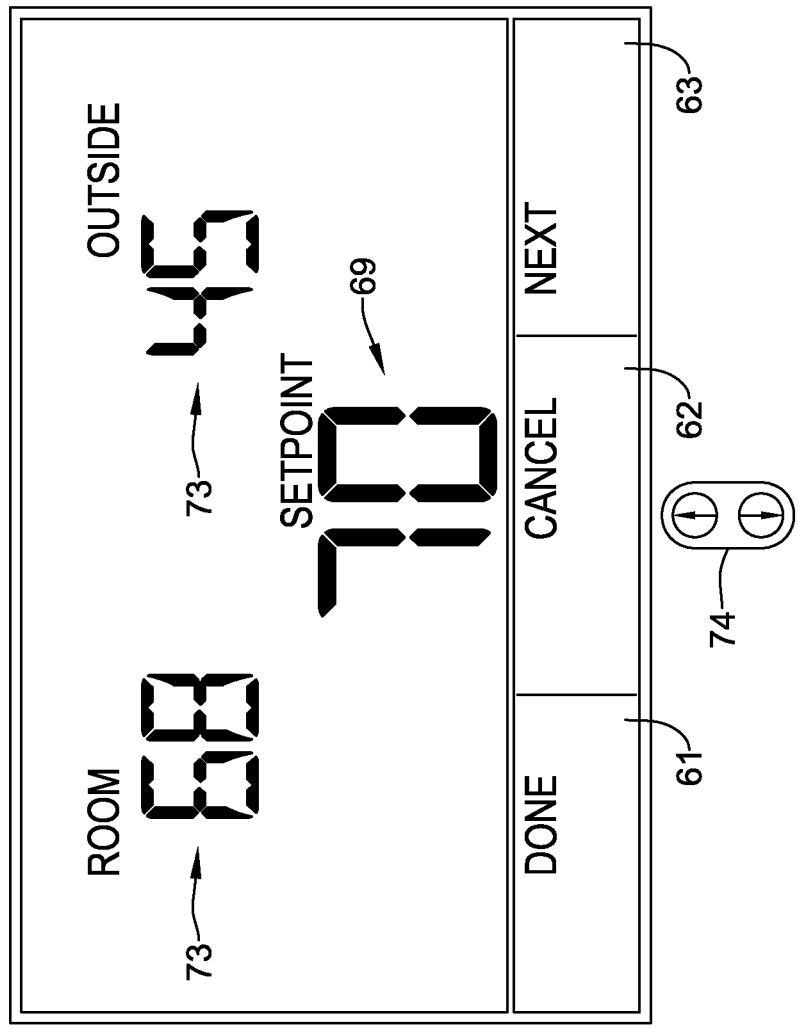

The contractor may use the special key sequence to change the tenant home screen 57 at the contractor/installer home screen 77 of FIG. 13. Pressing the Set Home Screen key 61 at the Contractor/Installer Home screen 77 may give a home screen options group 81 (FIG. 12) with the option currently selected. In FIG. 14a, pressing Next key 63 of a home screen option may have one go to the next home screen option. Pressing the Done key 61 may cause the present option to be used as the home screen and return to the Contractor/Installer mode Home screen 77. Pressing the Up/Down keys 74 may be ignored. Pressing the Cancel key 62 at any time may return one to the Contractor/Installer mode Home screen 77 with no changes made. The home screen, for instance, may be designed to display one setpoint in area 73 and one room temperature in area 69 as in FIG. 15. Displaying two setpoints or two room temperatures should not be allowed at this time.

There may be more or less than eight choices in the final design. The Tool should allow the user to select what home screen choices should go into the wall module. If perhaps only one choice is made available, then the soft key 61, "Set Home Screen", would not necessarily be shown.

Figure 15:
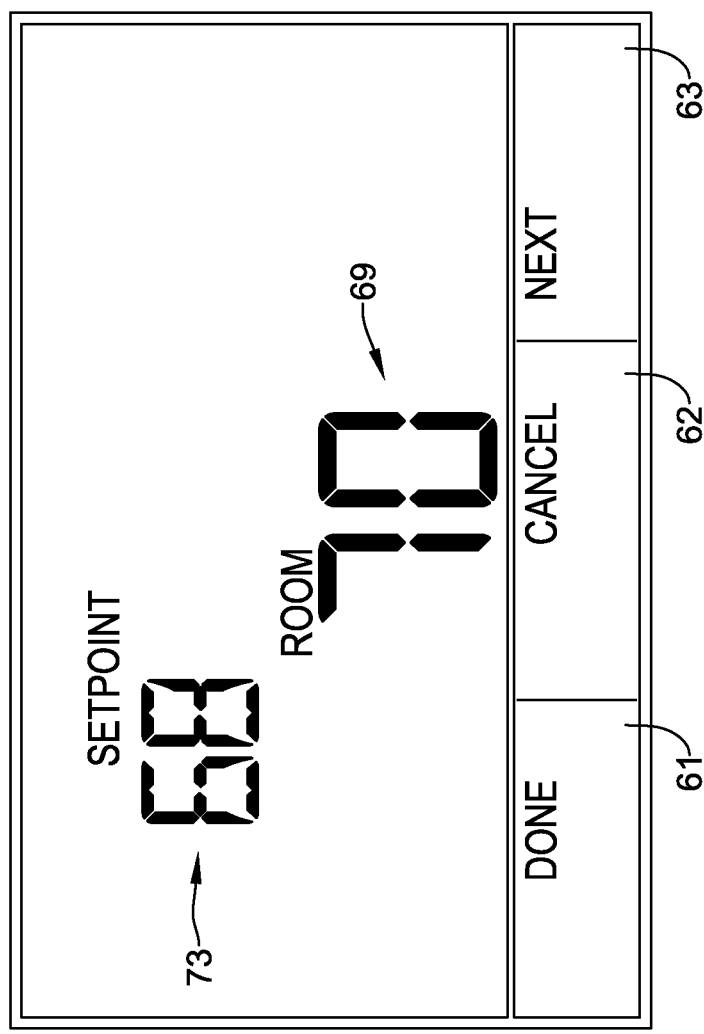
Figure 16:
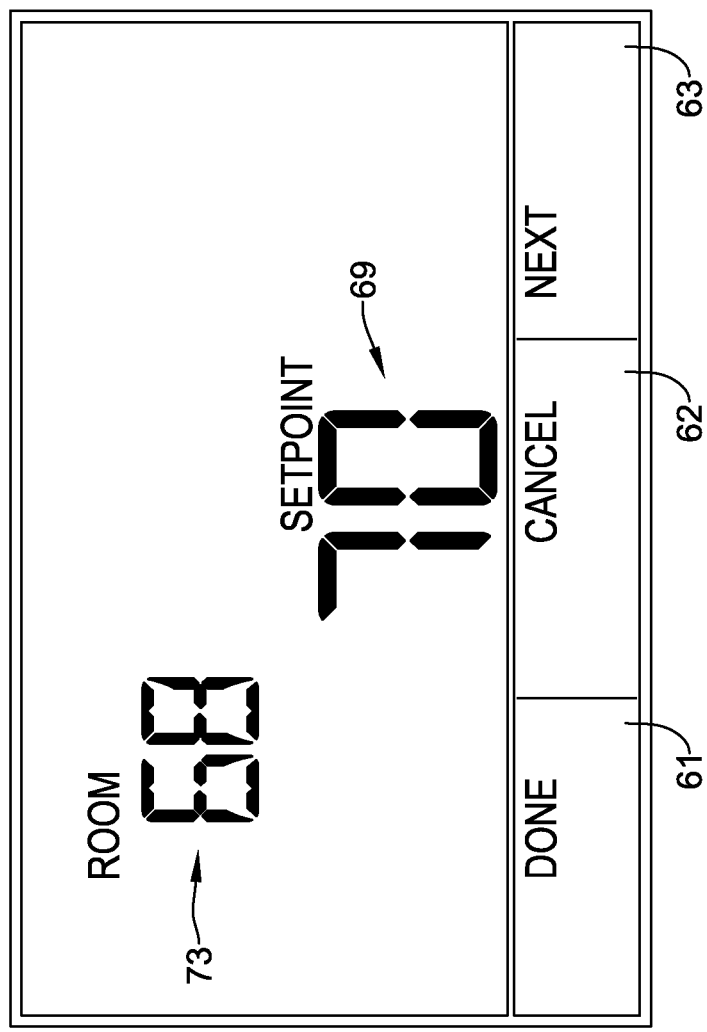
Figure 17:
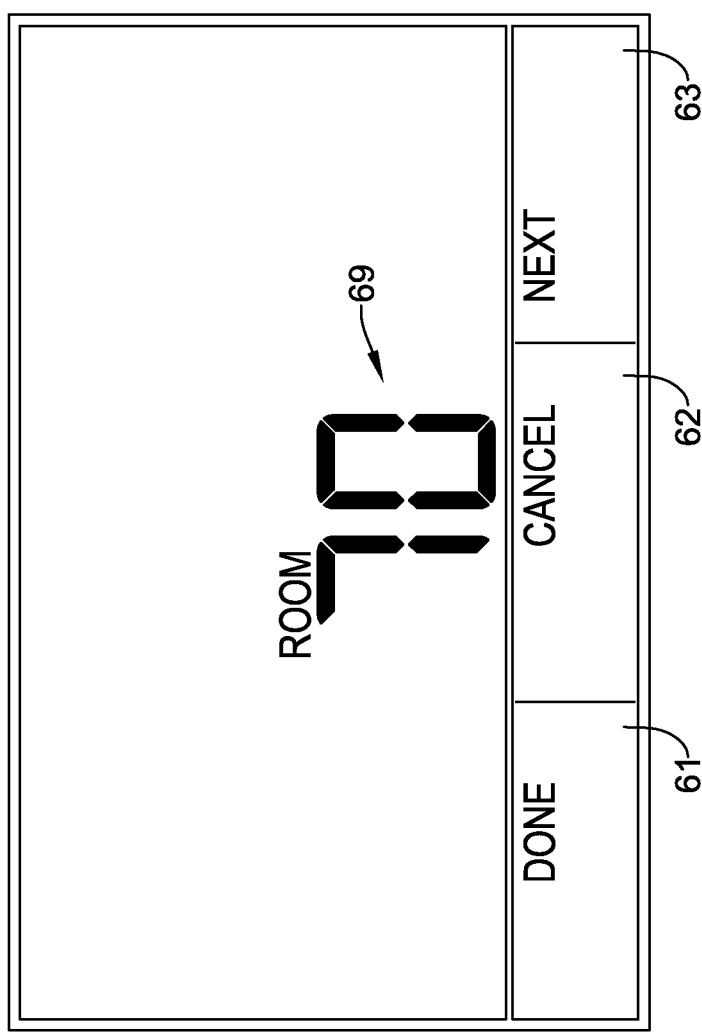
Figure 18:
Figure 19:
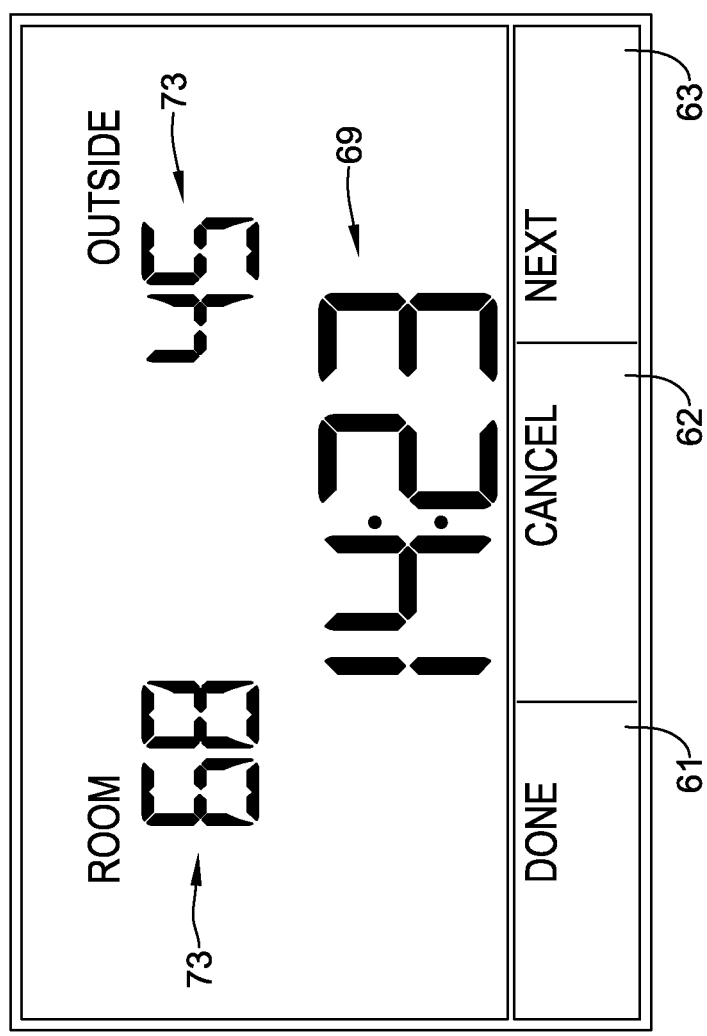
Figure 20:
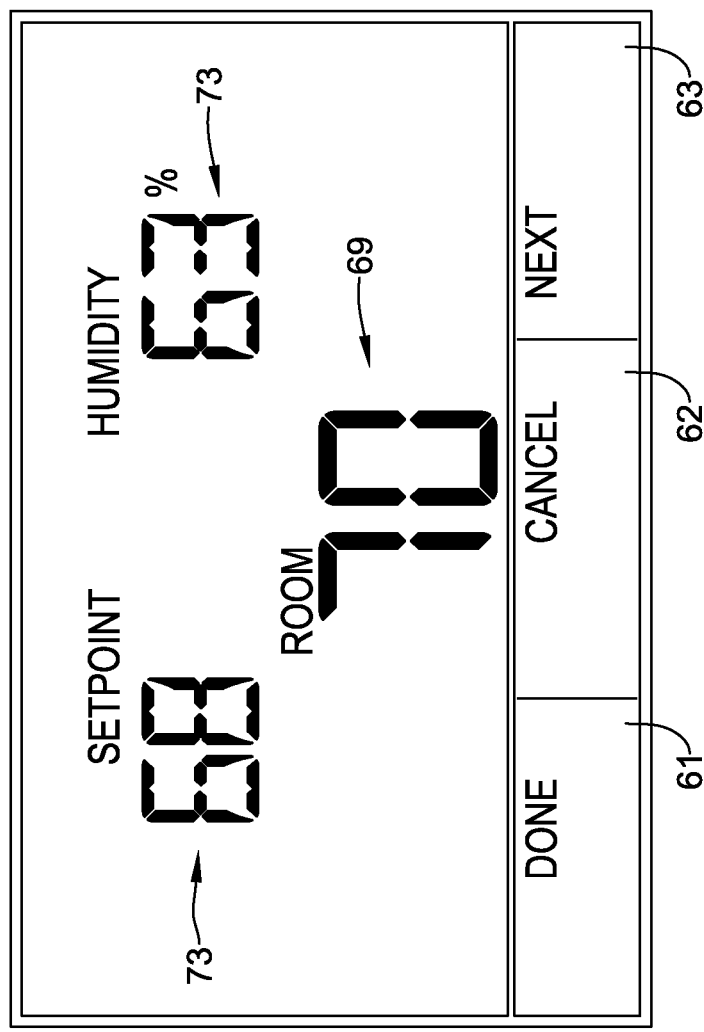

FIGS. 14a-20 show various home screen options. FIG. 14a shows an option 1 screen with a temperature setpoint, and outside and room temperature indications in areas 73 and 69, respectively. This screen may be a default choice which the Tool makes for the contractor. FIG. 14b shows an option 2 with room and outside temperatures in area 73 and the temperature setpoint in area 69. FIG. 15 shows an option 3 with temperature setpoint in area 73 and room temperature in area 69. FIG. 16 shows an option 4 with the room temperature in area 73 and the temperature setpoint in area 69. FIG. 17 shows an option 5 with just room temperature in area 69. FIG. 18 shows an option 6 with room temperature in area 73 and time in area 69. FIG. 19 shows an option 7 with room and outside temperatures in area 73 and time in area 69. FIG. 20 shows an option 8 with the temperature setpoint and humidity in area 73 and room temperature in area 69.

Figure 21:
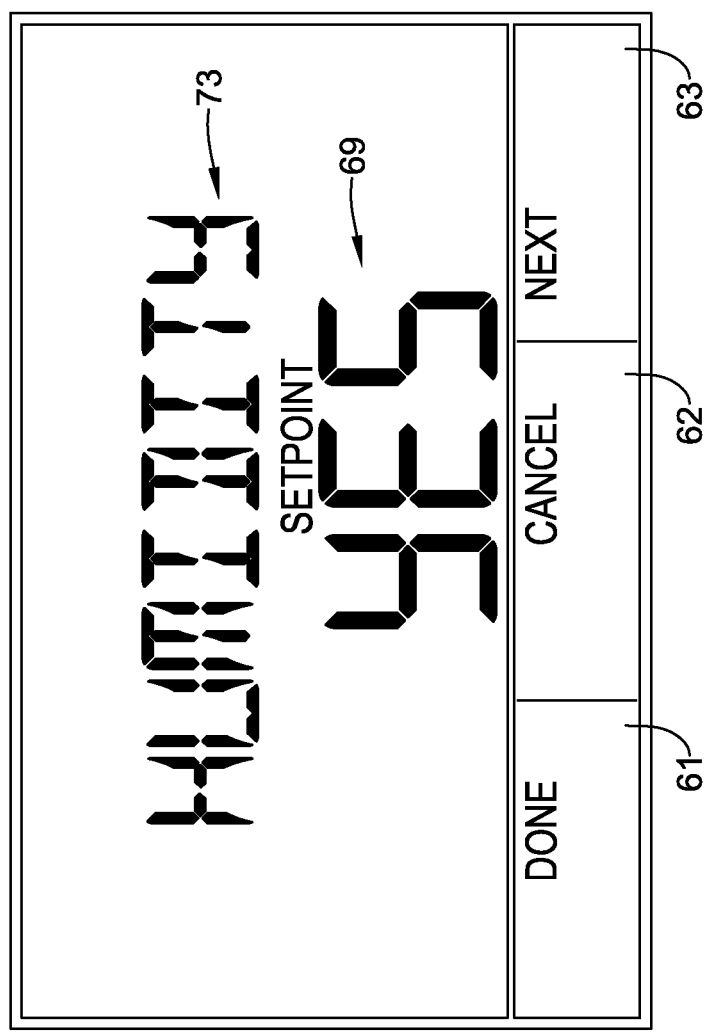
FIGS. 21 and 22 show humidity setpoint screens which relate to whether a tenant can readily view the respective screens.
Figure 22:
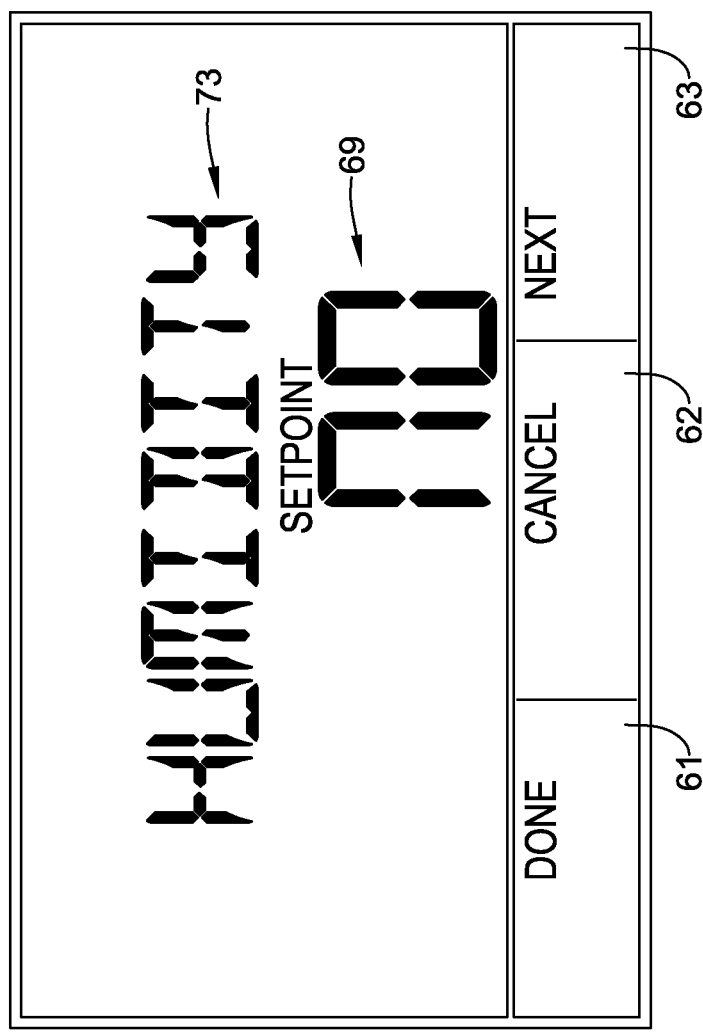
Figure 23:
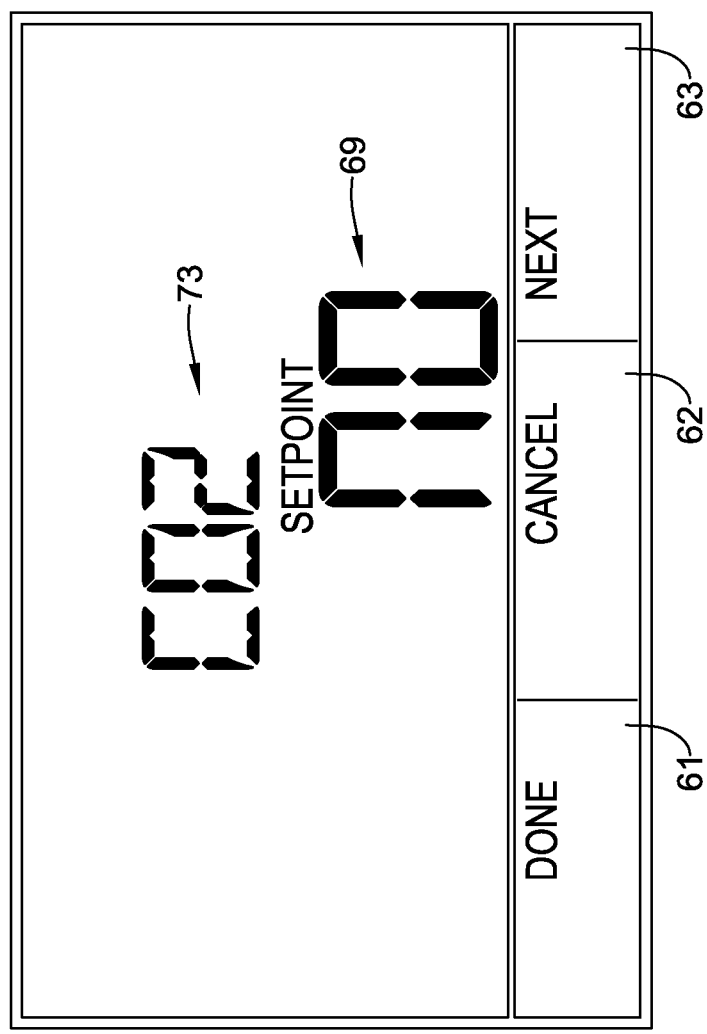
FIGS. 23 and 24 show options for CO2 setpoint and "temp adj", respectively, in the present system.
Figure 24:
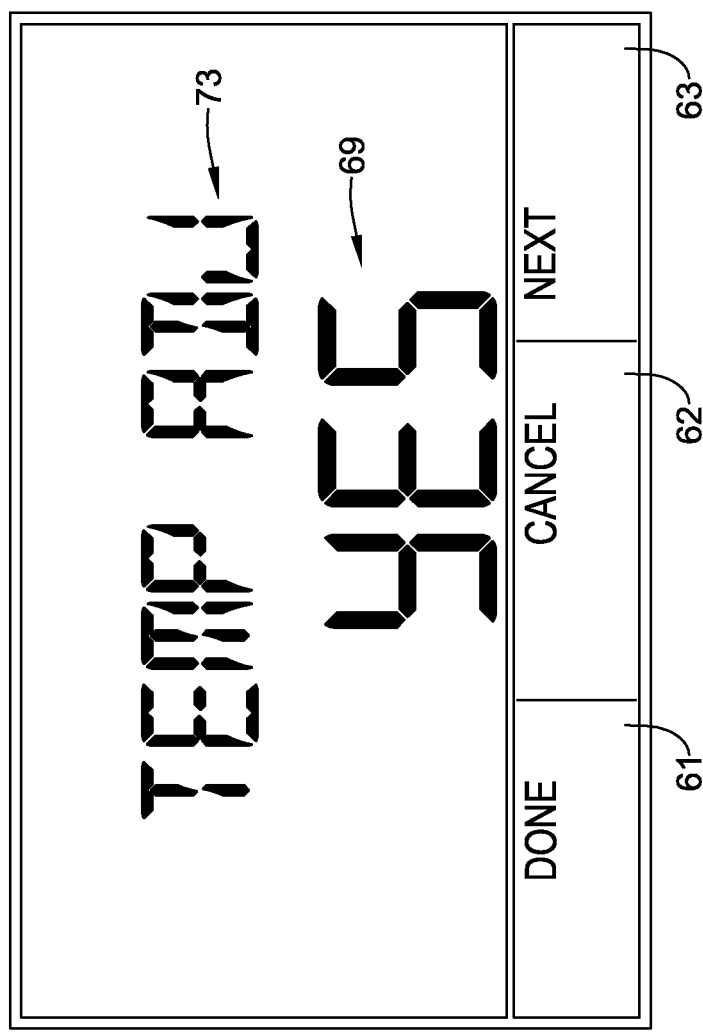
Figure 25:
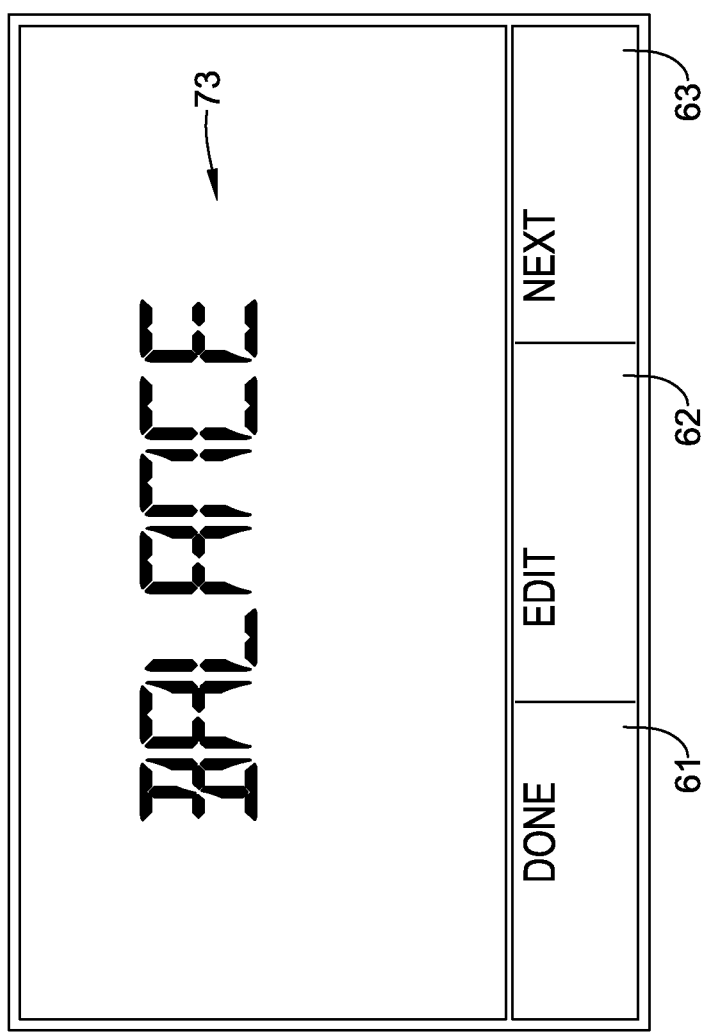
FIGS. 25, 26, 27 and 28 show screens of some categories such as balance, sensors, setpoints, and limits, respectively.
Figure 26:
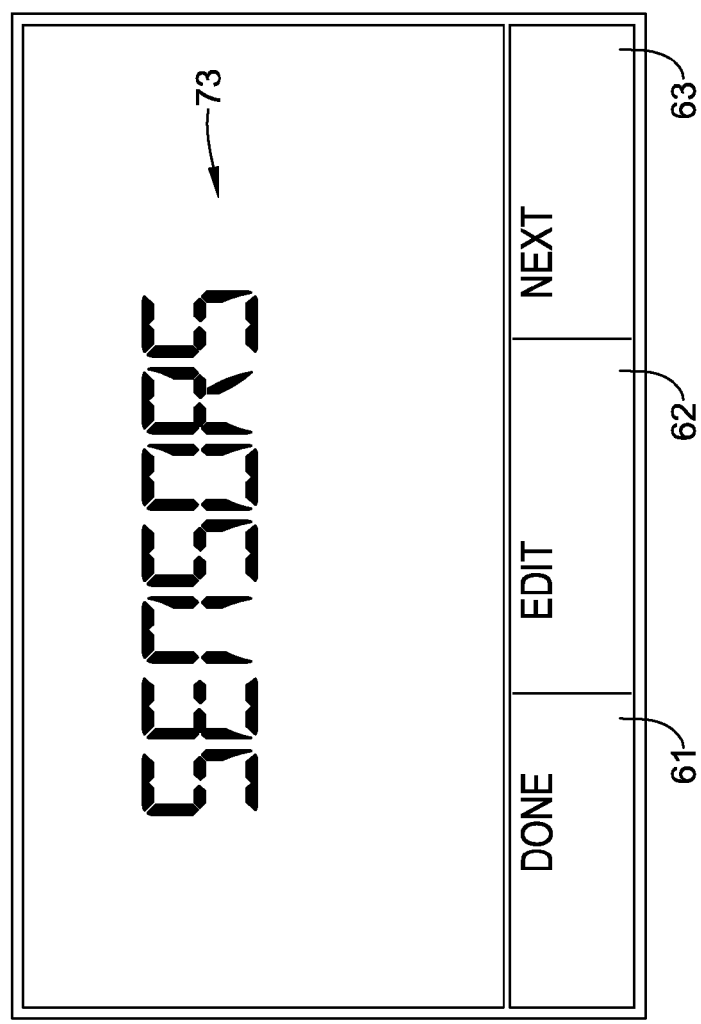
Figure 27:
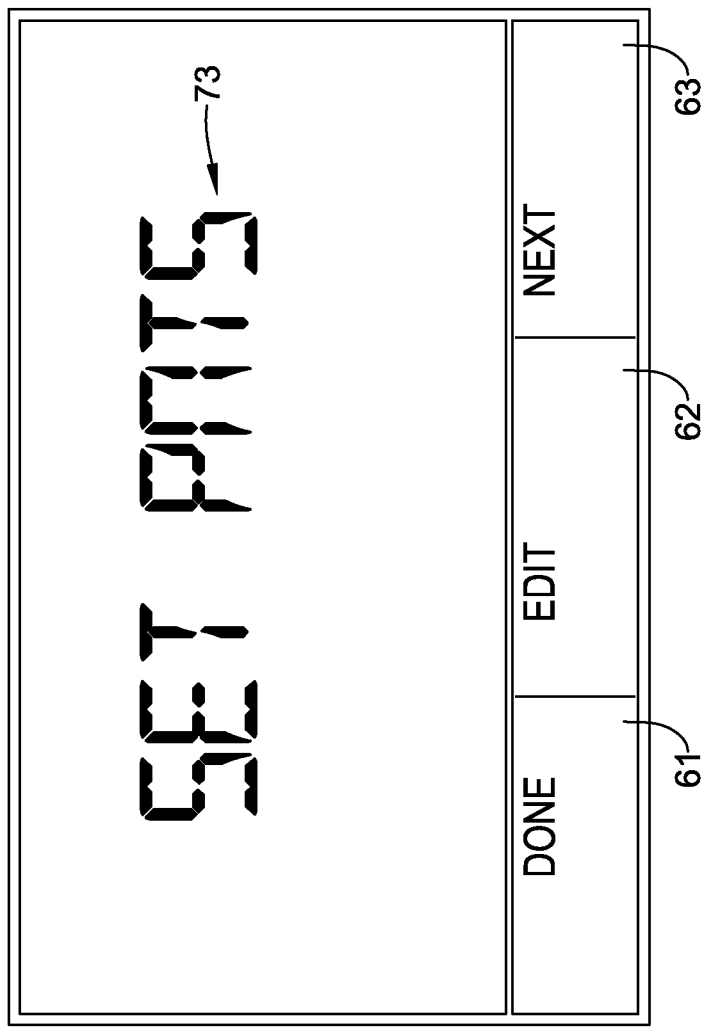
Figure 28:
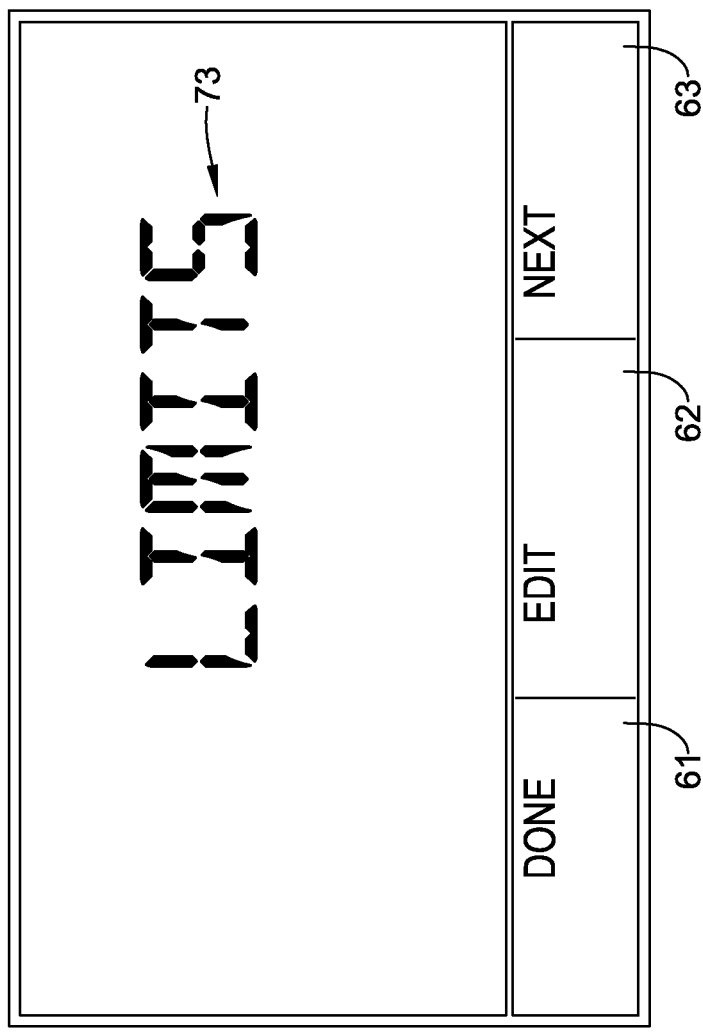
Figure 29A:
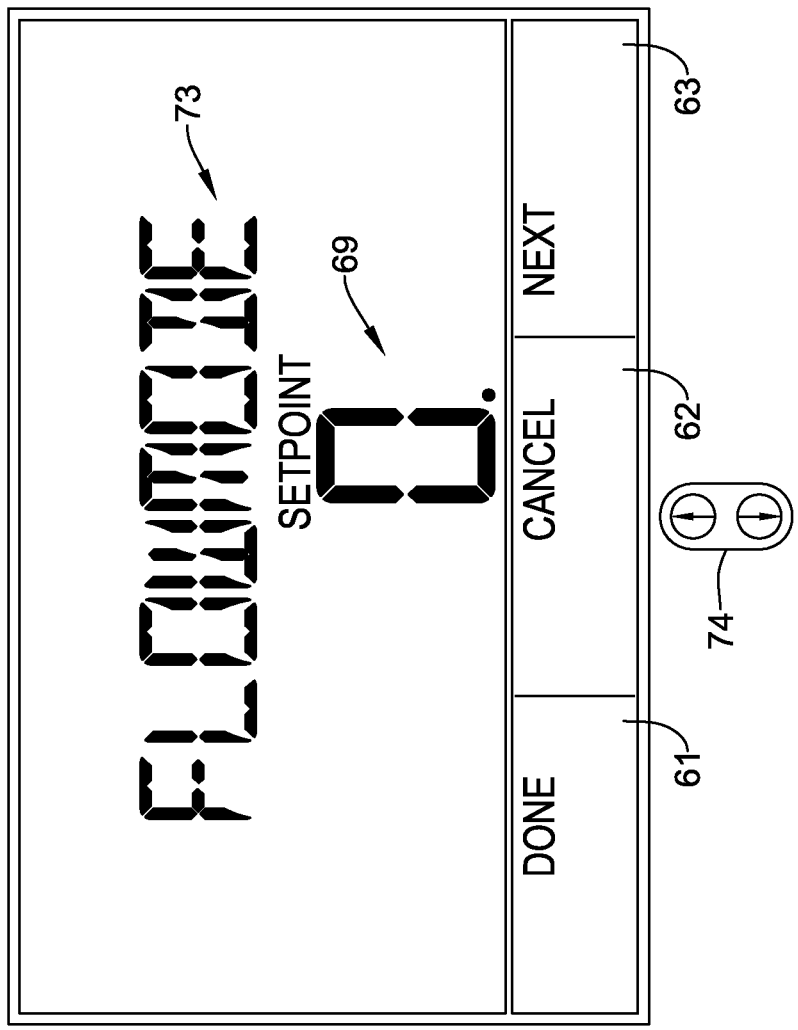
FIGS. 29a-33 show screens related to flow mode.
Figure 29B:
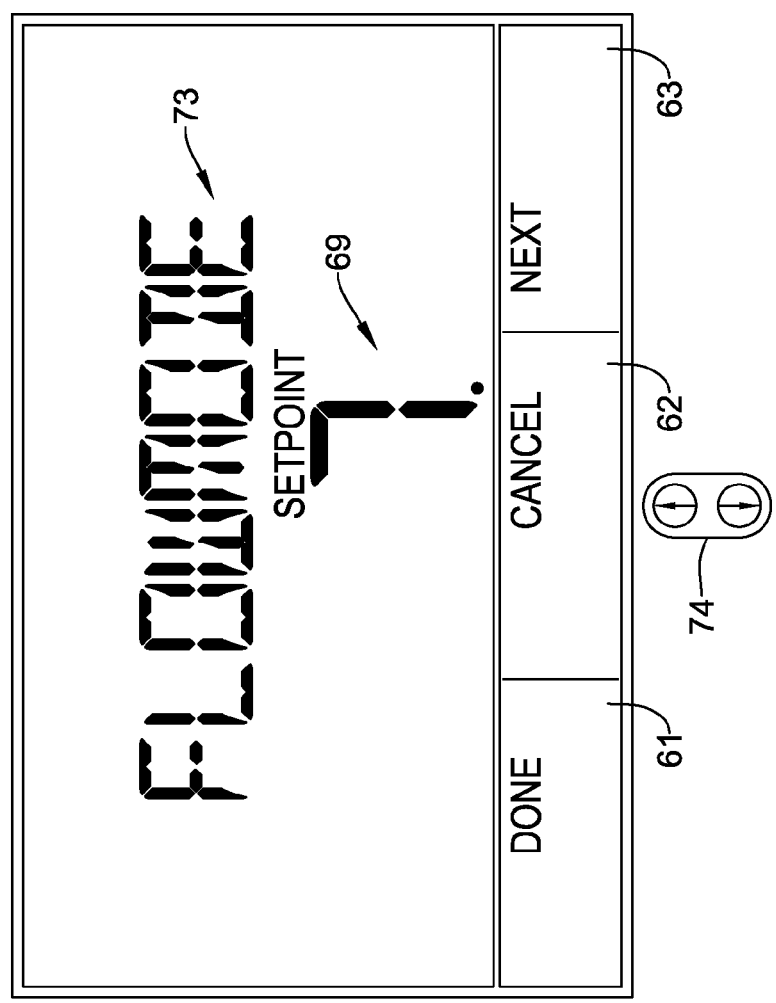

In the contractor/installer home mode screen 77, one may click on key 62 to go to "Set view more" in FIG. 13. Pressing the "Set view more" key 62 from the Contractor/Installer Home screen 77 may give the "Set View More" option 1. A word Yes/No may blink indicating that the setpoint, for example humidity, in FIG. 21 may be viewed by the tenant. Pressing Up/Down keys 74 may toggle between Yes and No. If Yes is selected as shown in FIG. 21, then the tenant may see this screen under the View More screens in the Tenant Mode. If No is selected as shown in FIG. 22, then the Tenant will not necessarily see this screen in the View More screens via key 63 in the Home screen 57 in FIG. 6. The in the latter situation, the screen may be available only at contractor/installer mode Parameters key 63 and corresponding block 83 of FIG. 12. Pressing the "Next" key 63 may have the screen go to the next "Set View More" option and save the selection from the previous screen. The next "Set View More" options 2 and 3 may be for a CO2 setpoint and "temp adj" in FIGS. 23 and 24, respectively, with yes/no toggling.

Pressing the Done key 61 may result in the value changed on this screen being saved and going back one level (i.e., returning to the Home screen 77). Pressing the Cancel key 62 may result in the value changed on the current screen being canceled (i.e., discarded), although all other changes made at this level may be saved, and going back one level (i.e., returning to Contractor/Installer Home screen 77). If the contractor leaves the wall module in the "Set View More" mode for more than (e.g., 10) seconds without a key press, then it may return to contractor/installer Home screen 77 and save changes on current screen.

One may go into the parameters block 83 (FIG. 12) by pressing key 63. One or the contractor should be in the Contractor/Installer mode screen 77 to change the parameters. By pressing the Parameters key 63 from the Contractor/Installer Home screen 77, category 1 of the parameters may be obtained. There should be at least one category configured to be able to go into the Parameter category screen. The contractor, via the Tool, may configure the names of the parameter categories, how many there are, and what parameters are in each category. The Tool may set up some fixed categories like balance, sensors, setpoints, and limits as shown in the screen of FIGS. 25, 26, 27 and 28, respectively, if appropriate for the present application. Other categories, such as offsets, may be set up.

Pressing the Next key 63 may take the screen into the next parameter category. Pressing the Done key 61 may return one level to the Contractor/Installer mode Home screen 77. The parameter saving may be done at the next level down. Pressing the Edit key 62 may move the screen down one level into the category chosen. Here, the first parameter in that category may be shown. The Up/Down keys 74 may be ignored. If the contractor leaves the wall module in the Parameter category mode for more than (e.g., 8) hours without a key press, then it may return one level to the Contractor/Installer Home screen 77. This timeout should be long enough to allow for the balancer to do its work.

After entering a category, the Edit key 62 may be pressed resulting in the first parameter in that category being shown. The value of the parameter may blink, if it's editable, indicating to the contractor that it can be changed with the Up/Down keys 74. Pressing the Next key 63 may move the screen to the next parameter in the present category. The contractor, via the Tool, may select the parameters, configure their names, determine how many there are, determine if certain parameters are editable, and configure the high and low limits, units, and increment amounts.

If the Done key 61 is pressed, then the value changed on the parameter screen may be saved and sent to the controller and the screen may go back one level (i.e., return to the parameter category screen. If the cancel key 62 is pressed, then the value changed on the current screen may be canceled (i.e., discarded), although all of the other changes made at this level may be saved, and the screen goes back one level (i.e., returns to level 1 Parameter category screen).

If the contractor leaves the wall module in the parameters edit mode for more than (e.g., 10) seconds without a key press, then it may return the screen one level to the parameter category screen and save all of the changes. The timeout may need adjustment to account for balancing. The Up/Down keys 74 may increment or decrement, respectively, the value shown by the increment amount. If value is not editable, and the contractor presses the up/down keys 74, then a screen showing "LOCKED" (FIG. 10c) may be displayed for 2 seconds. When the contractor presses and holds the up/down keys 74, the display may slew. There may be a slow slew rate and then a fast rate. Up/down keys 74 may be assumed to be proximate to screens having keys 61-63, even though not necessarily shown.

FIGS. 29-33 show examples of parameters in the balance category. In FIG. 29a, the balancer may set the flow mode parameter with setpoints such as "0" for normal, "1" for maximum flow and "2" for minimum flow, or "7" for maximum flow and "6" for minimum flow as shown in FIGS. 29b, 32a, 32b, and 32e. In FIG. 29b, a user may change a flow mode (nciFlowOverride_State) from zero to seven and press the NEXT key 63.

Figure 30:
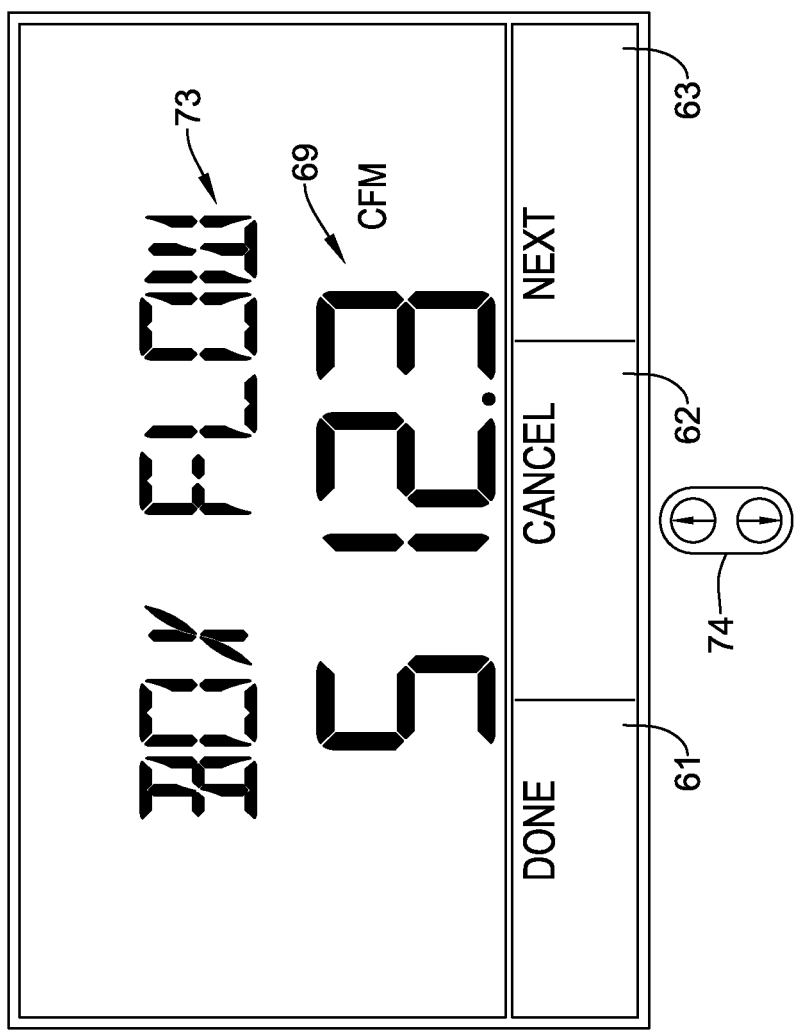
Figure 31:
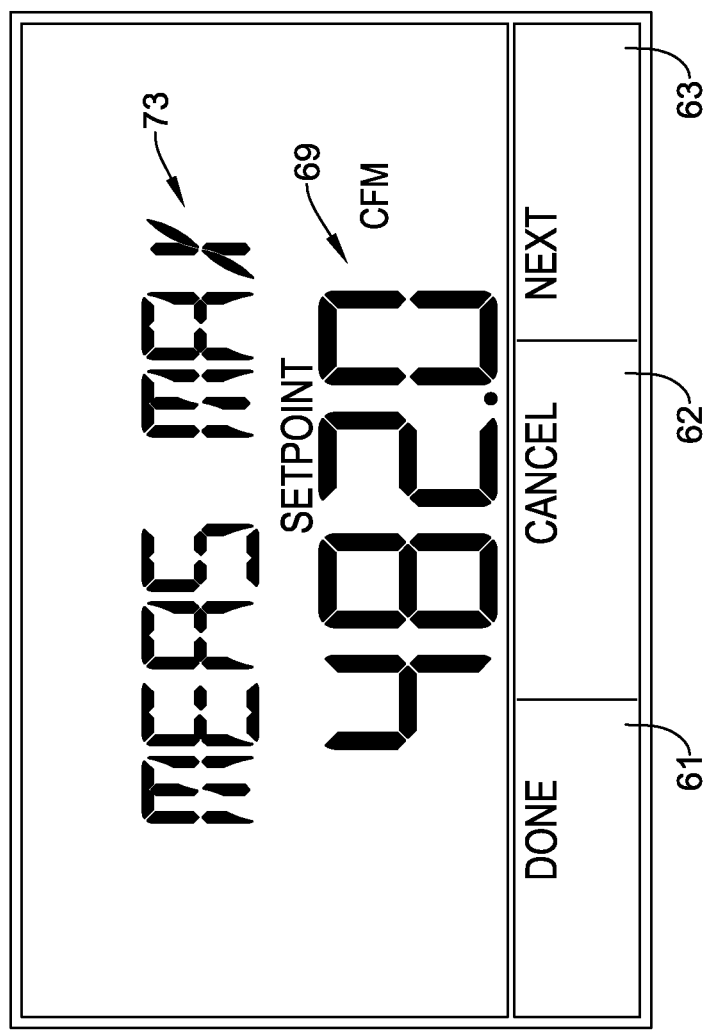
Figure 32A:
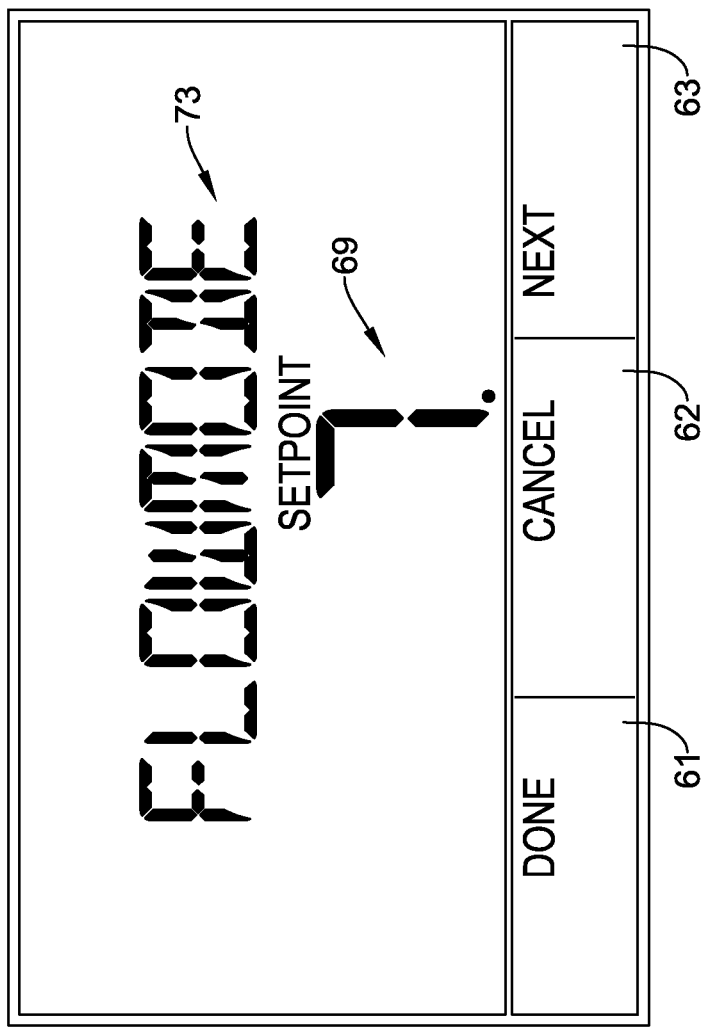
Figure 32B:
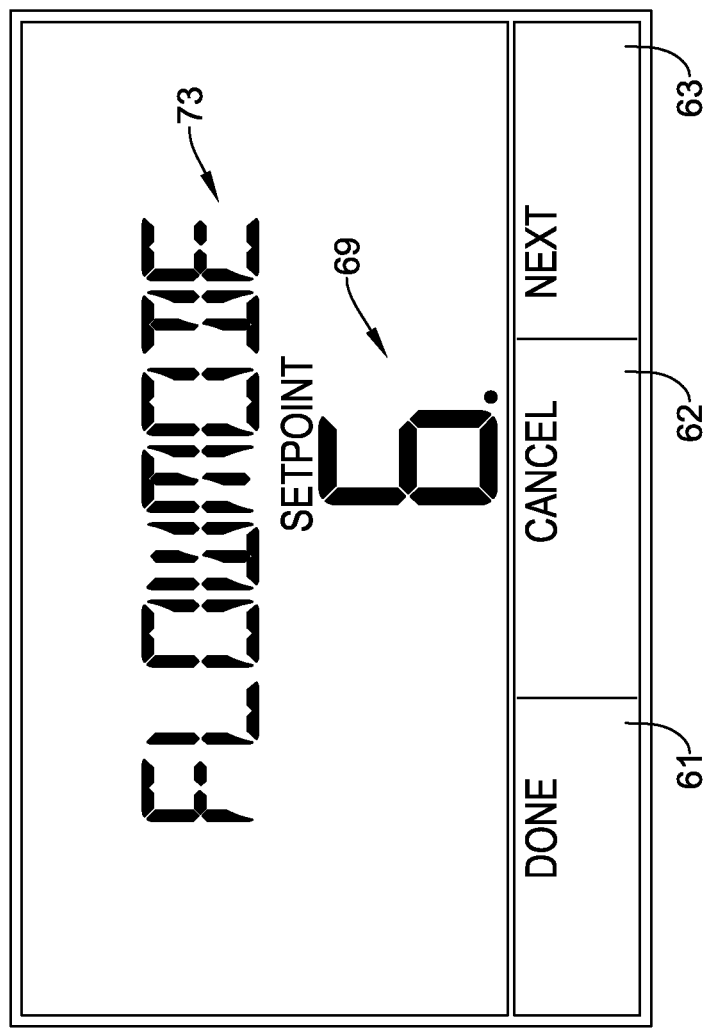
Figure 32C:
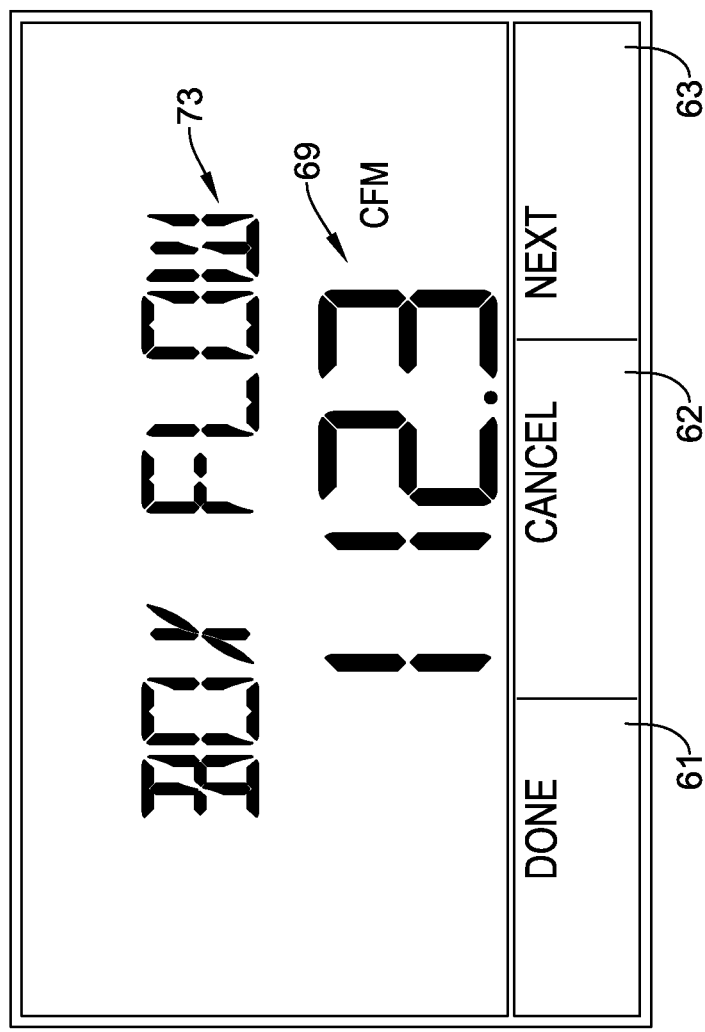
Figure 32D:
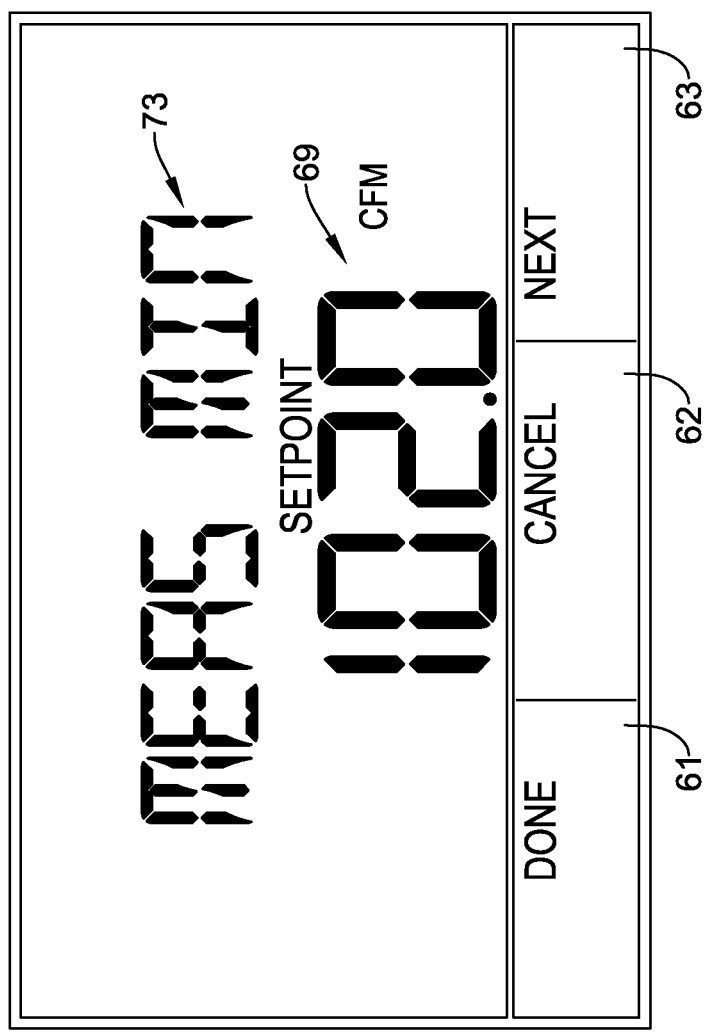
Figure 32E:
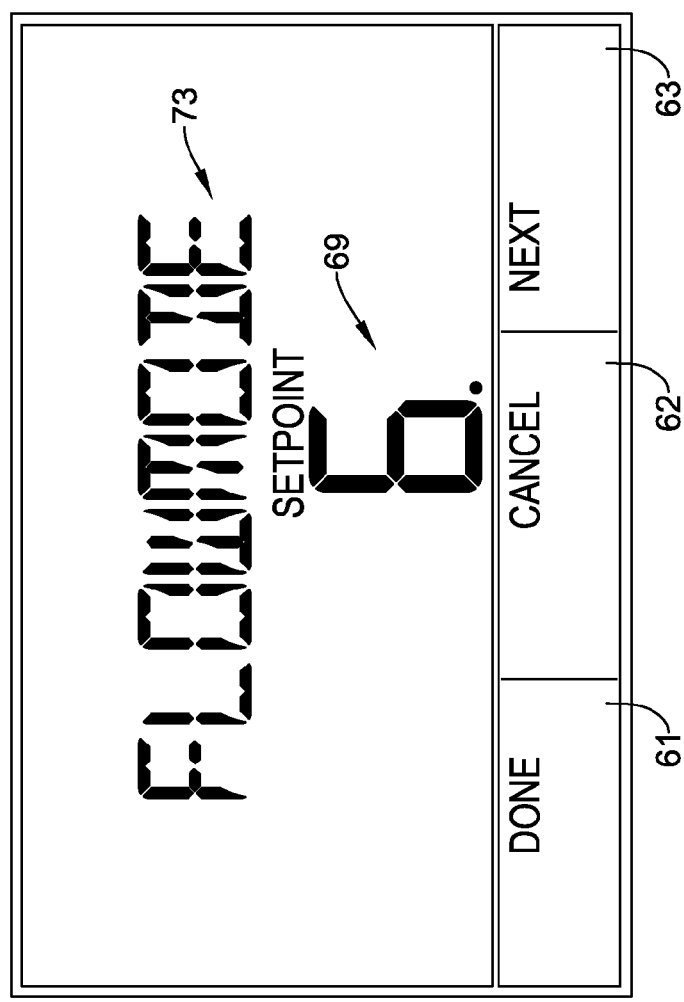
Figure 33:
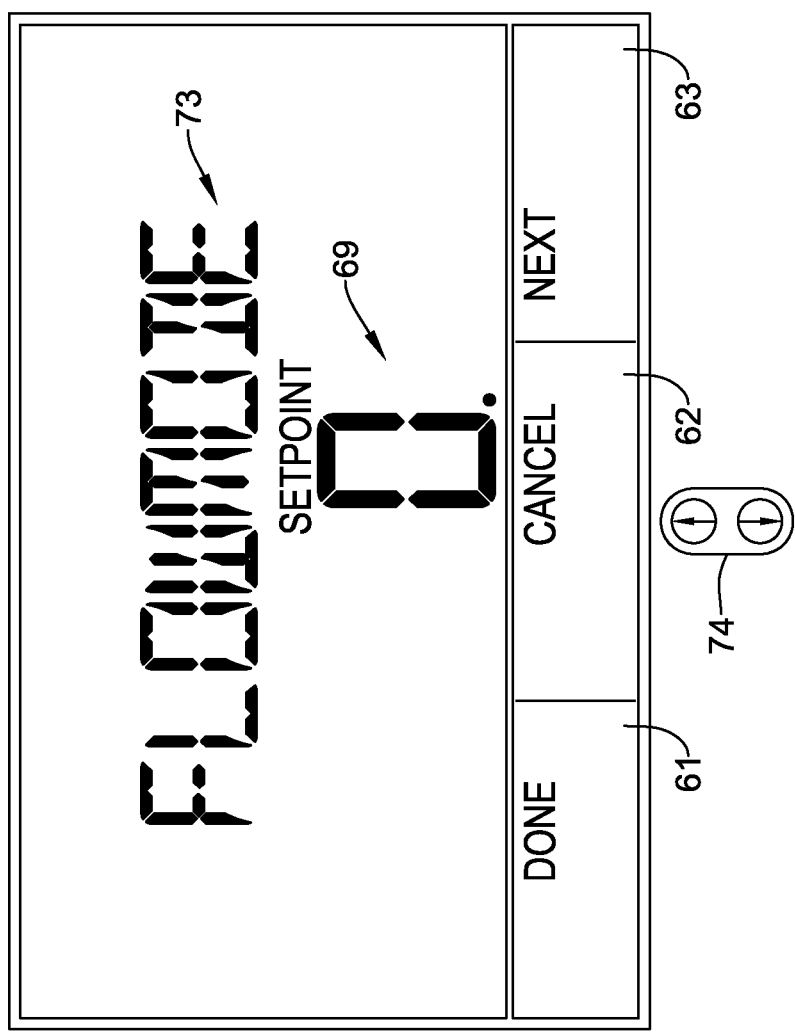

The screen of FIG. 30 shows an actual box flow (nvoBoxFlow), for instance, 512.3 CFM. Balancer may wait for the flow reading to stabilize and press the NEXT key 63. FIG. 31 shows a screen where the balancer may enter in a reading of a flow measurement, e.g., 482.0 CFM, from a hood and press the NEXT key 63 (nciMeasMaxFlowC). The next screen in FIG. 32a shows the flow mode again. The balancer may change the mode to a minimum (6), as in FIG. 32b, and press the NEXT key 63. The next screen of FIG. 32c shows an example of an actual box flow (nvoBoxFlow) of 112.3 CFM. The balancer may wait for the flow reading to stabilize and press the NEXT key 63. In the next screen, the balancer may enter in a measured minimum reading of flow (nciMeasMinFlowC) from the hood and enter it as a setpoint as shown in FIG. 32d, and the press the NEXT key 63. The next screen shows a flow mode (6) again in FIG. 32e. The balancer may exit the balancing mode by changing the mode to zero (0) and pressing the DONE key 61. One may note that there are seven parameters in this sequence (FlowMode, BoxFlow, MeasMax, FlowMode, BoxMode, MeasMin, FlowMode). The tool/user could instead choose, for instance, only to have four parameters in the sequence and use the NEXT key 63 to select the right one in the sequence of operation (e.g., FlowMode, BoxFlow, MeasMax, MeasMin).

Figure 34:
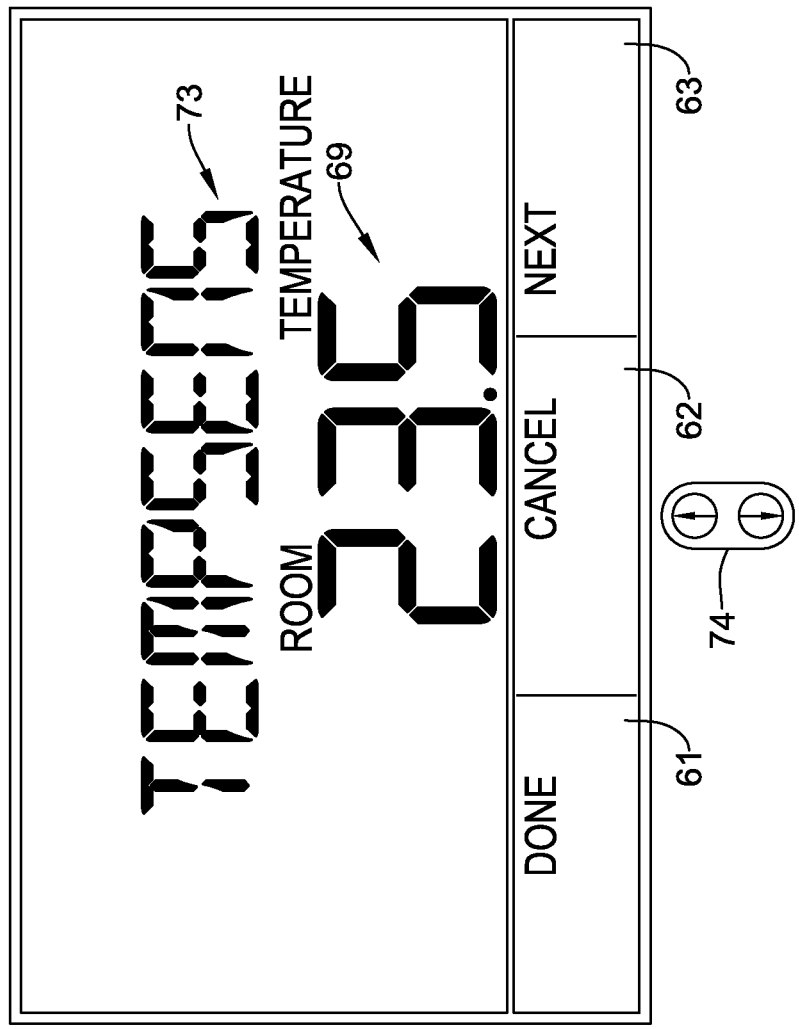
FIGS. 34-36 show screens of example parameters in the sensors category.
Figure 35:
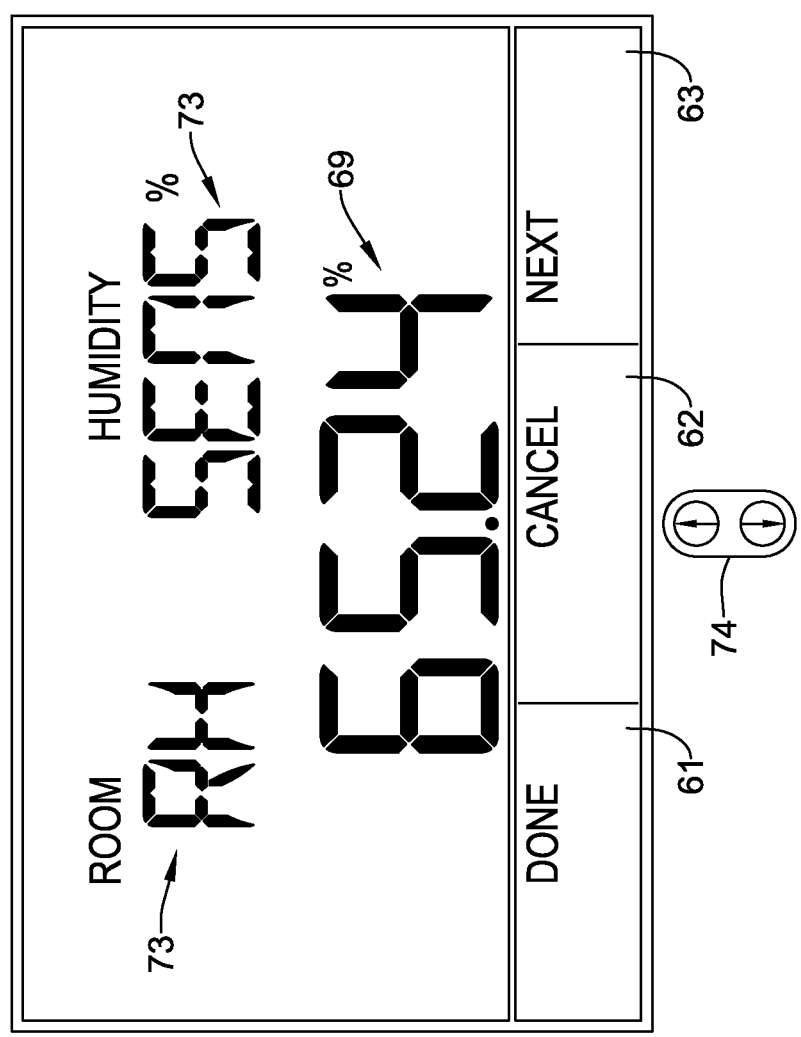
Figure 36:
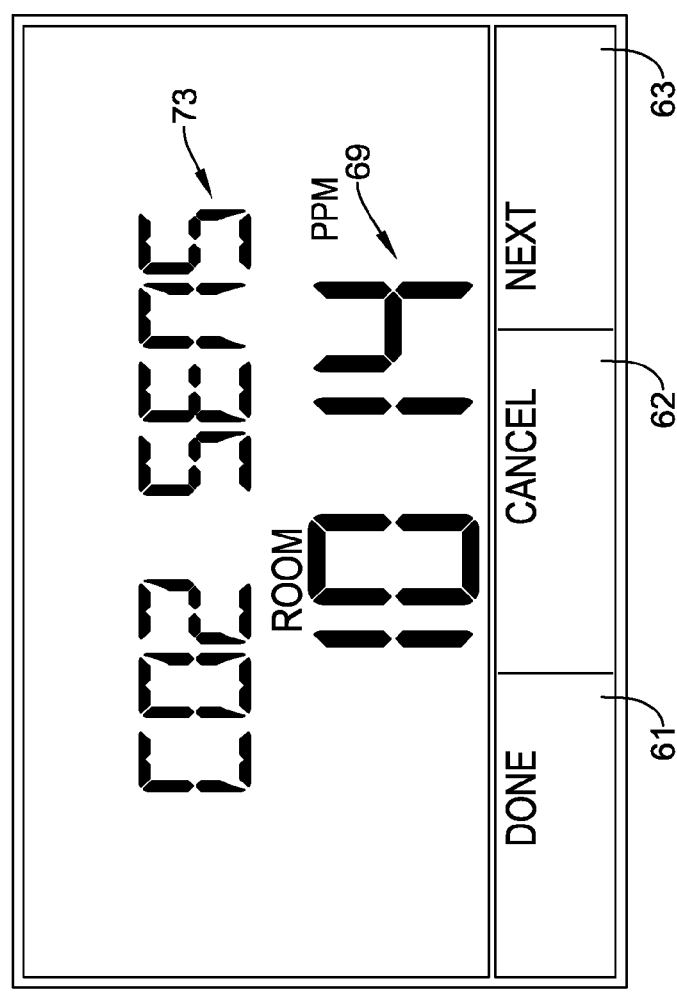
Figure 37:
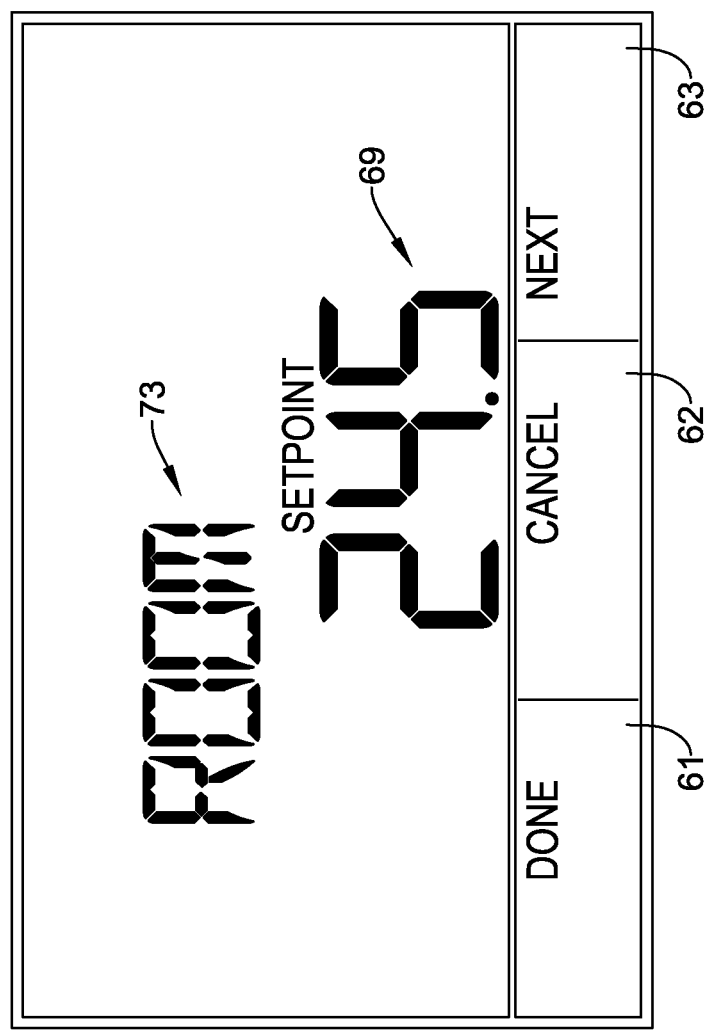
FIGS. 37-41 show screens of example parameters in the setpoints category.
Figure 38:
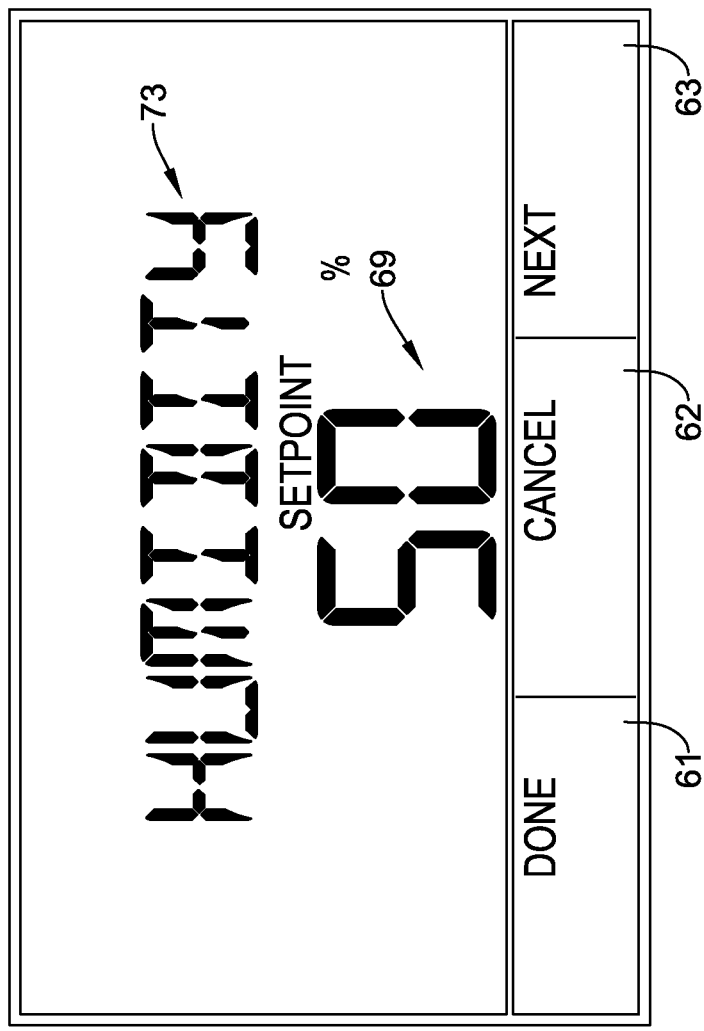
Figure 39:
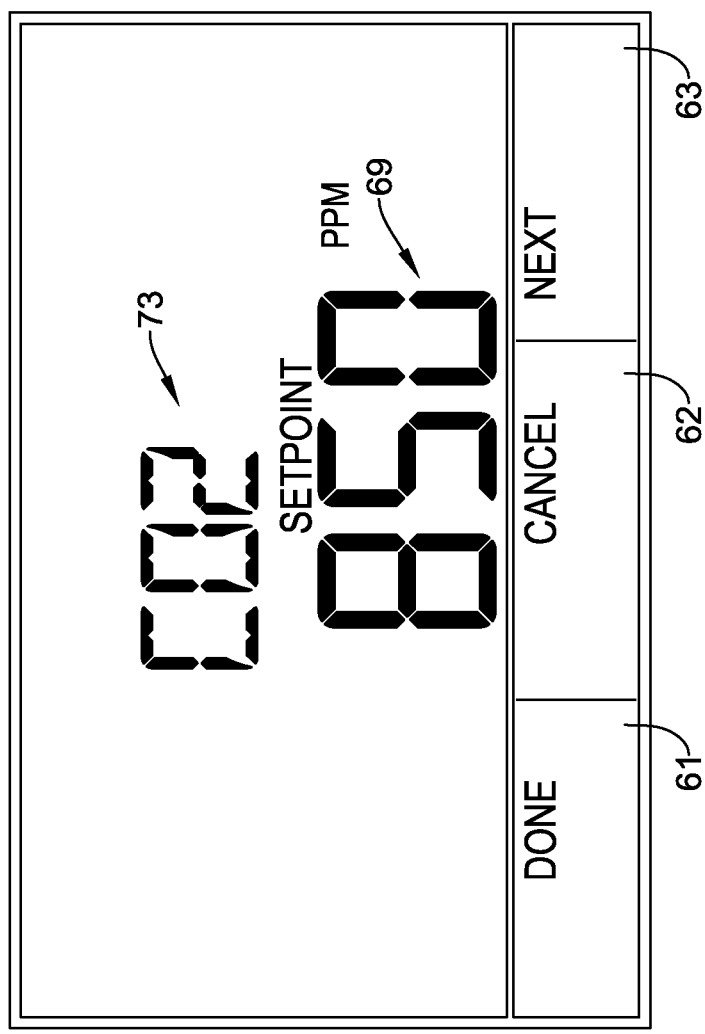

Example parameters of the sensors category are shown in FIGS. 34-36. FIG. 34 shows a sensor screen which may indicate 23.5 degrees C. for a room temperature. A room relative humidity sensor indicated in a screen of FIG. 35 may show a reading of 65.24 percent. A CO2 sensor for a room may indicate 1014 PPM according to a screen in FIG. 36.

Figure 40:
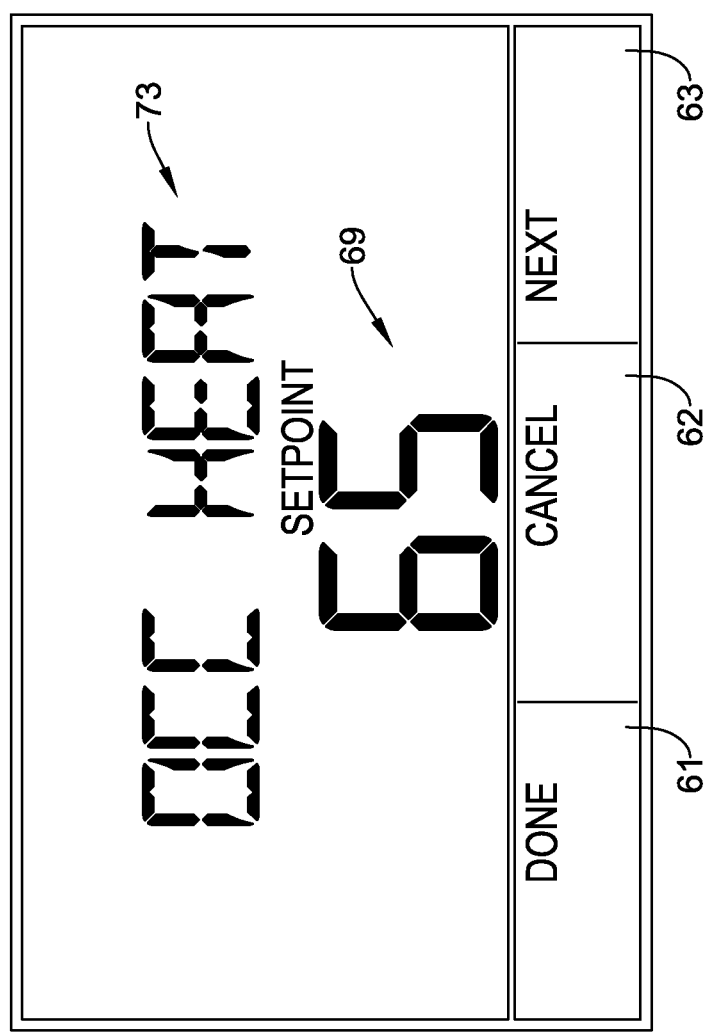
Figure 41:
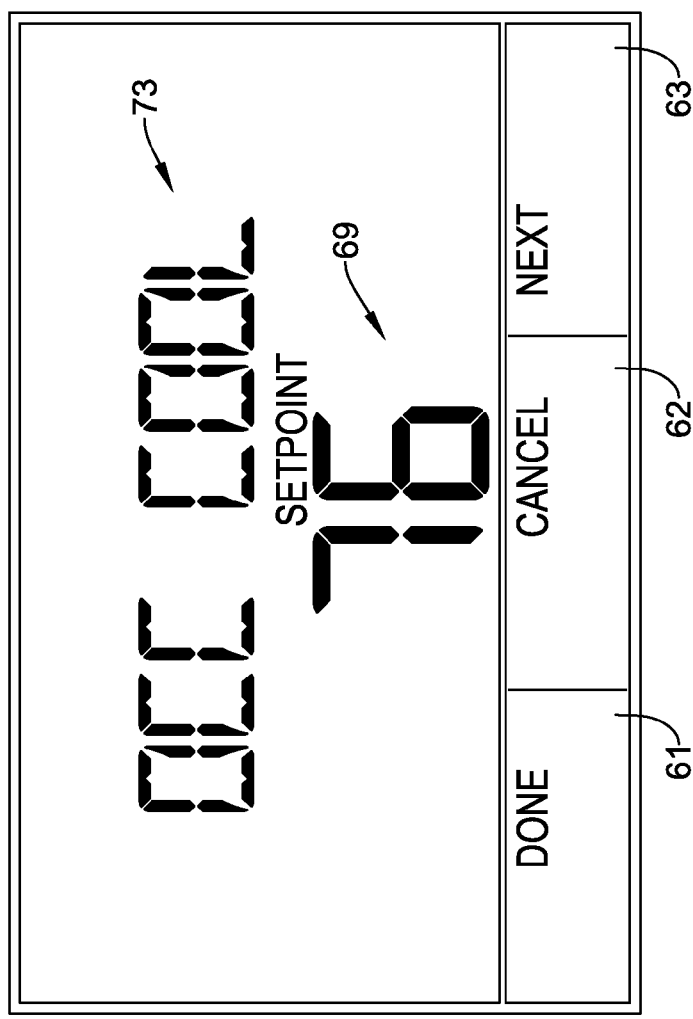

FIGS. 37-41 show example parameters for a setpoints category. A room temperature setpoint may be at 24.5 degrees C. in a screen shown in FIG. 37. A humidity setpoint may be put at 50 percent in the screen of FIG. 38. A setpoint for CO2 may be at 850 PPM in the screen of FIG. 39. Occupancy heat and cool setpoints may be set at 65 degrees and 76 degrees F., respectively, as shown in the screens of FIGS. 40 and 41.

Figure 42:
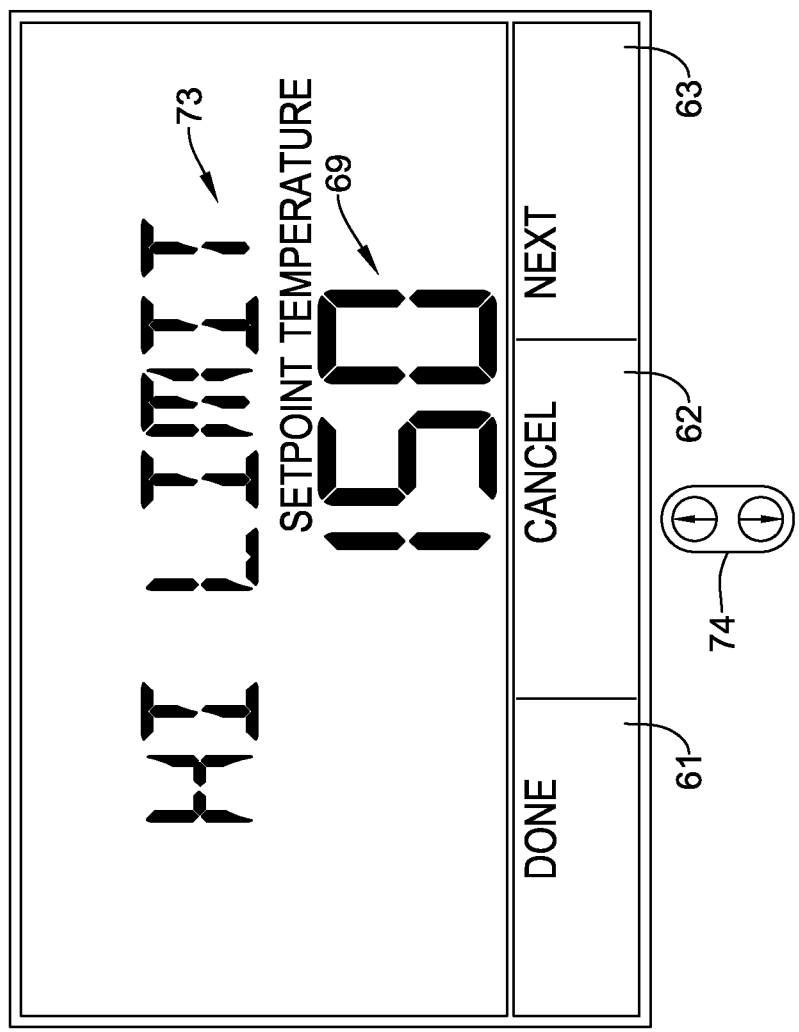
FIGS. 42 and 43 show screens of example parameters in the limits category.
Figure 43:
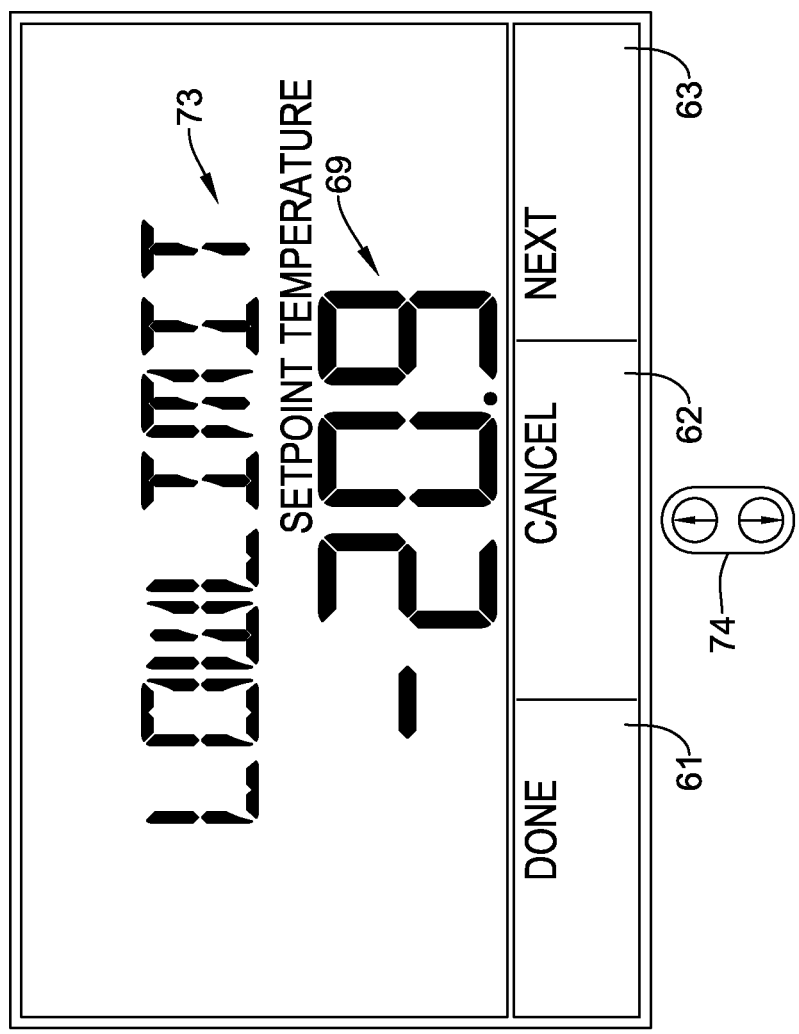

Examples of parameters in a limits category are revealed in FIGS. 42 and 43. A high limit setpoint temperature may be set at 150 degrees F., as indicated in a screen of FIG. 42. A low limit setpoint temperature may be set at −20.9 degrees F., as indicated in FIG. 43.

Figure 44:
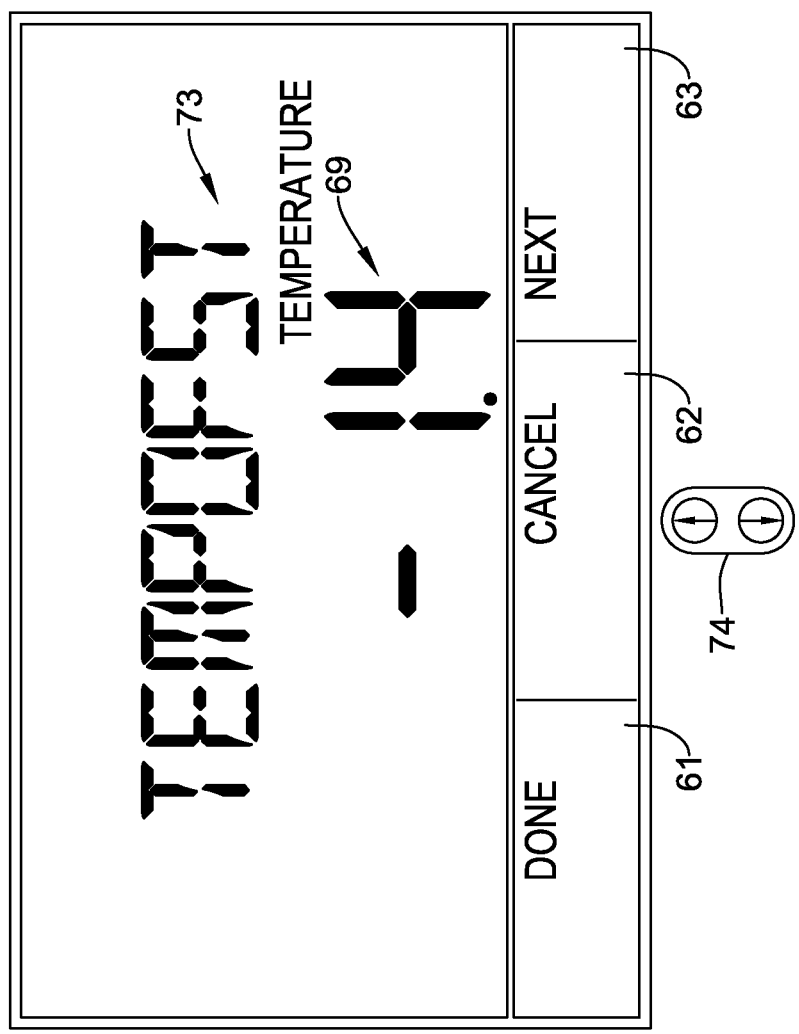
FIGS. 44-46 show screens of example parameters in the offsets category.
Figure 45:
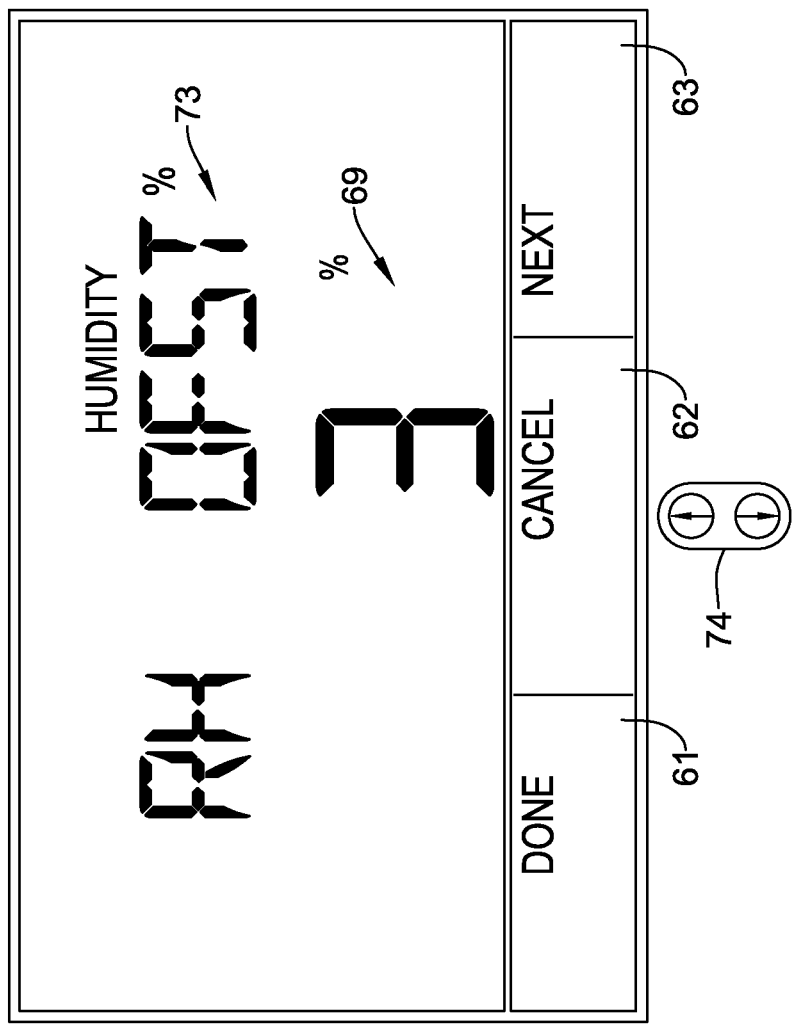
Figure 46:
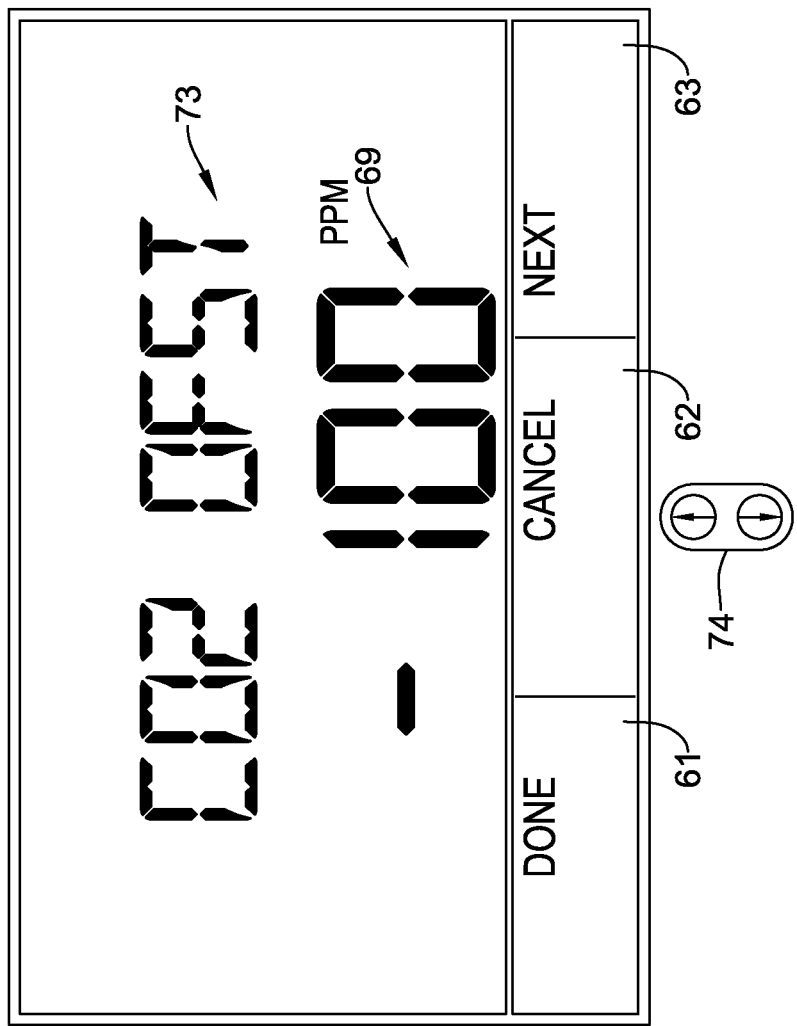

FIGS. 44-46 show examples of parameters in the offsets category. An offset temperature may be set at −1.4 degrees in the screen of FIG. 44. A relative humidity offset may be put at 3 percent in the screen as shown in FIG. 45. The screen shown in FIG. 46 may indicate a CO2 offset of −100 PPM.

Other features of the present system may permit enumerated values to be displayed/modified on the parameters, view more and home screens. The home screen may show a label value instead of two numbers in the top alphanumeric area 73. The parameter and view more screens may show one or two numbers in the label area.

Navigation approaches may be noted. A loop approach may be illustrated in FIGS. 47-52. An item of this approach may involve an installer screen 100 of FIG. 47. There may be three soft keys 101, 102 and 103. There may be up and down keys 104 and 105, respectively. The soft keys may have labels associated with them. The labels for each soft key may be one of two or three possible labels. The labels that are for the keys 101, 102 and 103 in FIG. 1 may be sensors, configuration variables ("config var") and parameters. These labels for illustrative purposes in the Figures may be in bold capital letters although they do not necessarily appear in such format on the actual display of a module. The other labels not affected by the soft keys may be in non-bold lower case letters. In the actual display the latter labels generally would not be visible to the user unless the display was in a setting or loop where one of the other labels is to be subject to a pressing of a soft key. Just one label for each soft-key may be applicable at one time. An arrow 106 associated with a key in the Figures may indicate that such key is being pressed. The actual pressing of the soft key 101, 102 or 103 may be on the label 101, 102 or 103 itself on the screen, like that of a touch screen, or it may be a button below the corresponding label.

Also in screen 100 may be an upper display area 107 and a middle display area 108. Areas 107 and 108 may display alpha-numeric symbols composed of segments. A lower display area may include the soft key labels 101, 102 and 103, and may be also regarded in some models as the respective soft key press areas.

There may be three (more or less) predefined loops 111, 112 and 113 of information instead of one large loop. There could be more or less loops. Relative to the screen in FIG. 47, the loops may include for example, sensors, configuration variables and parameters. Each loop may have individual identified components. The sensor loop 111 may include sensor 1, sensor 2 and sensor 3. There could be more or less sensors in the loop. The configuration variable loop 112 may include variable (var) 1, variable 2, variable 3 and variable 4. There could be more or less variables in the loop. The parameter loop 113 may include parameter 1, parameter 2, parameter 3 and parameter 4. There could be more or less parameters in the loop.

When key 101, with the label sensors, is pressed, "sensor 1" may appear in display area 107, as shown in FIG. 2. That means the sensors loop 111 may be selected and sensor 1 of the loop marked under the loop 111 list with a dark box 114 next its name. The status of the sensor 1 may be on as indicated by display area 108. The labels for soft keys 101, 102 and 103 may now become Back, Next and Done, respectively. Key 102 may be pressed, as indicated by arrow 106, having the label "next" to result in sensor 2 in display area 107 and marked with a black box in the sensors loop 111 list in FIG. 48 The sensor 2 may be the "next" sensor in loop 111. The status of sensor 2 may be shown to be "off" as indicated by display area 108.

Figure 47:
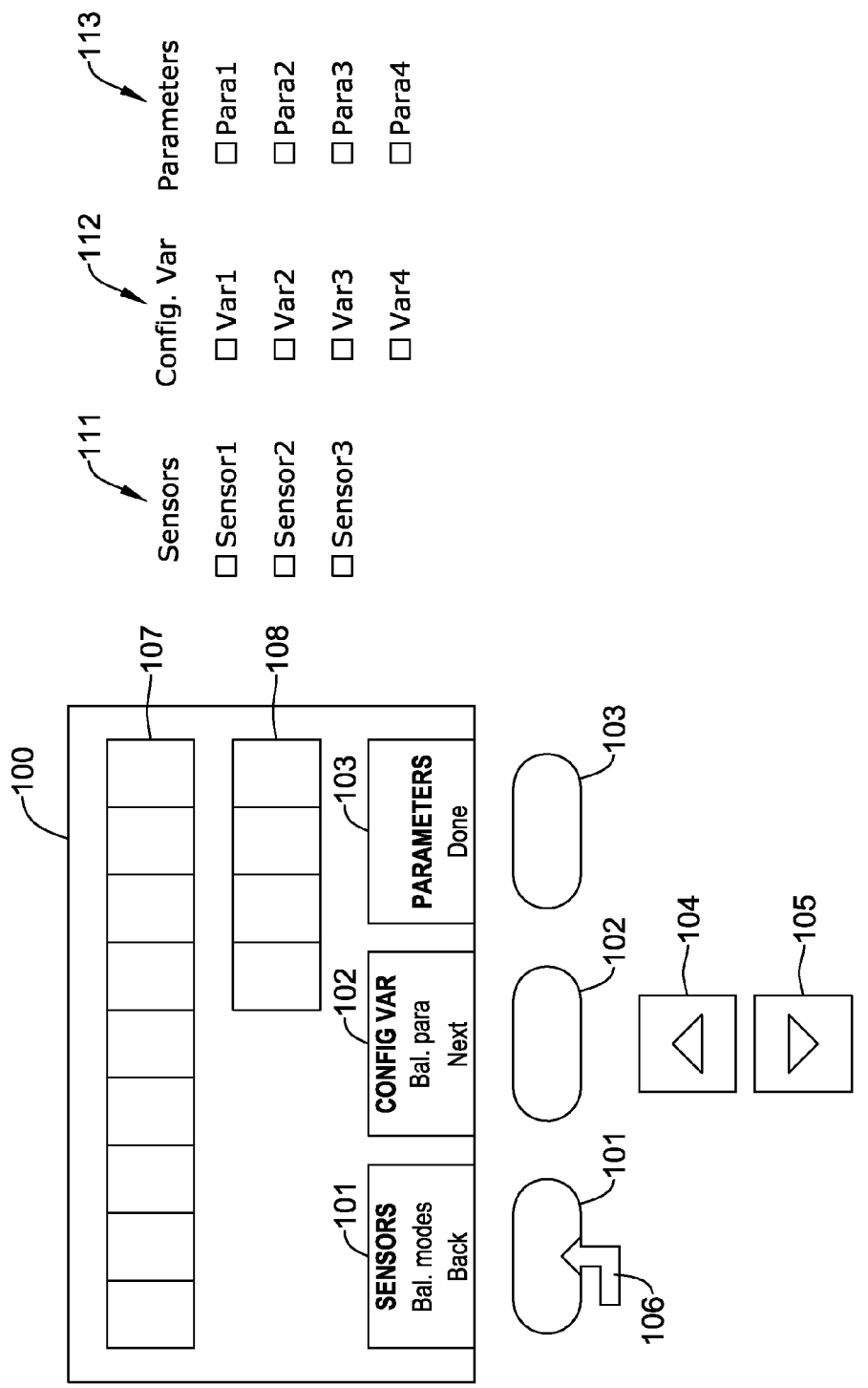
FIGS. 47-52 are diagrams of a loop navigation approach.
Figure 48:
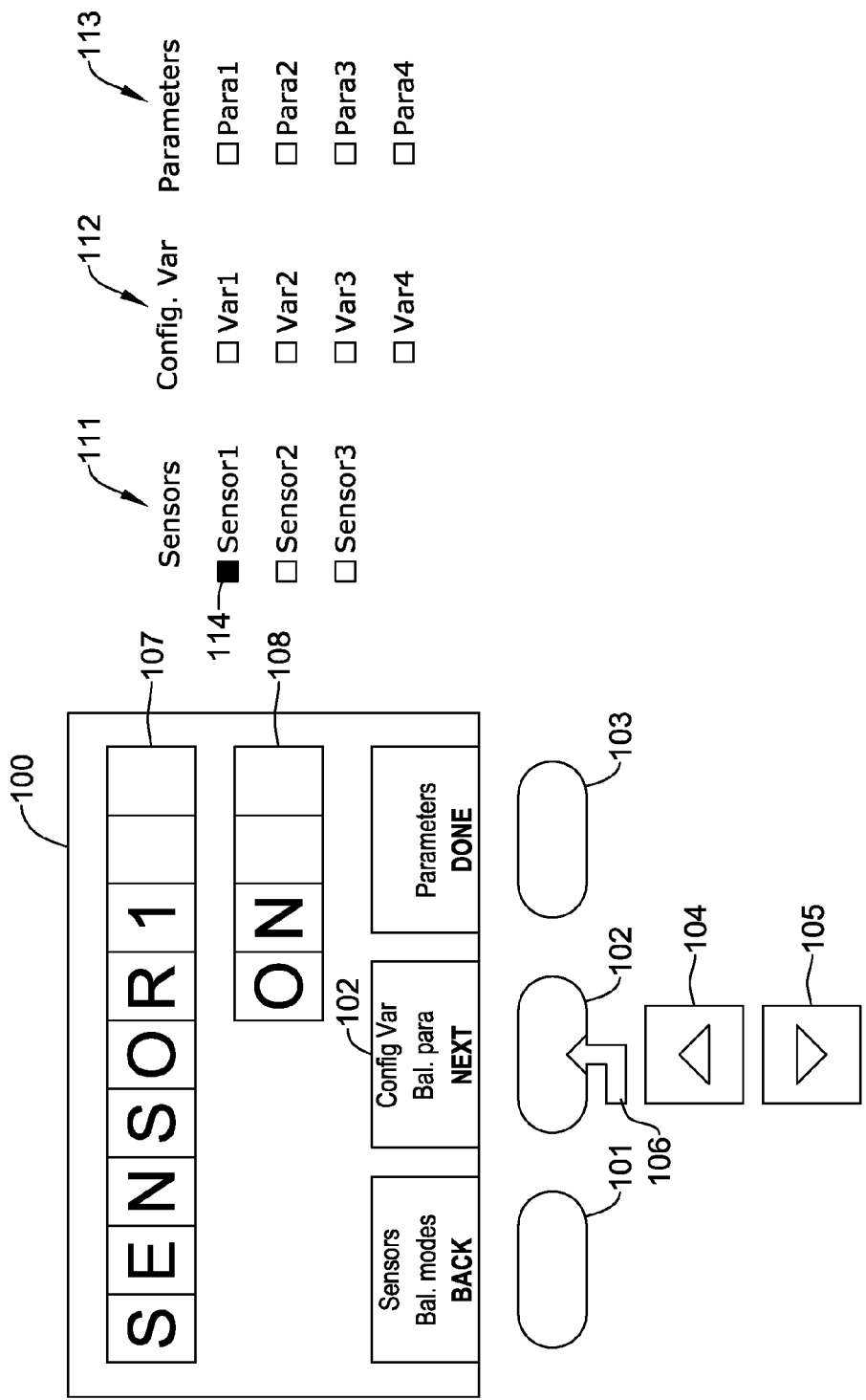
Figure 49:
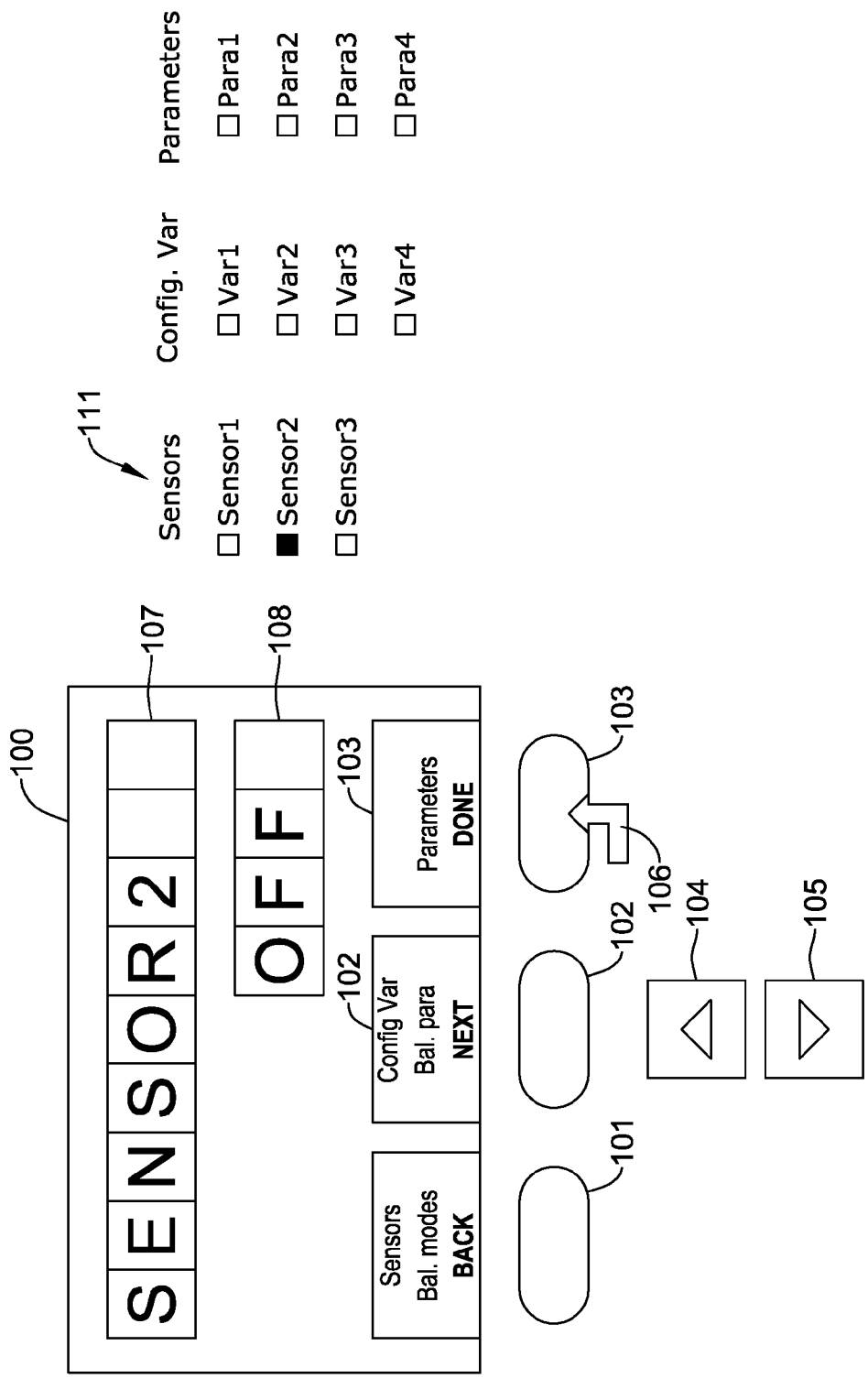
Figure 50:
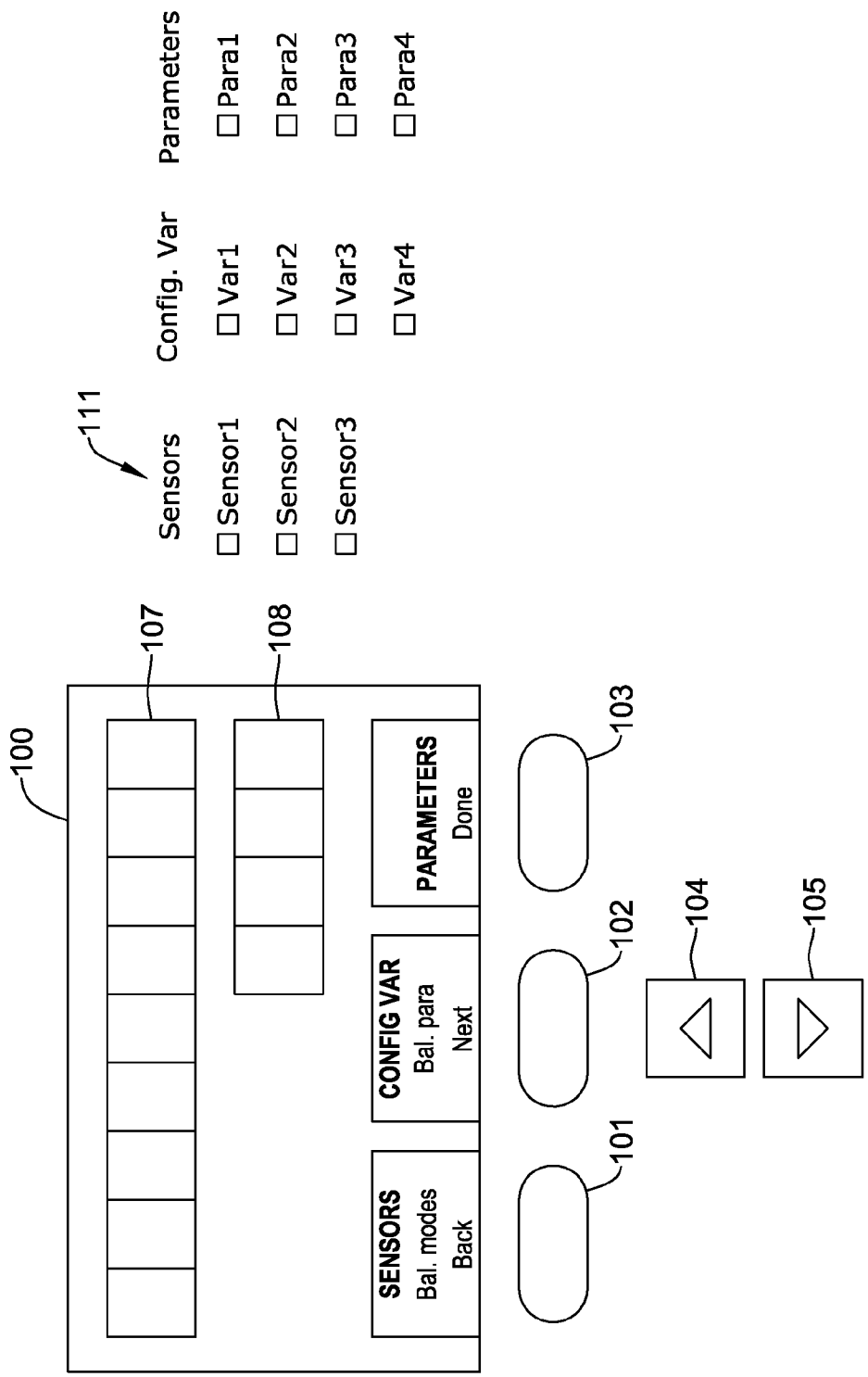

The key 103 may be pressed as noted by arrow 106 to indicate done in FIG. 49, as shown in the lower display portion, which returns the system back to the original screen as indicated in FIG. 47 without the pressing of a soft key as shown in FIG. 50.

Figure 51:
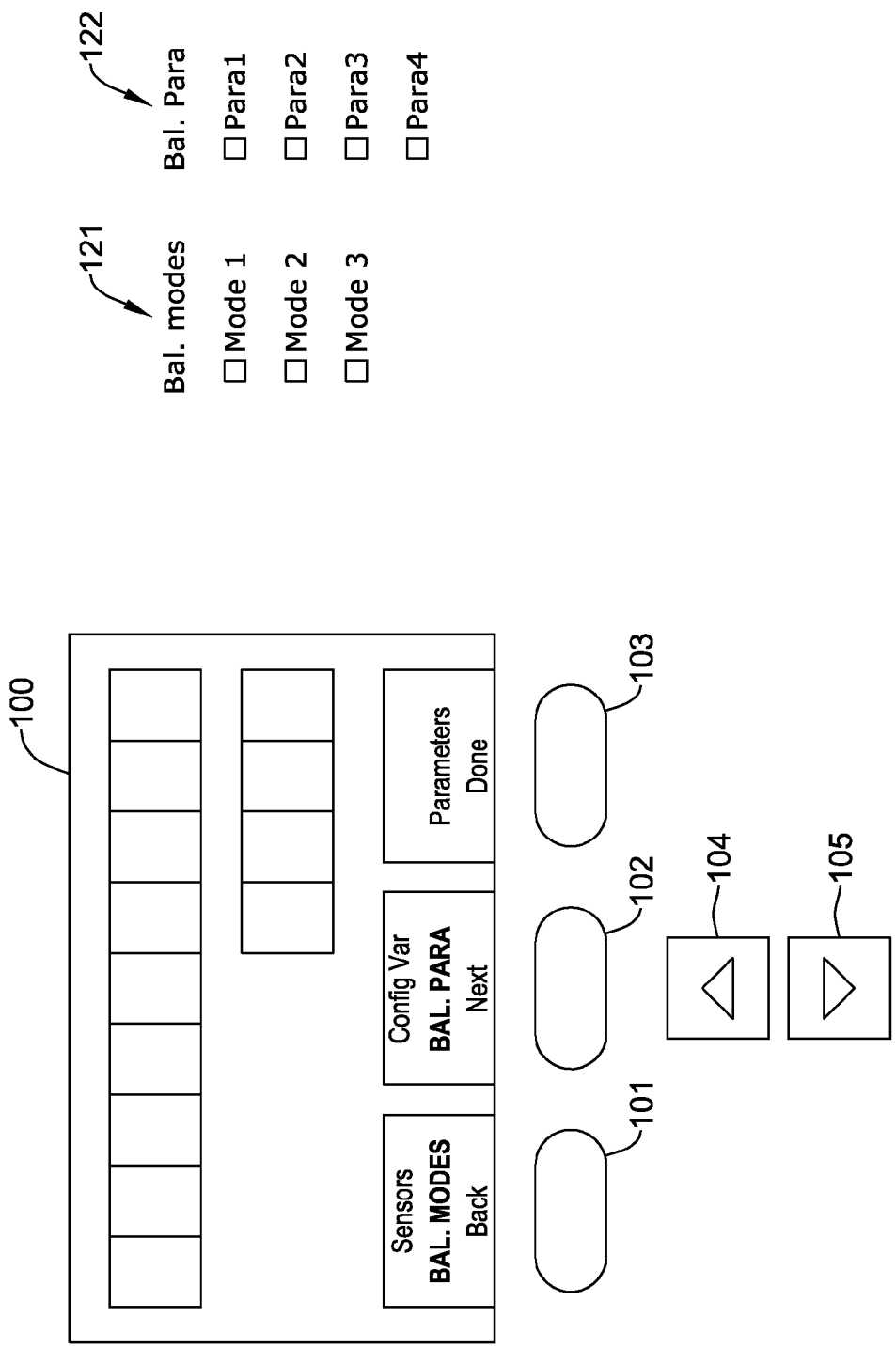

One may leave the installer portion of Figures and go to a balancer version of screen 100 with labels "balancer modes" (bal. modes) and "balancer parameters (bal. para) for keys 101 and 102, respectively, in FIG. 51. A balancer mode loop 121 may list modes 1, 2 and 3. There may be more or less modes. A balancer parameter loop 122 may list parameters 1, 2, 3 and 4. There may be more or less parameters. Also, there may be more or less balancer loops.

Figure 52:
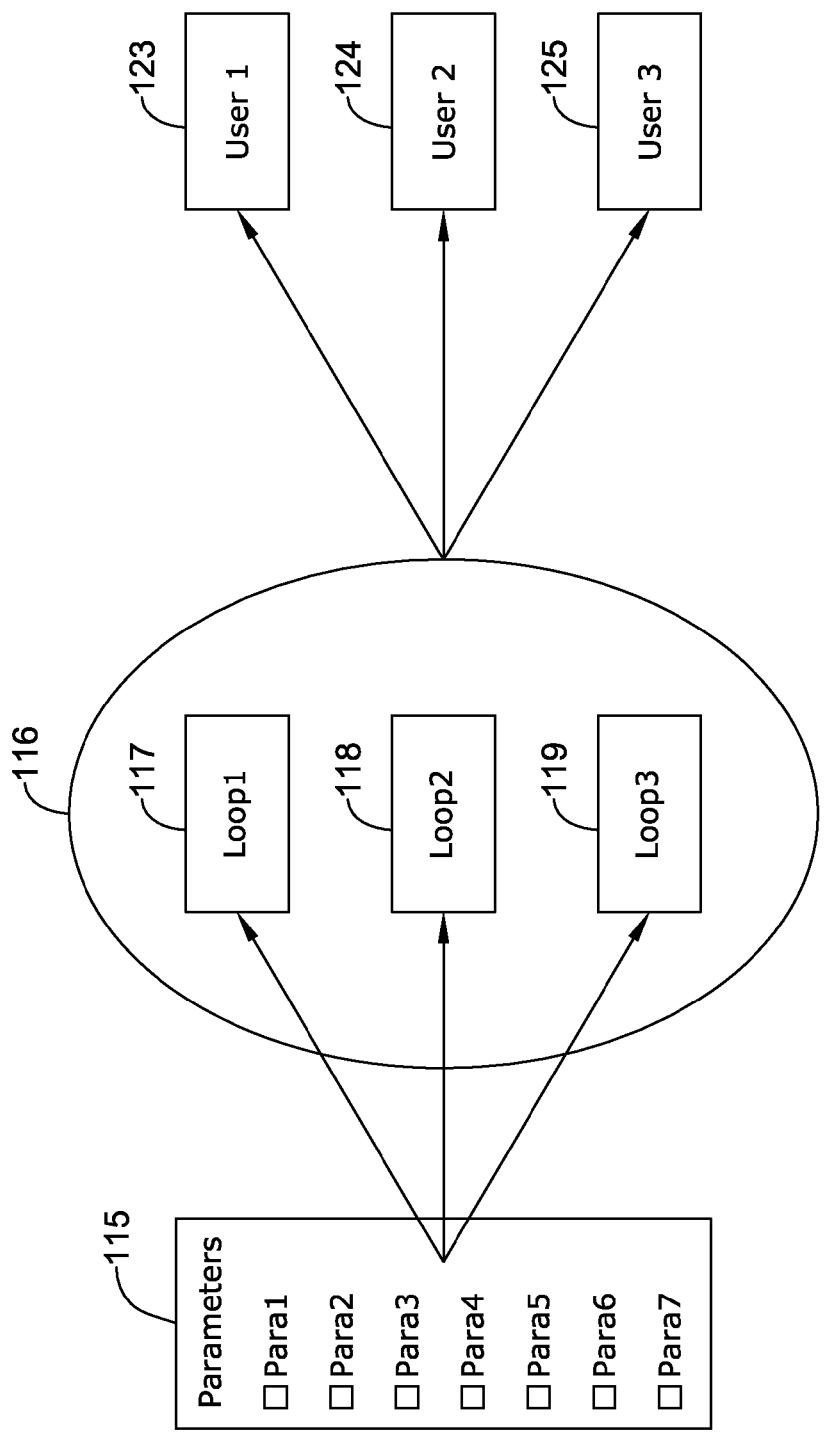

FIG. 52 is a diagram of a tool for configuring what parameters 115 are to go in each loop of the group 116 of loops. The may be parameters 1-7 of the group 115. There may be three loops 117, 118 and 119 in group 116. There may be three users 123, 124 and 125 tied in with the group 116 of loops. There may be more or less parameters, loops and users.

Figure 53:
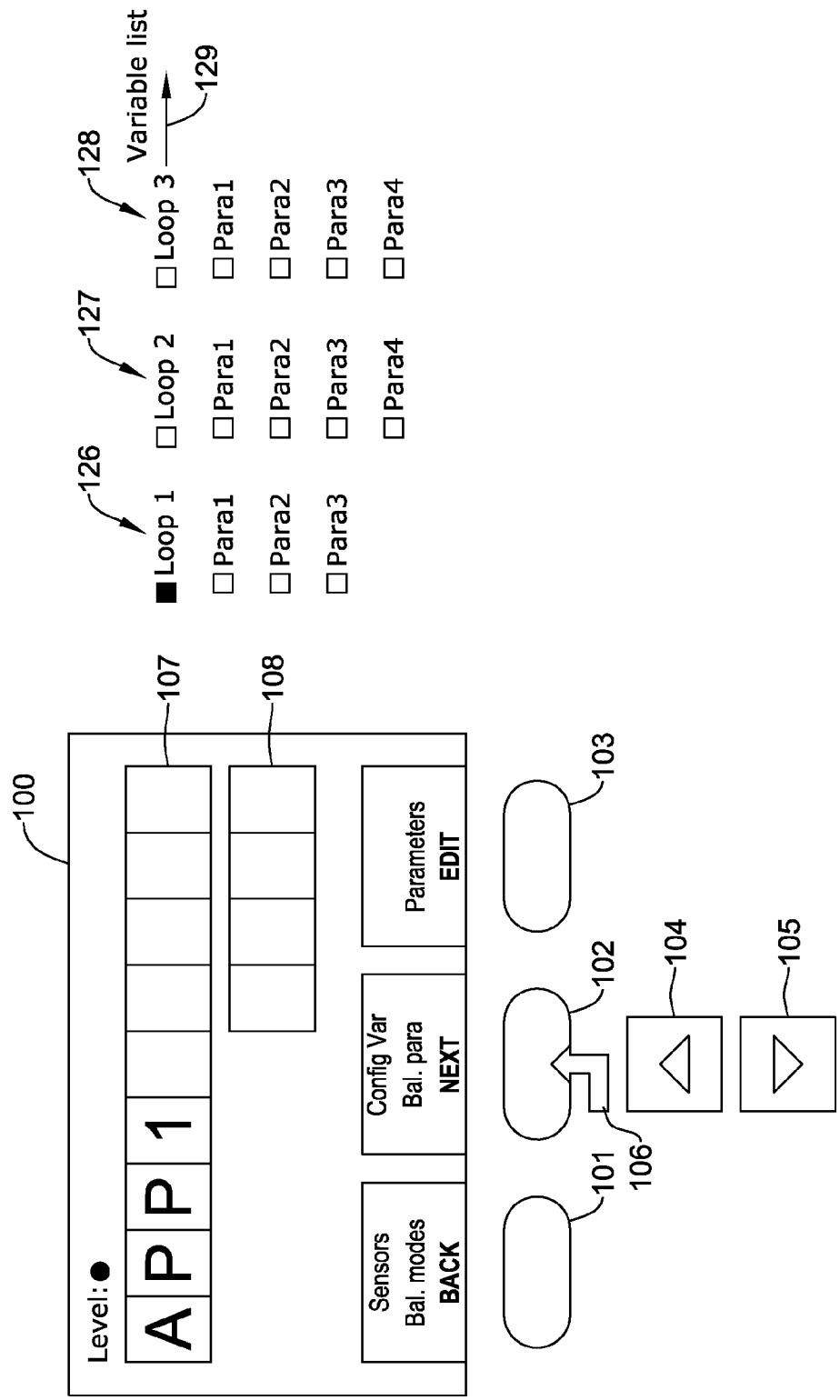
FIGS. 53-56 are diagrams of an edit navigation approach.

An edit approach of navigation may be illustrated in FIGS. 53-56. FIG. 53 shows screen 100 with "APP1" in display area 107. The screen 100 is for any user. It has a one dot level. The soft keys 101, 102 and 103 are now for back, next and edit, respectively. Instead of a selected number of loops, such as three loops 126, 127 and 128, with loop 2 checked with a dark box, there may be a variable list or number of loops, as indicated by arrow 129, such as more or less than three. The hierarchy is a 2-level one.

Figure 54:
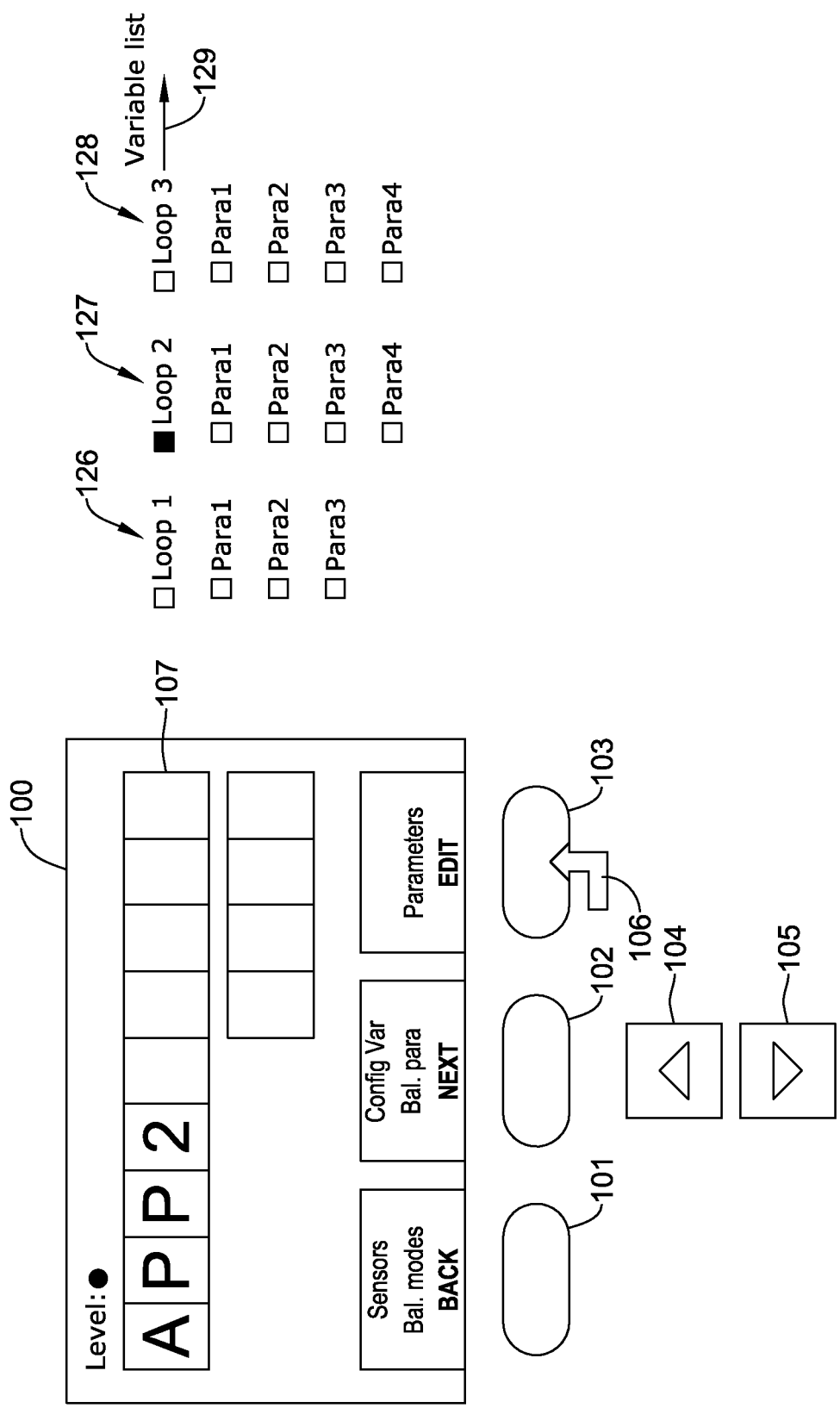
Figure 55:
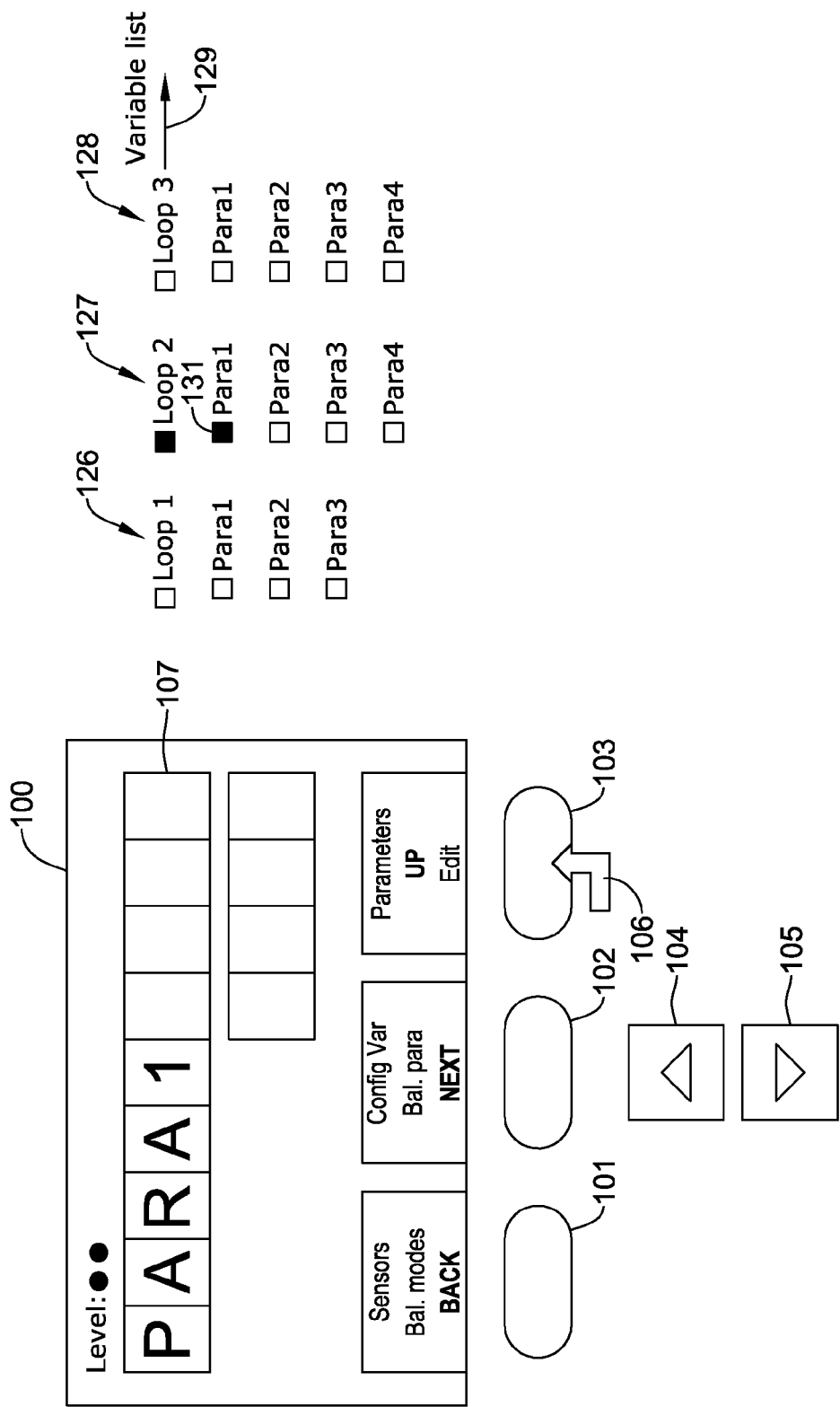
Figure 56:
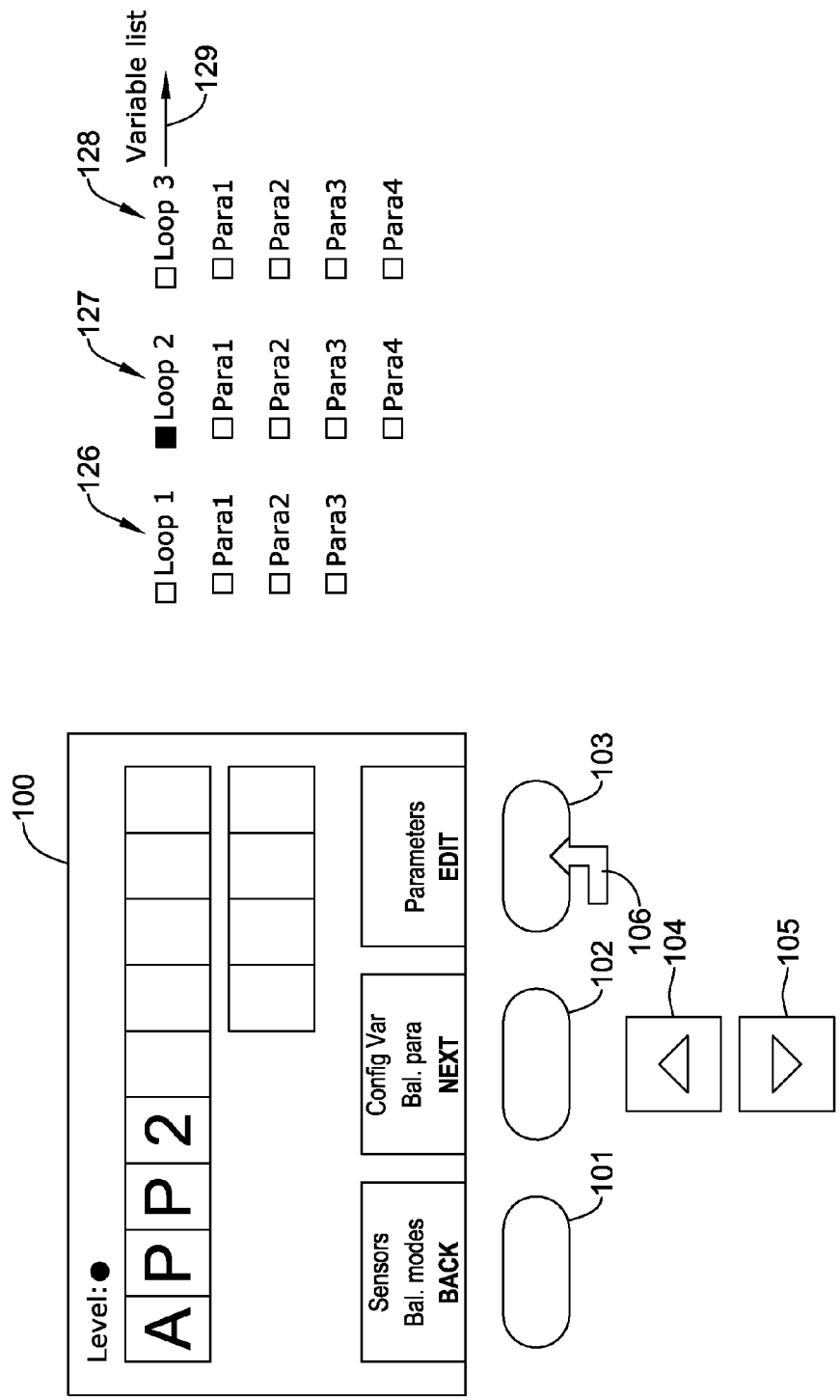

With arrow 106 pressing on key 102 in FIG. 53, then a next screen 100 may appear as shown in FIG. 54. The differences are that APP2 may appear in display area 107, and arrow 106 may indicate a pressing of key 103 for an edit which brings the user to the screen as shown in FIG. 55. Screen 100 may be at a 2 dot level of the hierarchy, and shows PARA 1 in display area 107. The level in area 107 may correspond to the dark box 131 selection of the second loop 127 and the first parameter (Para 1). Arrow 106 may be pressing on key 10 which has a label "up" to result in the display 100 in FIG. 56 which appears to be the same as that of FIG. 54.

Figure 57:
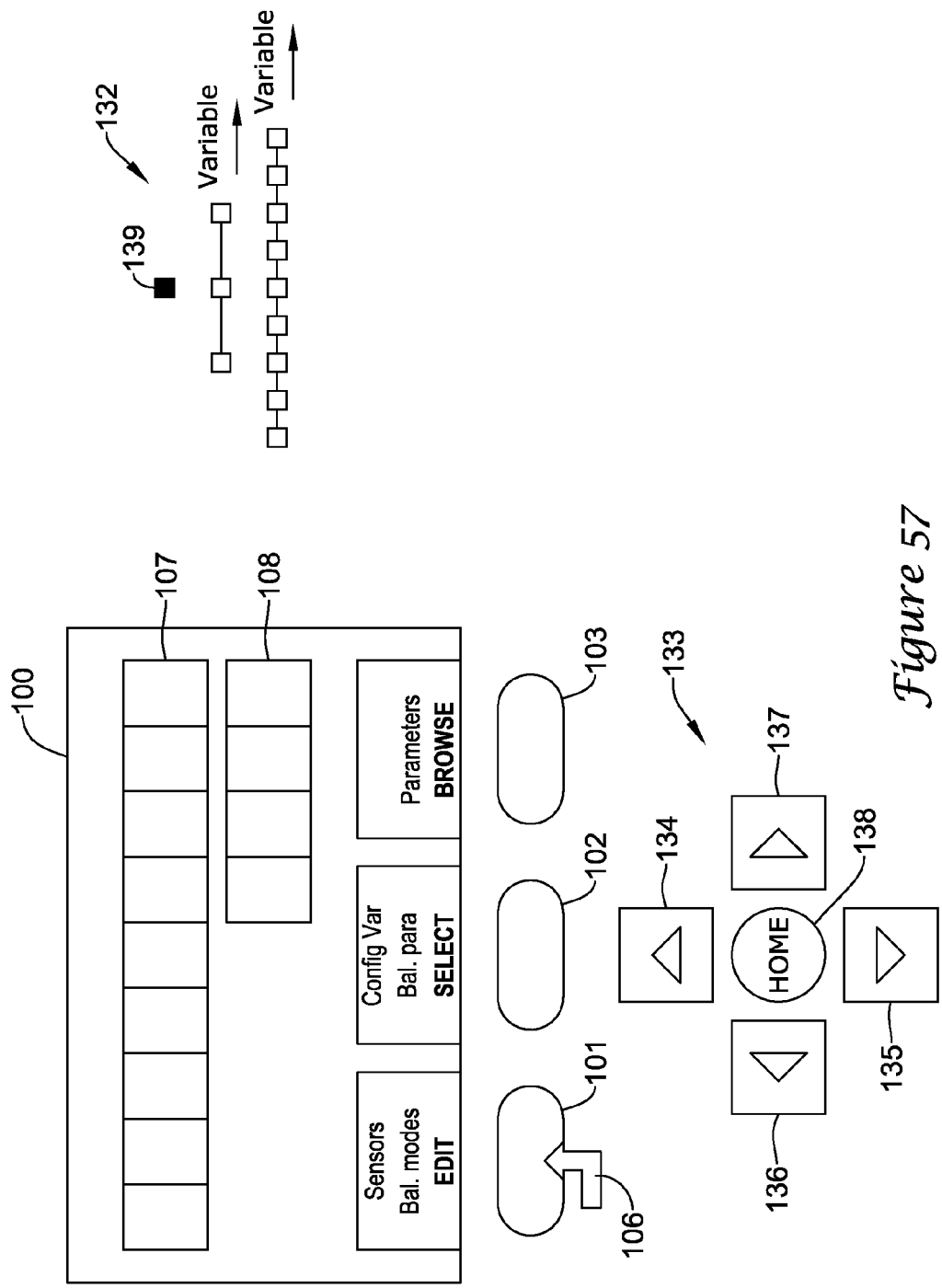
FIGS. 57-63 are diagrams of a tree navigation approach.

A tree approach of navigation may be illustrated in FIGS. 57-63. FIG. 57 shows the screen 100 and controls 133 for tree traversing by any user. The traversing may deal with any level of hierarchy. The arrows 134, 135, 136 and 137 of controls 133 may be for navigating and the soft keys 101, 102 and 103 may do some operation on things such as parameters which may be represented by a block structure 132. With arrow 106 pressing the key 101 for edit may move the screen 101 to a level for editability which may be parameters in the present situation.

Figure 58:
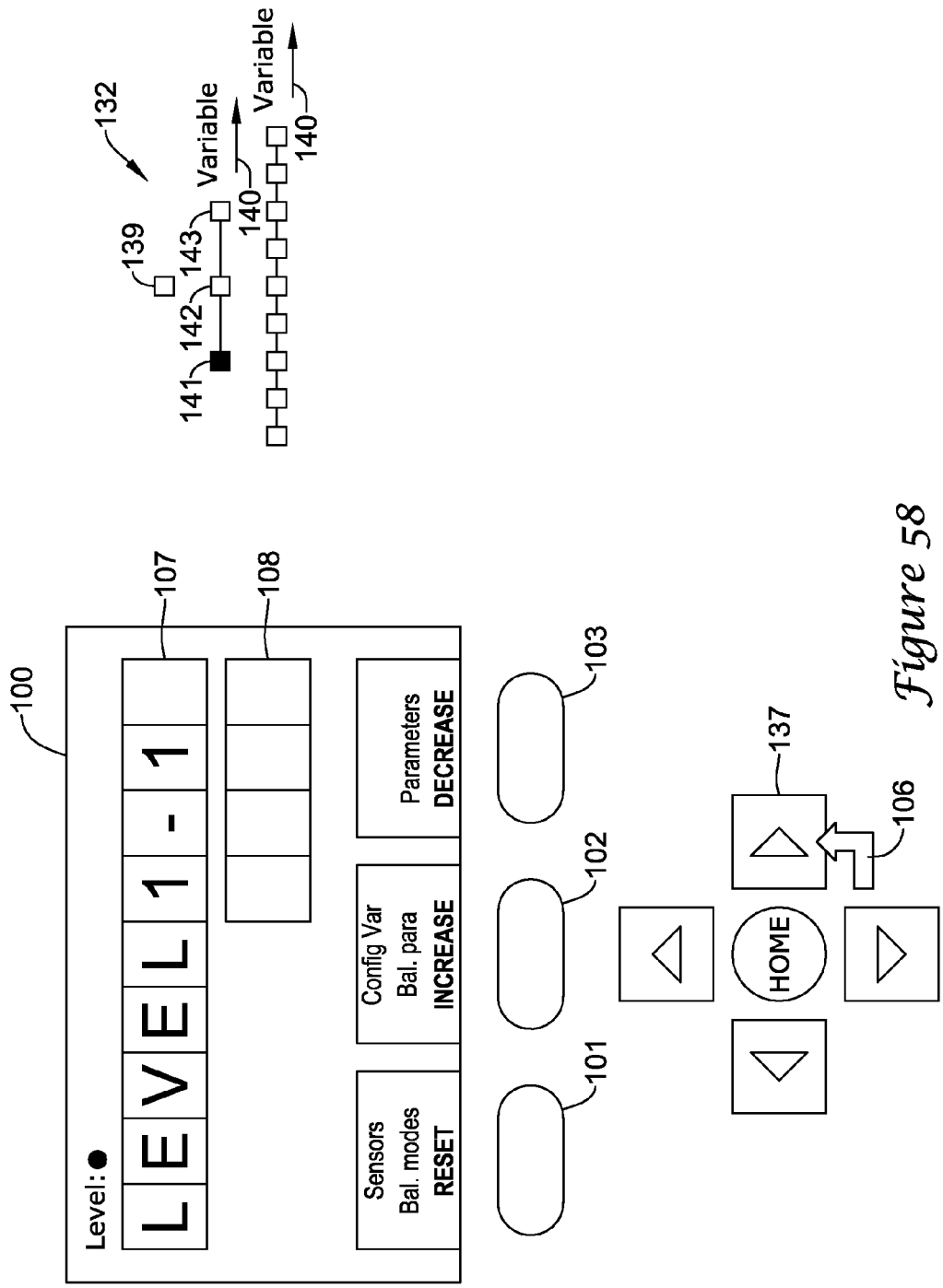
Figure 59:
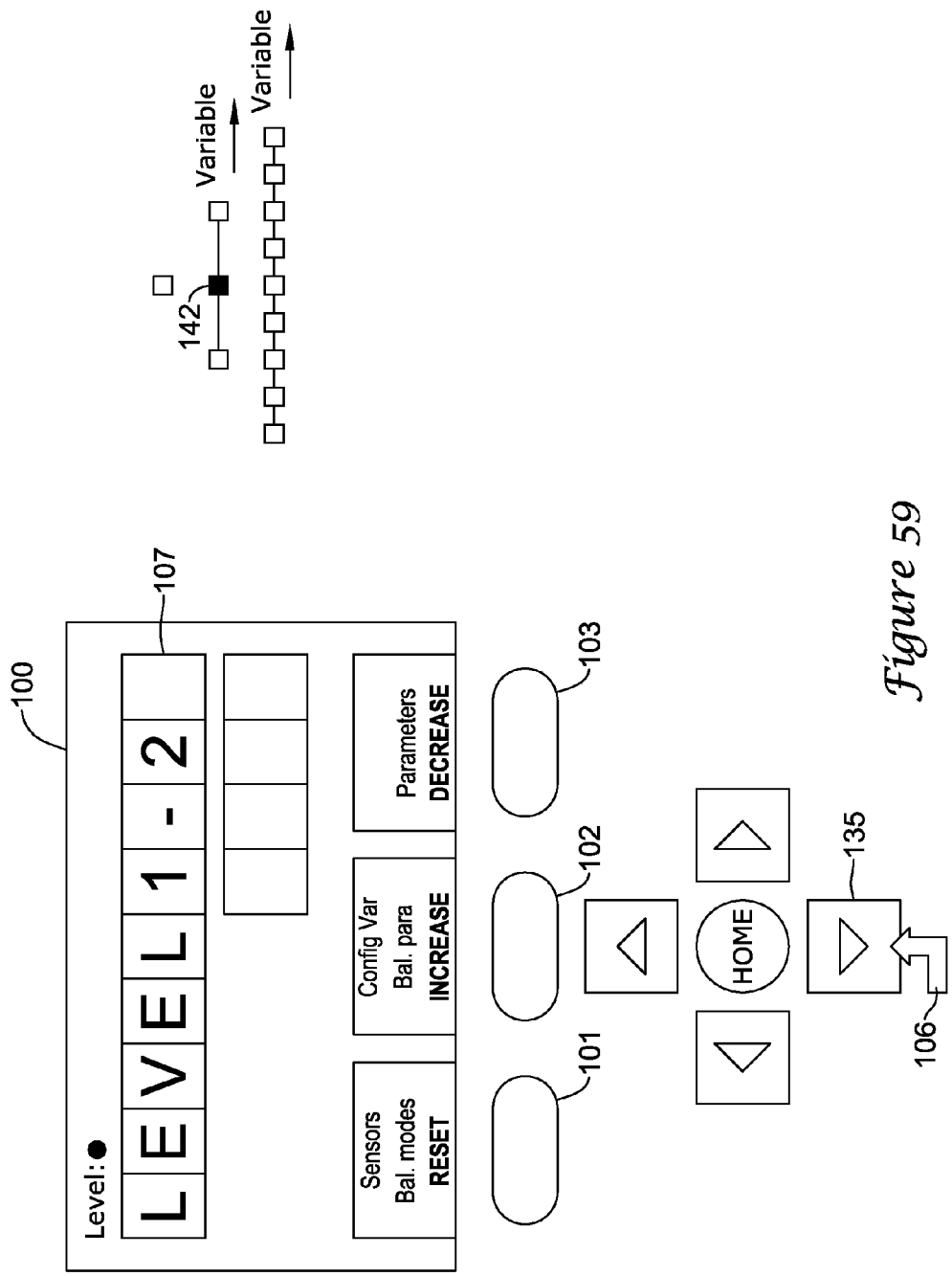
Figure 60:
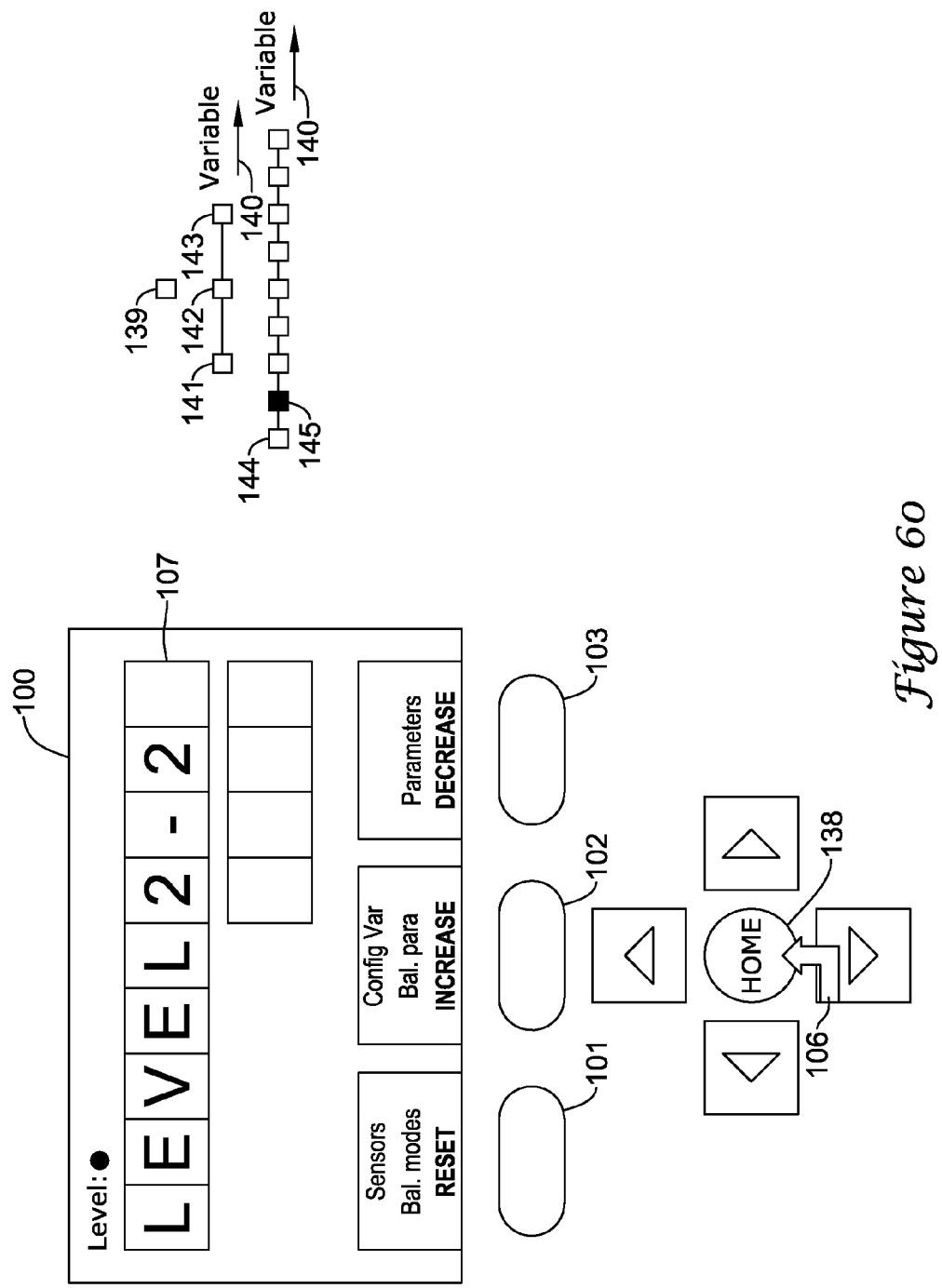
Figure 61:
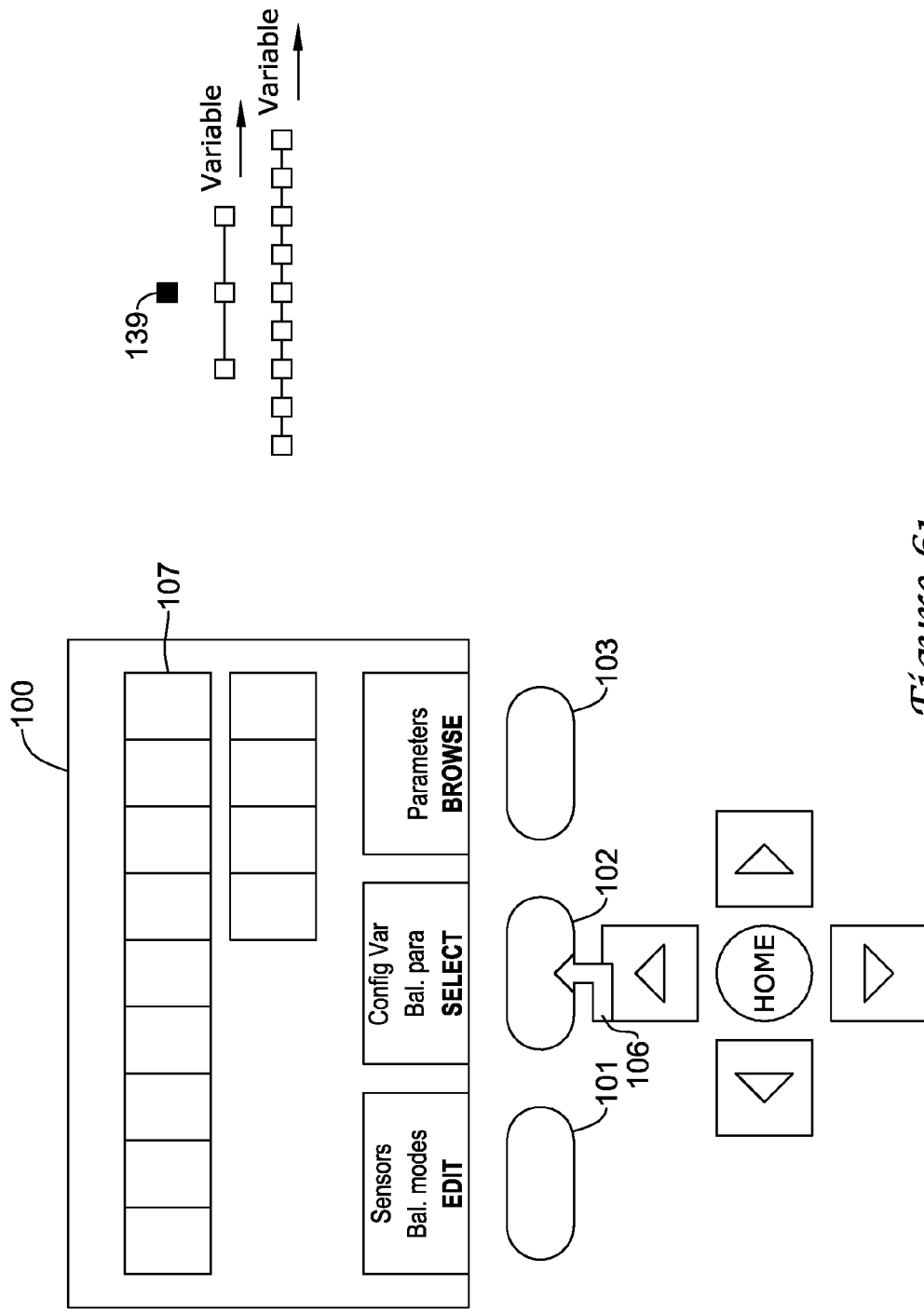
Figure 62:
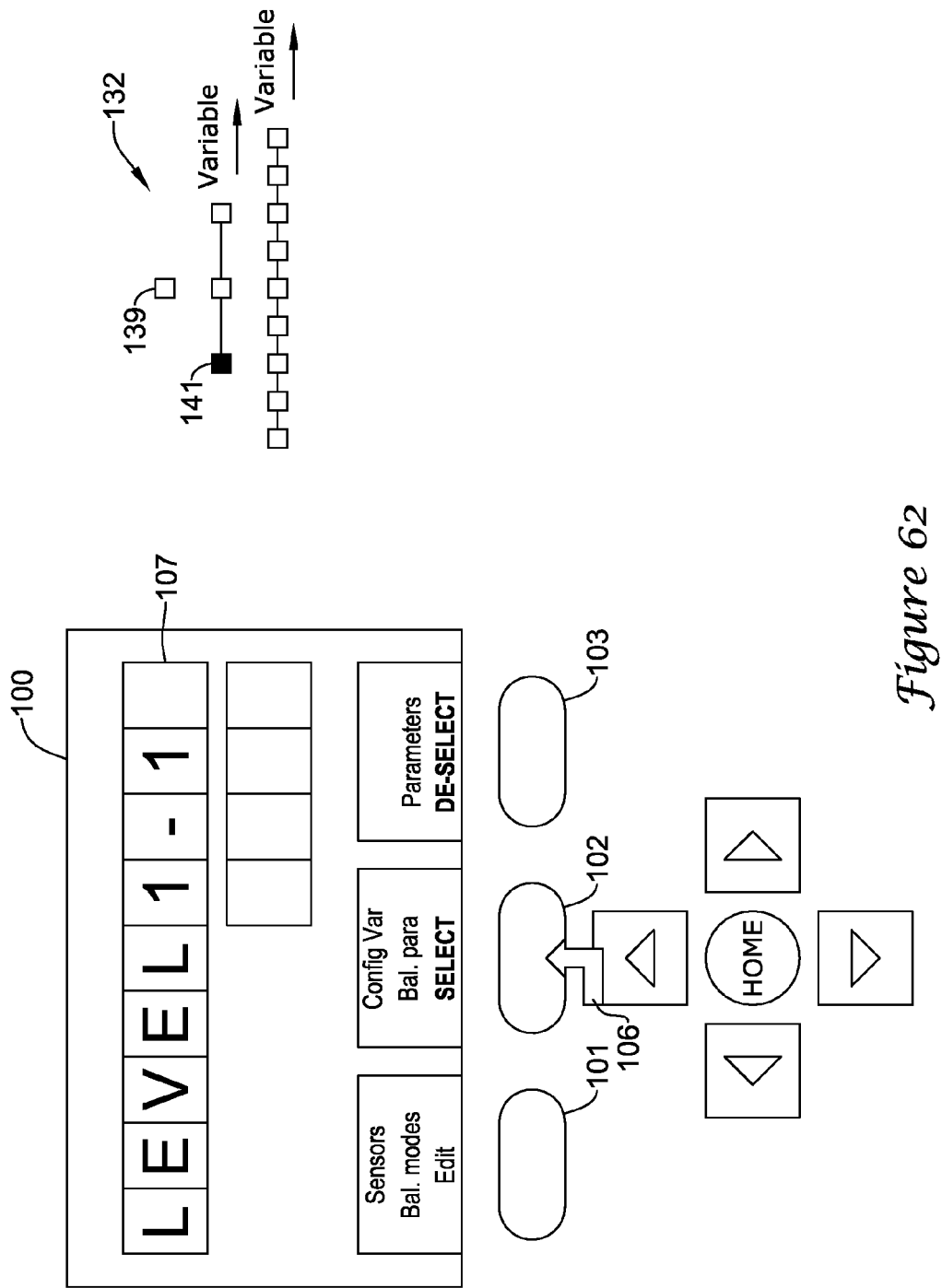
Figure 63:
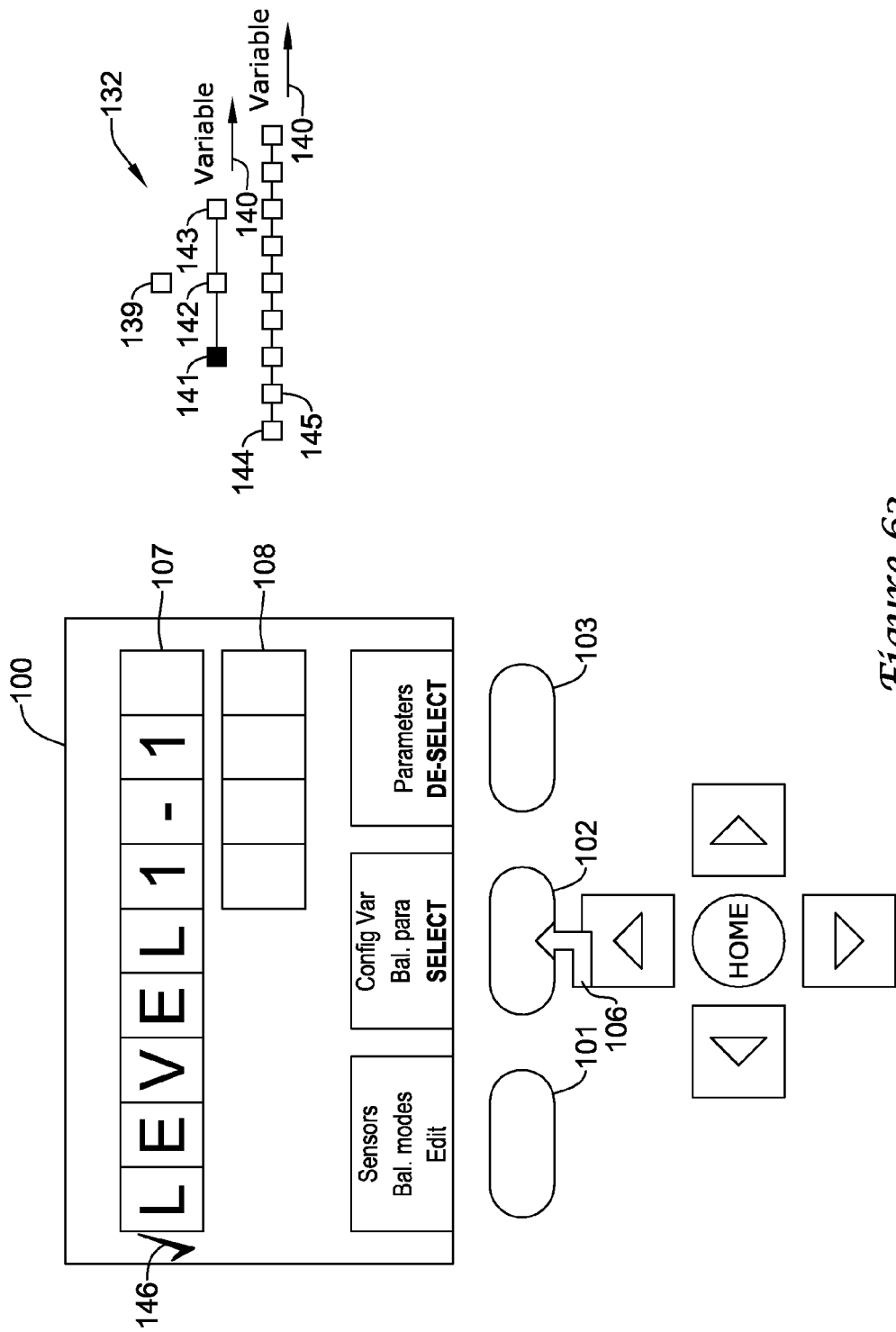

FIG. 58 shows screen 100 at a level one dot and having a label level 1-1 in display area 107. The darkening of the block 139 of the structure 132 in FIG. 57 may be shifted to a block 141 at another level. That means the darkened block is at a level one and is the first block in that level of blocks, as may be indicated by the label level 1-1. The number of blocks in each level may be variable as indicated by arrows 140. Arrow 106 may press right directional button 137 to shift the darkening to a second block 142 of the same level as the first darkened block as shown in FIG. 59. This may be identified by the label level 1-2 in display area 107. The next one may be block 143. The arrow 106 may be pressing a down-directional arrow 135 which moves the darkening down to level 2 to a second block 145 as shown in FIG. 60. The first block of level 2 may be block 144. The arrow 106 may be pressing the home button 138, which may change screen 100 to the one with no label in area 107 and a darkened block 139, as shown in FIG. 61, similar to the screen 100 of FIG. 57. Arrow 106 may be pressing key 102 with a label select which results in moving to level 1-1 as indicated in display area 107 of screen 100. This may correspond to moving the darkening from block 139 to block 141 in structure 132, as shown in FIG. 62. Arrow 106 may again be pressing key 102 with the label selected to result in adding a check mark at the left of the display area 107 containing the label level 1-1, as shown in FIG. 63.

Figure 64:
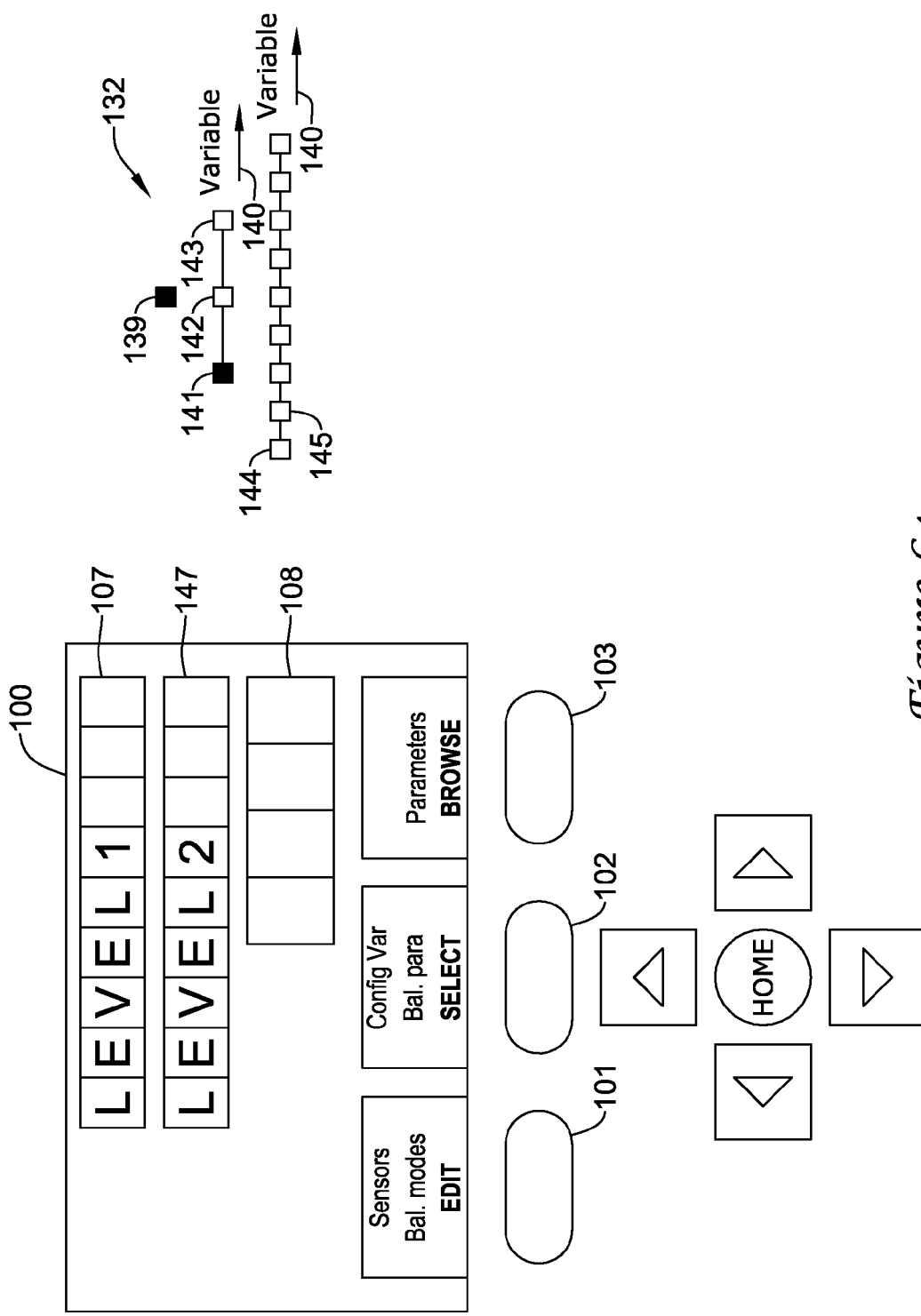
FIG. 64 is a diagram of a first variant of the tree navigation approach.

A first variant of the tree approach of navigation may be illustrated in FIG. 64. This variant may relate to tree traversing by any user. Another display area 147 may be added to the top portion of screen 100. The display areas 107 and 147 may identify two levels of structure 132 as may be indicated by darkened blocks 139 and 141 of different levels. Here, one may see the parent 139 and the child, e.g., 141, at the same time.

Figure 65:
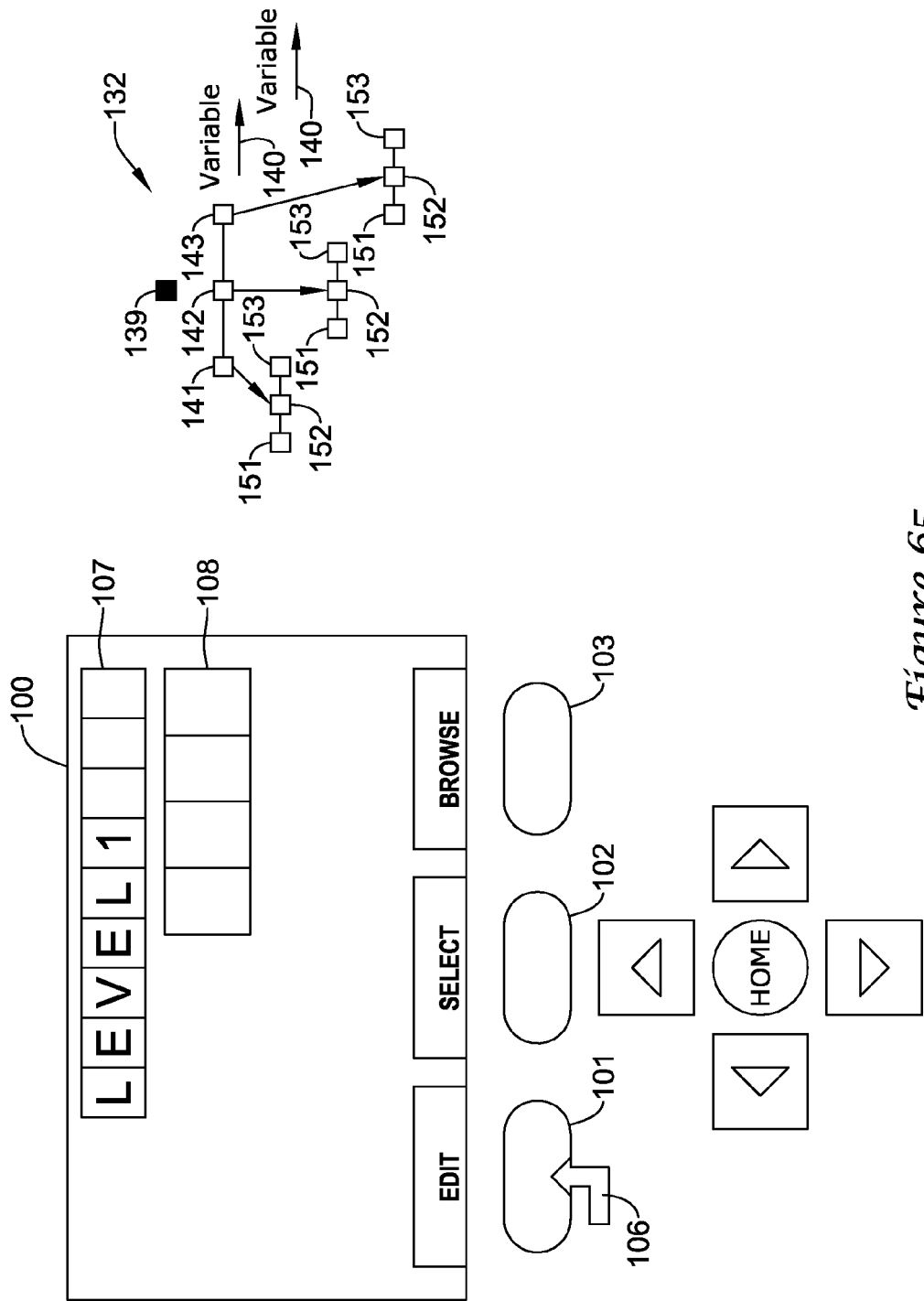
FIGS. 65 and 66 are diagrams of a second variant of the tree navigation approach.
Figure 66:
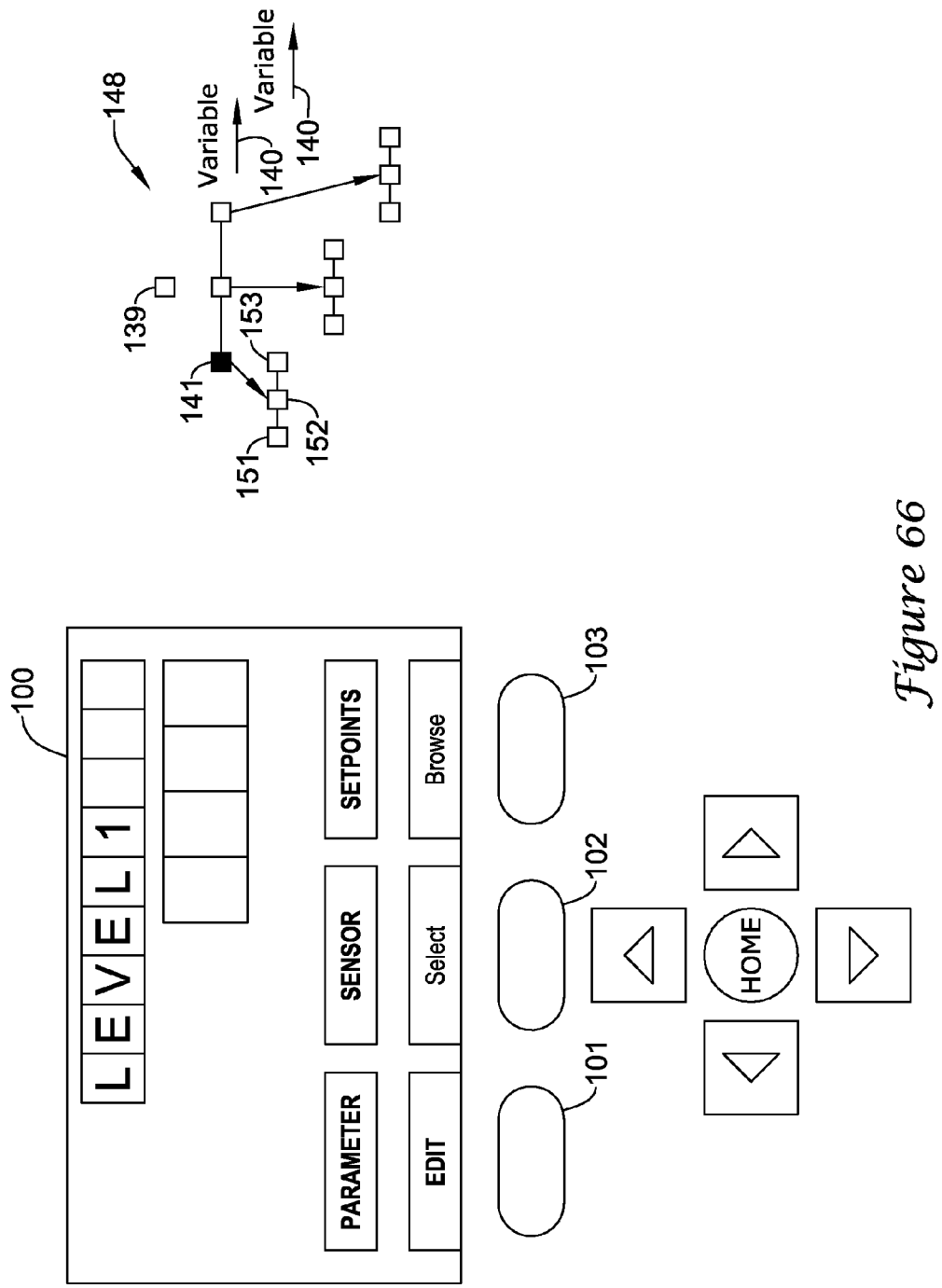

A second variant of the tree approach may be illustrated in FIGS. 65 and 66. This variant may relate to tree traversing by any user. Screen 100 shows a label level 1 in display portion 107. Instead of the structure 132 having one single loop as in some of the other Figures herein, another structure 148 may have three pre-defined loops 141, 142 and 143, at a level 1 and each of those loops may have three pre-defined loops 151, 152 and 153 inside at level 2. The number of pre-defined loops at level 1 and level 2 may be more or less than three. Arrow 106 pressing key 101 with a label edit may result in the screen 100 in FIG. 66 having labels of parameter, sensor and setpoints for keys 101, 102 and 103, respectively. Also, the darkening may move from box 139 to box 141 of structure 148.

Figure 67:
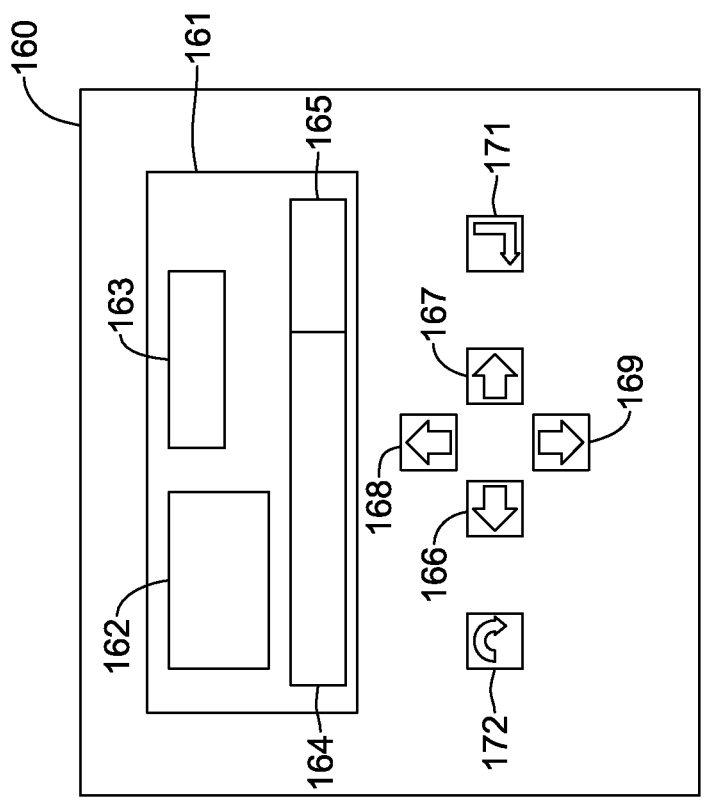
FIG. 67 is a diagram of a compass navigation approach.

A compass approach of navigation is shown in a screen or panel 160 of FIG. 67. Panel or screen 160 may have a display 161. Display 161 may have a portion 162 for status icons such as a snowflake, a flame, occ, unocc, fan status, and so forth. A display portion 163 may have four alpha numeric characters and two decimals for showing a value, such as yes/no, 20.0, and so on, and a selected display name. Display portion 164 may have nine alpha-numeric characters for displaying a name or label. Display portion 165 may have three alpha numeric characters for displaying units, such a Deg, C/F, and the like, if applicable for a corresponding display name shown in portion 164. The number of alpha numeric characters in any screen or display may be more or less than stated herein. A left-directional arrow 166 and a right-directional arrow 167 may be used to navigate between display names or portions. An up key 168 and down key 169 may be used to make changes in a value. By clicking on an enter key 171, one may be taken to a next level of hierarchy. By clicking on a back button 172, one may be able to come back one level up.

Figure 68:
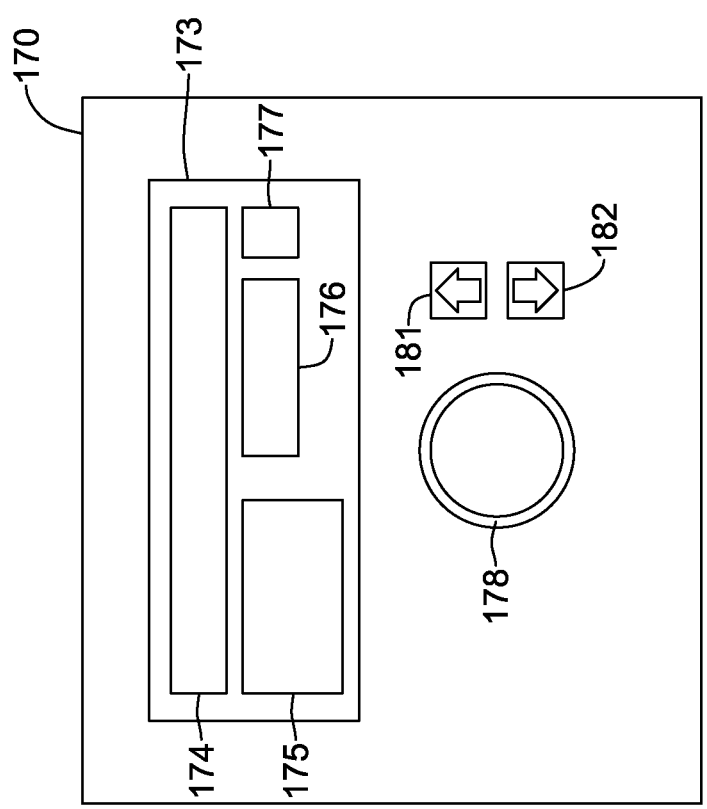
FIG. 68 is a diagram of a jog dial navigation approach.

A jog dial approach of navigation is shown in a screen or panel 170 of FIG. 68. Panel 170 may have screen or display 173 with display portions 174, 175, 176 and 177. Portion 174 may display eight alpha numeric characters for displaying a name or label. Portion 175 may display status icons, such as a snowflake, flame, occ, unocc, fan status, and so forth. Portion 176 may display four alpha numeric characters of values for a displayed name or level. Portion 177 may have fixed segments for displaying units, such as deg, C/F and so forth, if applicable for a corresponding display name or value being shown.

A jog or circular dial of screen or panel 170 may be used for navigation between different options, such as schedules, setpoints and so on, and parameter names such as room sensor, humidity sensor, and so forth. The dial 178 may have mechanical clicks to go from one option to another. One may click on the dial 178 to go and see the parameters related to particular options. By clicking on an up key 181 and down key 182, one may edit values of parameters. Once one is finished editing a value of a parameter, the dial 178 may be clicked on to enter and commit the edited value. One may move between different parameters related to a particular option by rotating dial 178.

Figure 69:
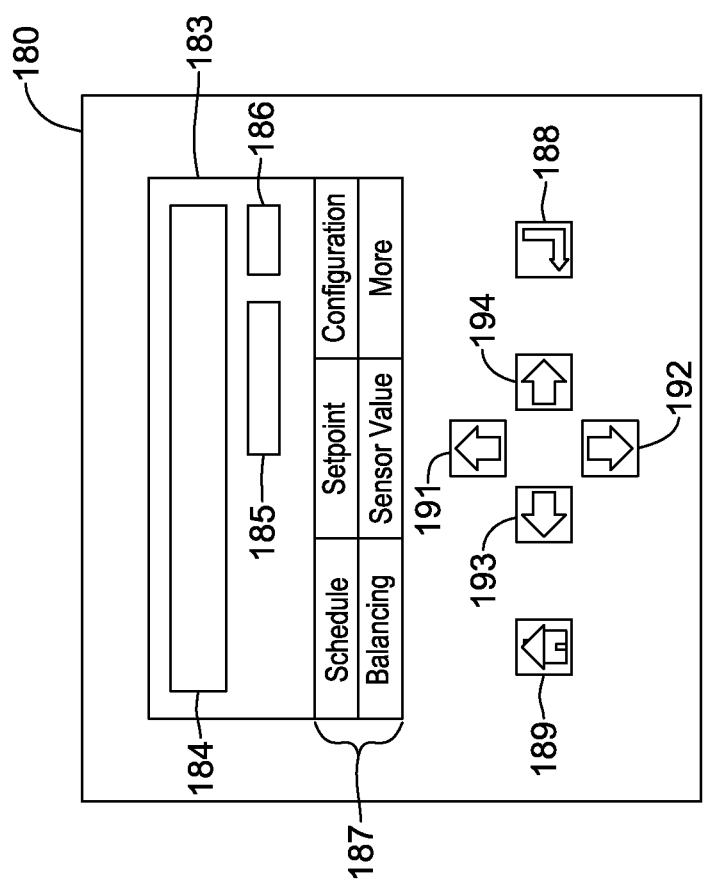
FIG. 69 is a diagram of a fixed menu navigation approach.

A fixed menu approach of navigation is shown in a screen or panel 180 of FIG. 69. Screen or panel 180 may have a display 183 having portions 184, 185 and 186. Portion 184 may have nine alpha numeric characters for displaying a name or label. Portion 185 may have four alpha numeric characters for display values. Portion 186 may have fixed segments for showing commonly used units. A portion 187 of display 183 may provide a primary navigation structure. This portion may list down commonly used menus, such as schedule, setpoint, configuration, balancing, and sensor value, and other generic fields which may be clubbed as part of a "More" menu in portion 187.

A left-directional arrow 191 and a right directional arrow 192 of screen or panel 180 may be used to navigate among items of the primary navigation structure. Once one is on a particular menu, one may click an enter key 188 to see parameters related to that menu. Upon clicking enter 188, other menus may get disabled and one may move between or among different parameters related to the selected menu by using the left directional key 193 and the right-directional key 194. One may edit values of the parameters by clicking on the up key 191 and the down key 192. To return to the home page, one may click on a home button 189 which may make the primary navigation menu available again.

Figure 70:
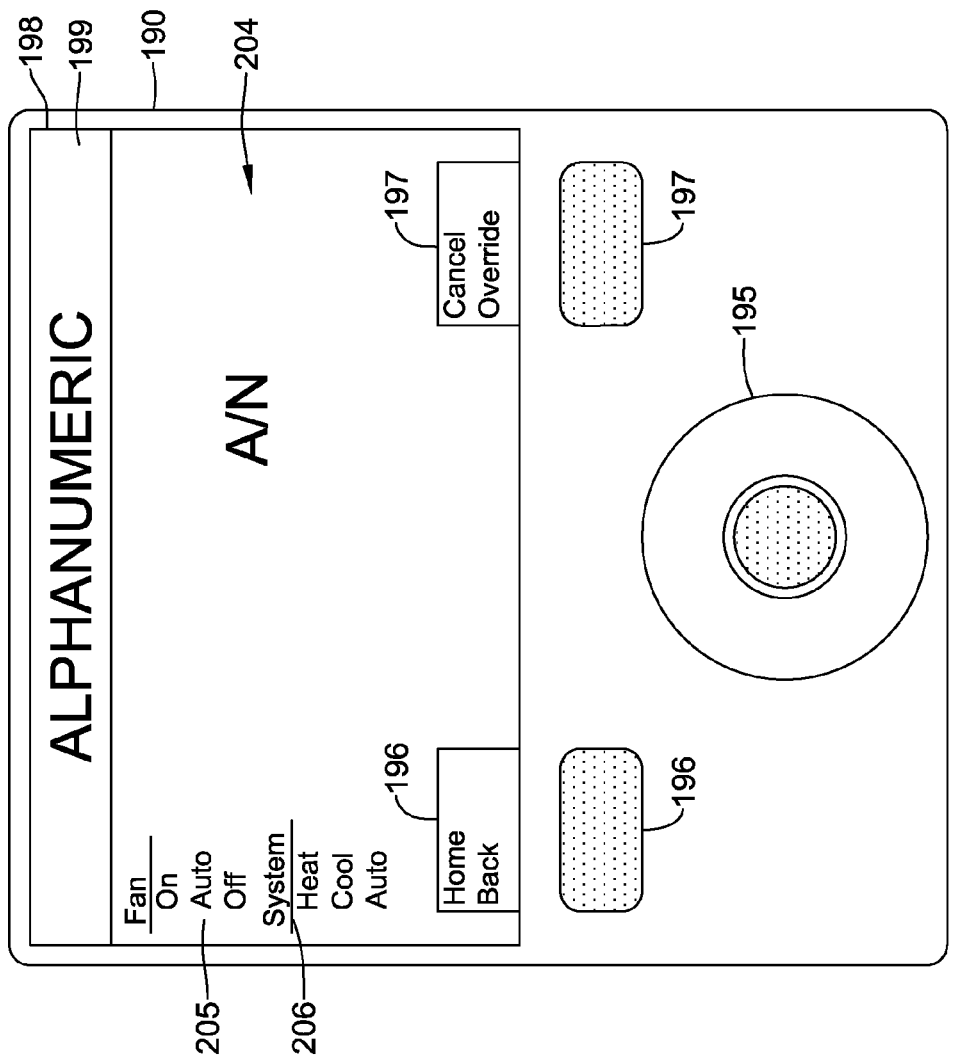
FIG. 70 is a diagram of a rotary dial and soft key navigation approach.

A rotary dial and soft key approach of navigation is shown in FIG. 70. Screen or panel 190 may have a rotary dial 195 and soft keys 196 and 197, much like the rotary dial 178 in FIG. 68 and the soft keys 101, 102 and 103 of FIG. 66, and other Figures discussed herein. Display 198 of screen or panel 190 may have display portions 199 and 204 which may provide alpha numeric names, values and units. There may be indicators 205 and 206 for such things as fan status, system mode, and so forth. There may be soft key labels 196 and 197 upon which soft keys may be situated. Label 196 may provide home and back selections. Label 197 may provide cancel and override selections. Other selections may be provided by labels 196 and 197.

Figure 71:
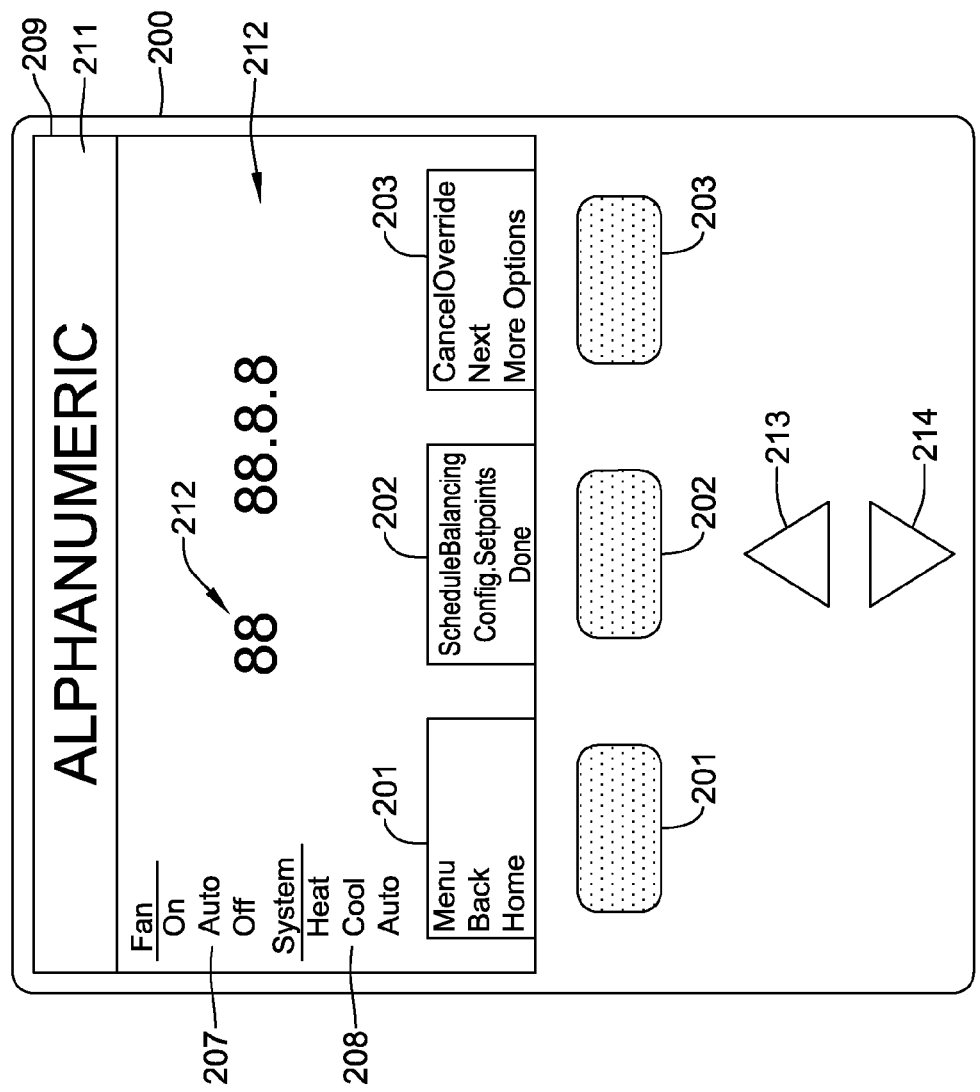
FIG. 71 is a diagram of a focus pro navigation approach.

A soft key approach of navigation is shown in FIG. 71. This approach may have a screen or panel 200 with soft keys 201, 202 and 203 proximate to or on corresponding labels 201, 202 and 203. Label 201 may provide menu, back and home for the soft key 201. Label 202 may provide schedule, balancing, configuration, setpoints and done for the soft key 202. Label 203 may provide cancel, override and more options for soft key 203. Other items may be listed in labels 201, 202 and 203. There may be indicators 207 and 208 for such things as fan status, system mode, and so forth. Indicators 207 and 208 may be a part of display 209. There may be a display portion 211 for alpha numeric labels, names, and so on. Also, there may be display portions 212 for values, setpoints, offsets, and other information. Up arrow 213 and down arrow 214 may be used to enter or change values, setpoints, offsets, status indicators, and other information.

Figure 72:
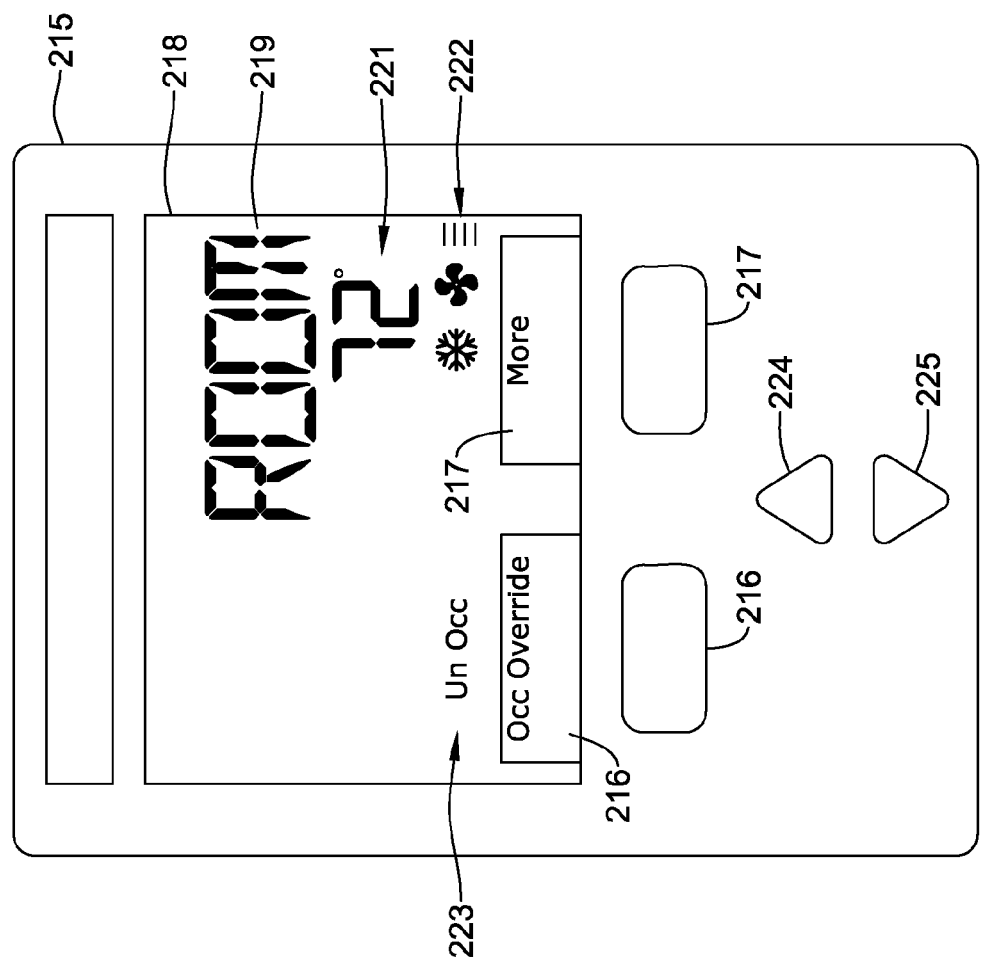
FIG. 72 is a diagram of a single loop navigation approach.
Figure 73:
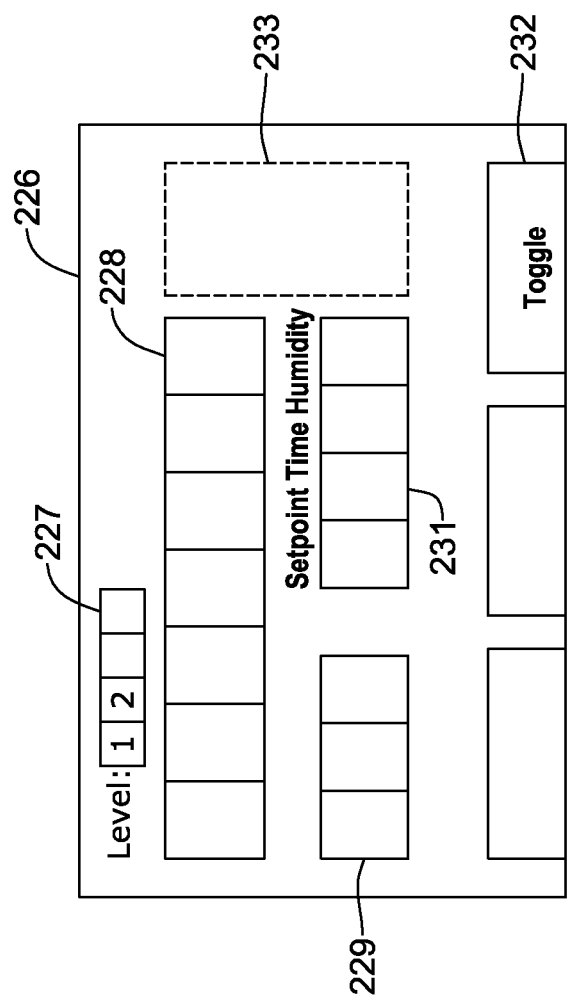
FIGS. 73-81 are diagrams of various screens, approaches, including some custom screens, relating to navigation.

A single loop approach of navigation is shown in FIG. 72. This approach may be implemented in a device, screen or panel 215. There may be a soft key 216 for selecting occ, override, unocc, and the like. Another soft key 217 may be for "more" items. A display 218 may have a portion 219 for a name of a parameter or value, such as "room" temperature, with a value in portion 221. Portion 222 may provide status indication such as for a fan, cooling, heating, and so forth. Display portion 223 may indicate such items as unocc, occ, override, and so on. Up and down arrows 224 and 225, respectively, may be used to enter or change values, setpoints, offsets, status indicators, and other information.

Various home screen approaches, including custom screens, of navigation are shown in FIGS. 73-81. Even though each of the custom or other screens in FIGS. 73-81 may be described as having a specific layout, the layouts may be varied, altered or changed from those described. A screen 226 of FIG. 73 may have a level indicator 227 in the upper left. Display portion 228 may have a 7-character alpha numeric format having 70 segments at the top. Portion 229 may have a 3-character alpha numeric format having 30 segments at the middle left. Portion 231 may be a 7-character numeric format having 28 segments at the middle. Portion 231 may be for displaying setpoint, time, humidity and other parameter values which may be toggled through with a toggle button 232. Area 233 may be for icons. The total number of segments for screen 226 may range from 140 to 150 segments.

Figure 74:
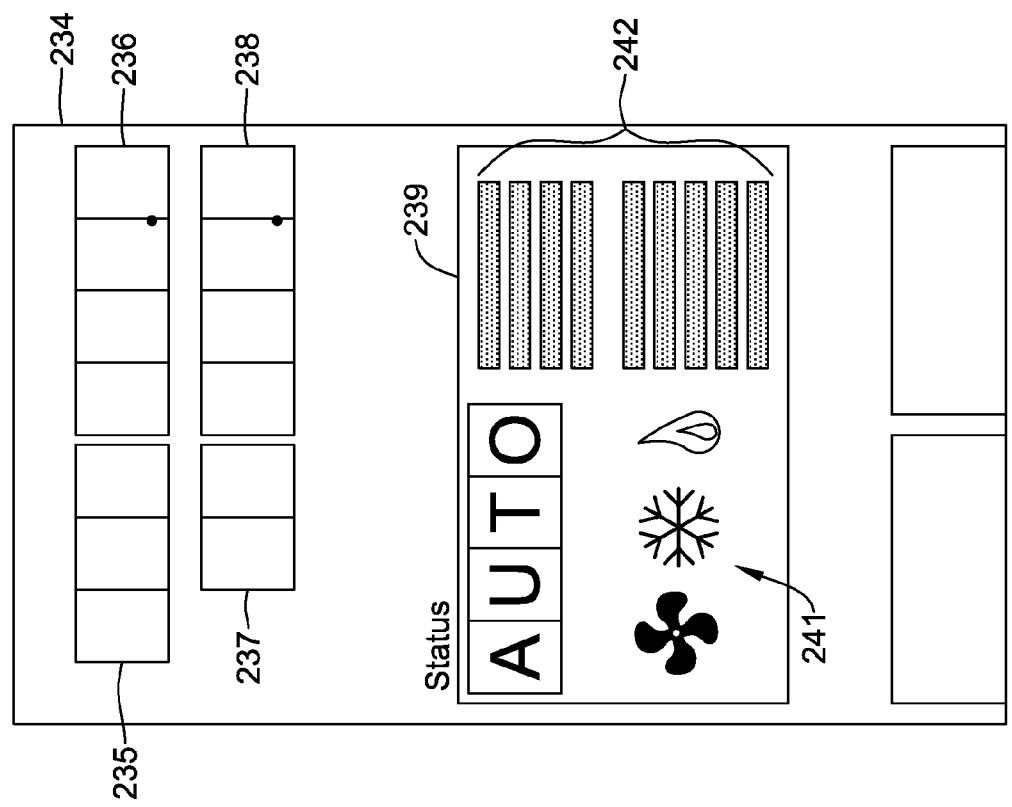

A screen 234 of FIG. 74 may have a 3-character alpha numeric format in display portion 235 in the upper left part of the screen. Portion 235 may have about 30 segments. A portion 237 just below portion 235 may have a 2-character alpha numeric format of 20 segments. To the right of portion 237 may be a portion 238 having a 4-character numeric format of 28 segments. Below portions 237 and 238 may be a status indicator portion 239. It may have a 4-character alpha numeric format of 40 segments. There may be icons 241 indicating such items as a fan, cooling, heating, and so forth. There may be bars or other fixed bar-like or other-shaped items at the right side of the status indicator portion 239, which may consist of 10 to 15 segments. The total number of segments for screen 234 may range from 160 to 170.

Figure 75:
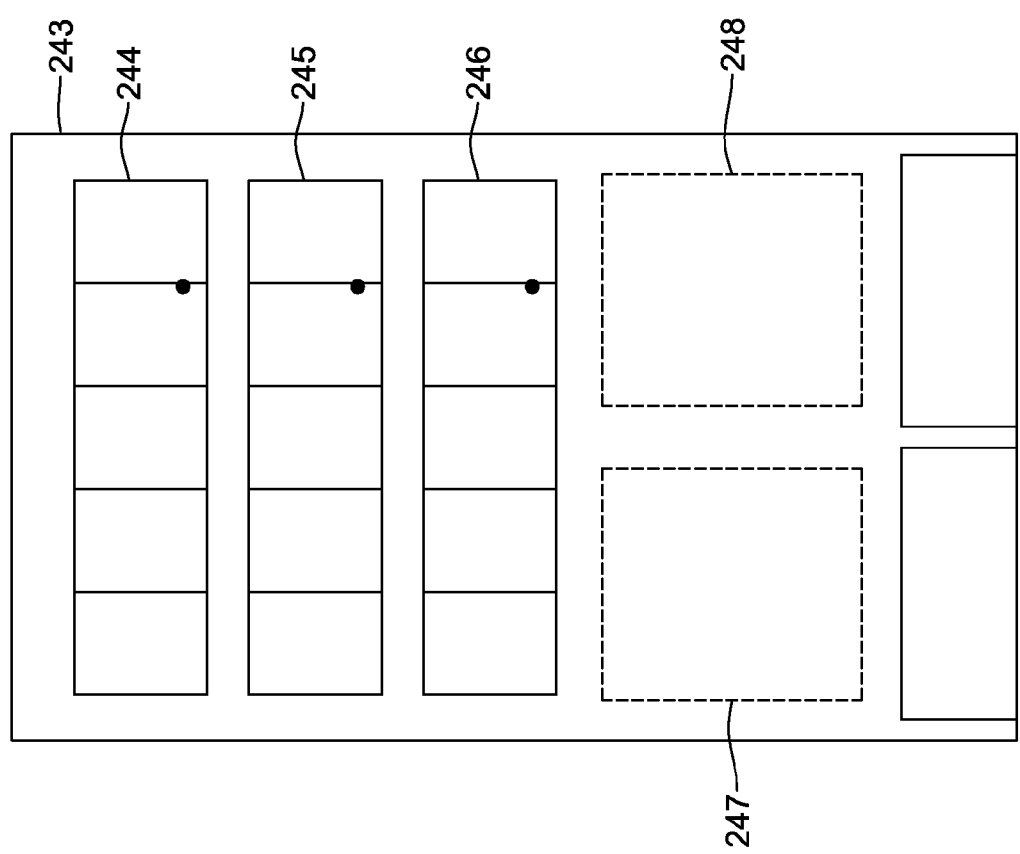

FIG. 75 shows a screen 243. Three display portions 244, 245 and 246 may be situated above and below one another in the upper part of screen 243. Each of the portions 244, 245 and 246 may have a 5-character alpha numeric format. Also, an area 247 and area 248 may be situated below portions 244-246 and be for fixed items and icons, respectively. The total number of segments for screen 243 may be from 160 to 170.

Figure 76:
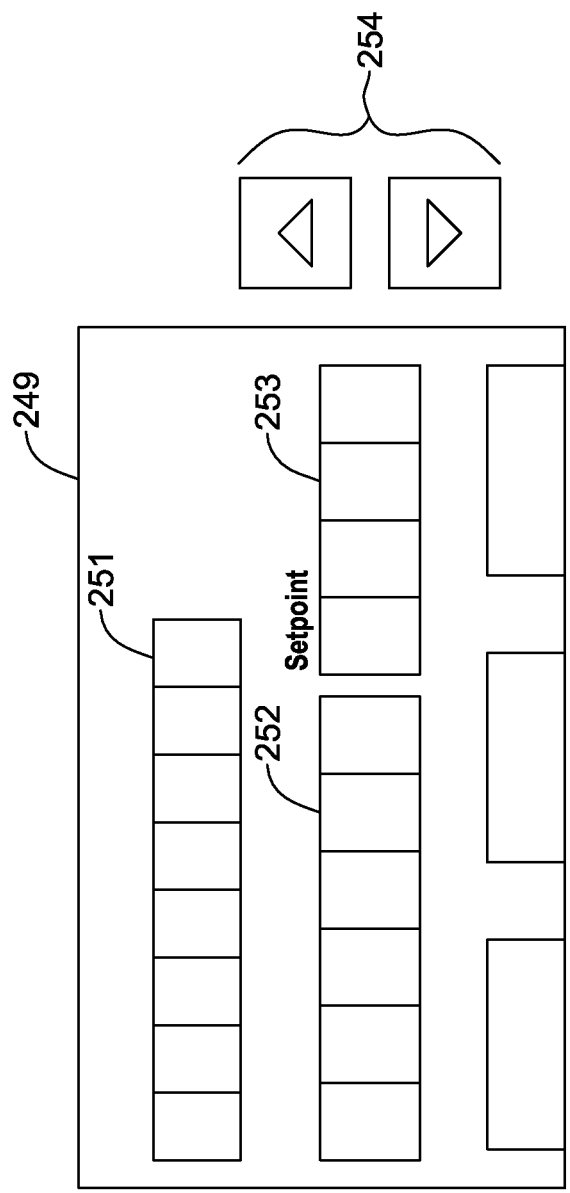

A screen 249 in FIG. 76 may have a portion 251 with an 8-character alpha numeric format having 80 segments and be situated at the top of the screen. Below and to the left of portion 251 may be a portion 252 with a 6-character alpha numeric format having 60 segments. To the right of portion 252 may be a portion 253 with a 4-character numeric format having 28 segments. Portion 253 may be for setpoints or other values which may be set by arrow buttons 254. Screen 249 may have from 170 to 180 segments.

Figure 77:
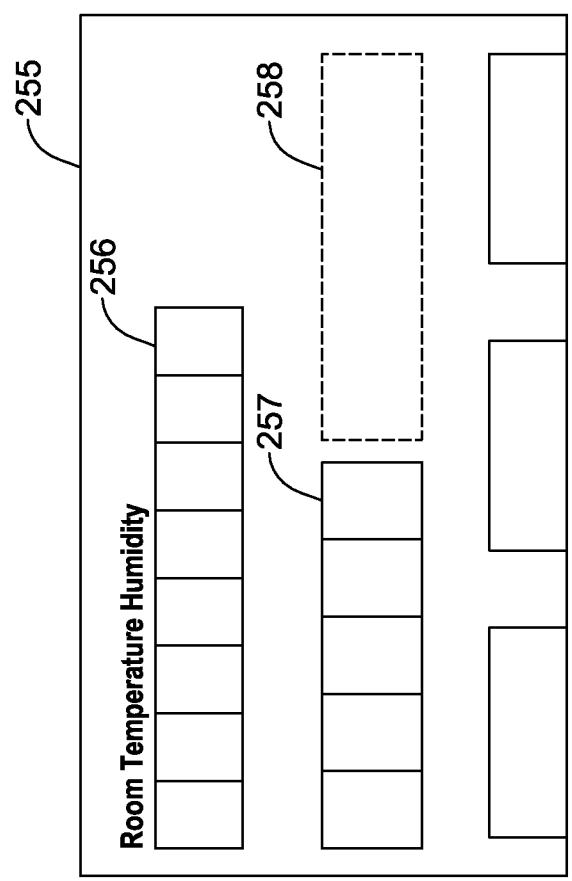

A screen 255 in FIG. 77 may have a display portion 256 with an alpha numeric 8-character format having about 70 segments. Portion 256 may be situated at the top of screen 255 and be used for room temperature and humidity, either separately or together, depending on the amount of name or label information desired. Below portion 256 may be a display portion 257 with a 5-character alpha numeric format having 50 segments. To the right of portion 257 may be an area 258 for icons. The total number of segments for screen 255 may be from 140 to 150 segments.

Figure 78:
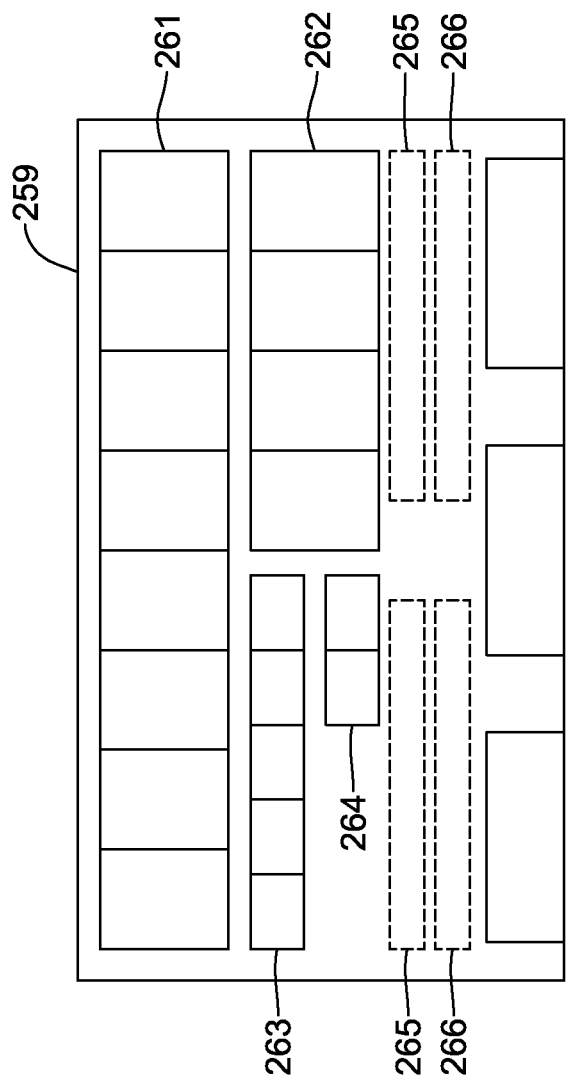

A screen 259 in FIG. 78 may, at the top, have a display portion 261 with an 8-character alpha numeric format having about 70 segments. Below portion 261 to the right is a portion 262 with a 4-character numeric format having 28 segments. To the left of portion 262 is a display portion 263 with a 5-character alpha numeric format having about 40 segments. Below portion 263 is a display portion 264 with a 2-character numeric format having 14 segments. Below display portions 262 and 264 are area 265 and 266 which may have icons and fixed items, respectively. Screen 259 may have a total of about 270 segments.

Figure 79:
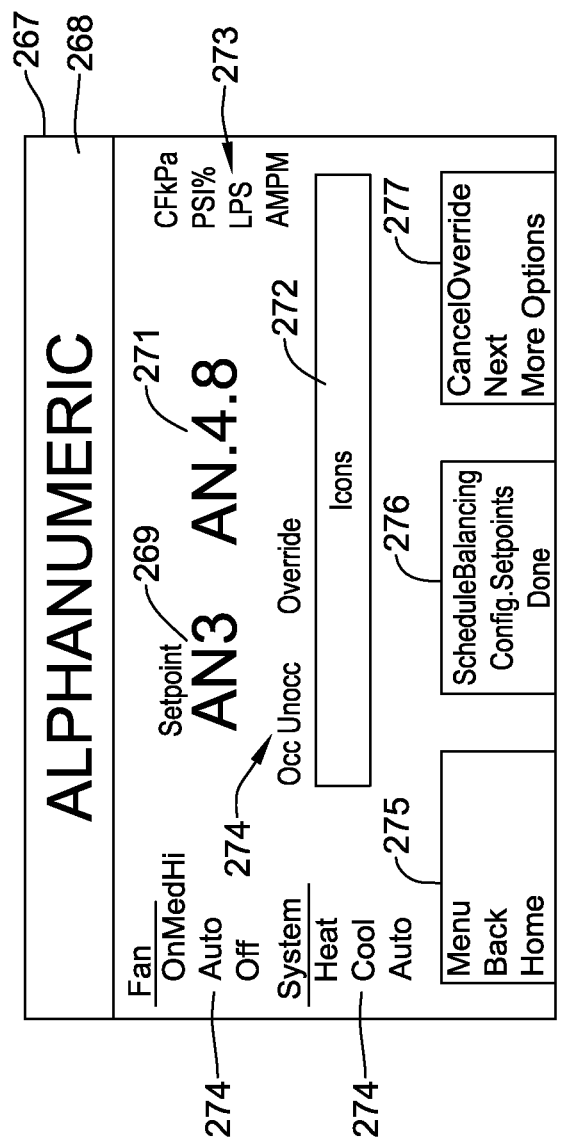

FIG. 79 shows a screen 267 having a 12-character alpha numeric display 268 at the top. Below it appears to be a 3-character alpha numeric display portion 269 and a 4-character alpha numeric portion 271. Screen 267 may have an area 272 for icons. There may be labels 274 for fan, system, and occupied status. There may be an area 273 group of various units to be associated with certain values on display portion 271. Also, there may labels 275, 276 and 277 which are part of soft keys or associated with the soft keys.

Figure 80A:
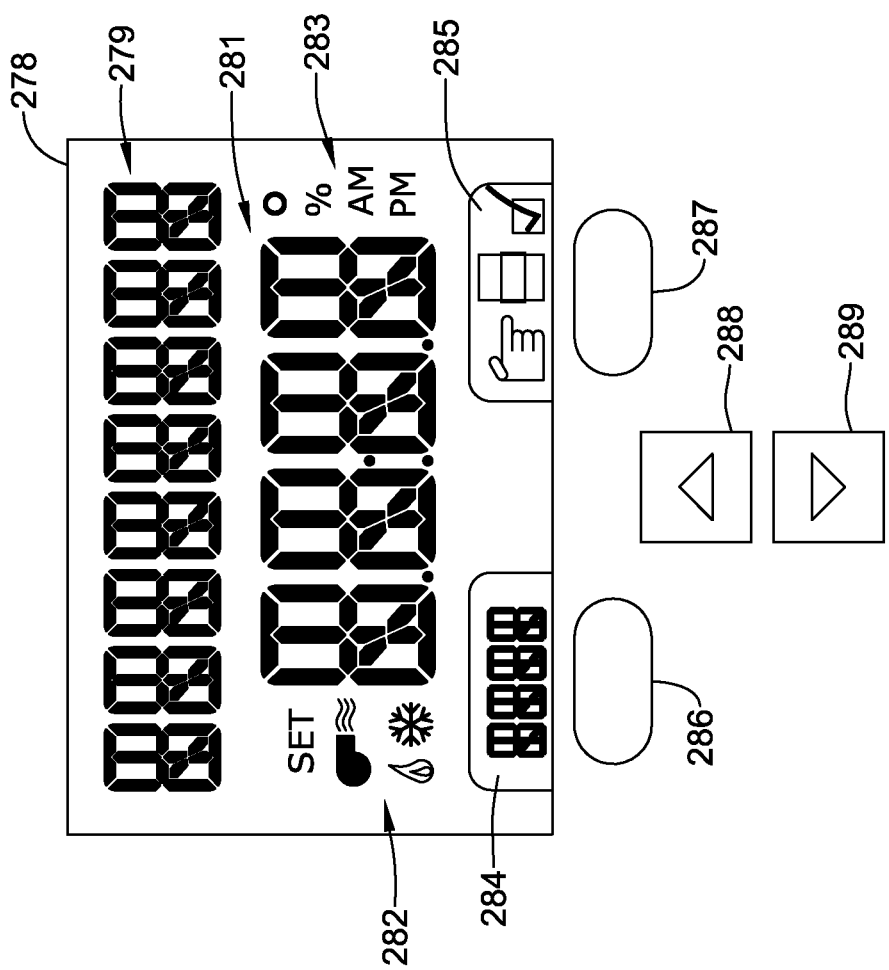
Figure 80B:
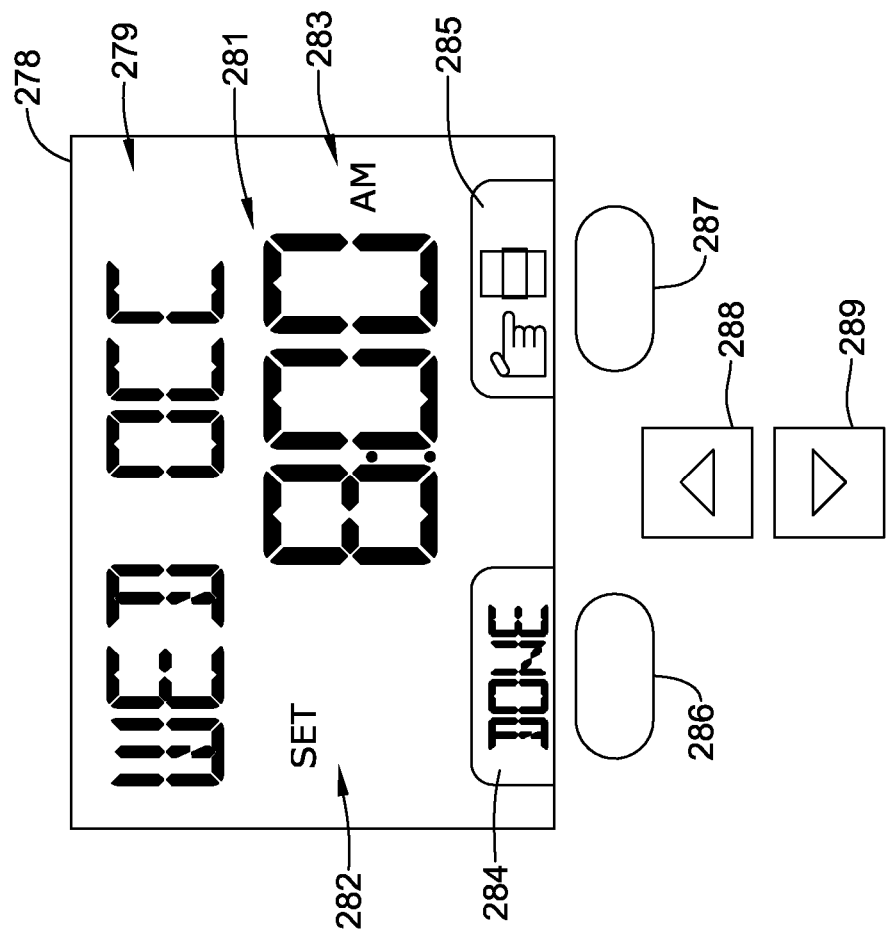

FIGS. 80a and 80b are an example of a dynamic menu. FIG. 80a shows a screen 278 with all the segments, icons and fixed symbols shown for the various display portions of the screen. There appears to be a display portion 279 having an 8-character, 10-segment alpha numeric format. A portion 281 may have a 4-character, 10-segment alpha numeric format. There may be about five icons in area 282 and four unit descriptors in area 283. Also, there may be a 4-character alpha numeric format for soft key label 284 and icons for soft key label 285, which may be associated with soft keys 286 and 287, respectively. Also associated with screen 278 may be an up key 288 and down key 289 for adjusting values, selecting labels, and performing other things. FIG. 80b shows an example of a working display. Hitting select from a run screen may scroll it through a listing of all functions, one at a time. Hitting PRGM (program) may enter one to the program mode for the selected function. "Done" may save the program and return one to a run screen. Icons may show system status if desired. An active field flashing may be changed by a select key. Up/down buttons 288 and 289 may cycle the active field through valid selections.

Figure 81A:
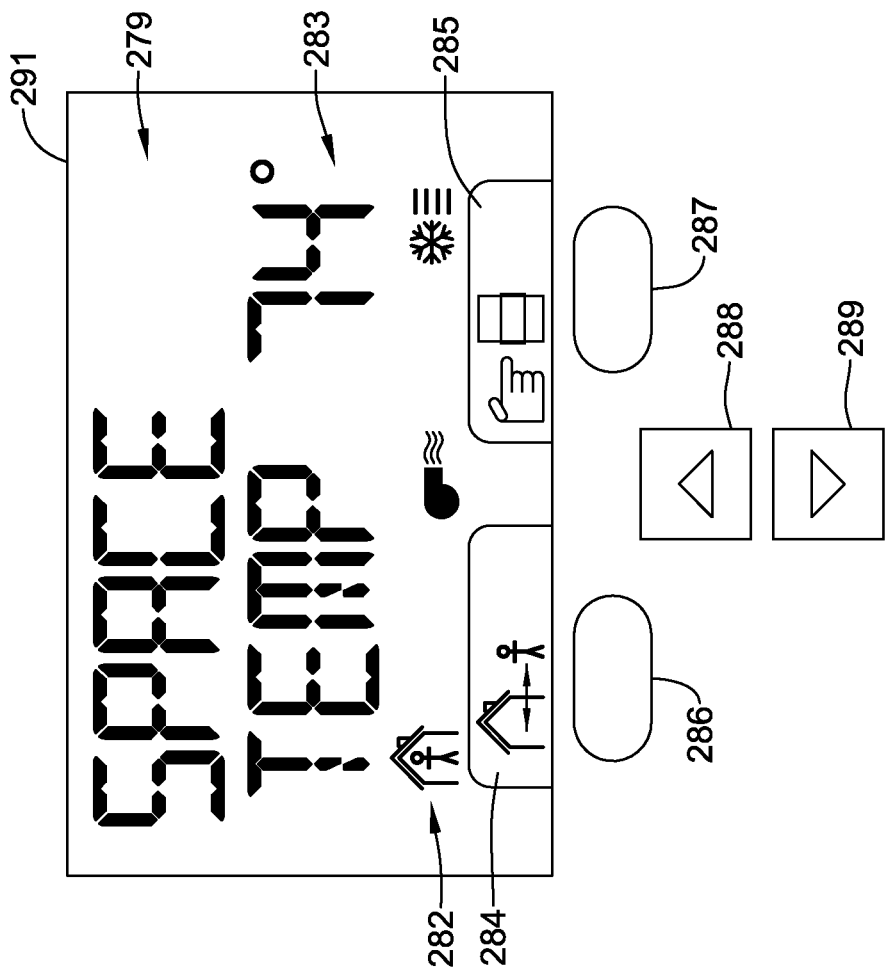
Figure 81B:
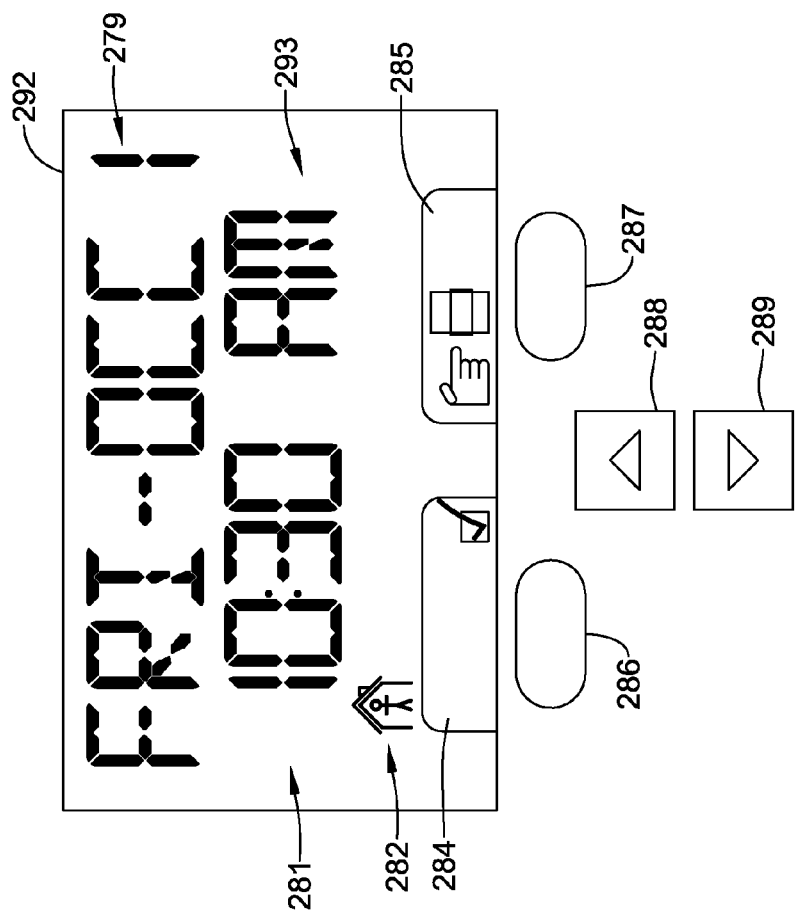

FIGS. 81a and 81b are instances of an iconic menu. They show additional screen examples 291 and 292. The layouts may be different from those of screen 278. In screen 292, "AM" for time may use a 2-character alpha numeric format 293. In FIG. 81a, one may have a normal run screen 291 showing space temp, occ status, heat/cool mode status, stages active, and fan status. Up/down buttons 288/289 may change screen 291 to set setpoint and alter the setpoint (if enabled). The left button 286 may override the occ schedule. The right button 287 may select all other functions available for the present wall module.

The active field, for instance in screen 292 of FIG. 81b, which may be scrolled up or down with arrow keys 288 and 289, may be flashing. A select key 287 may choose a field in label 285 to be active. The done key 286 with the applicable label may take one back to the run screen or back to the next function after an enter button was last pushed.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A wall mounted structure space module configured to control indoor environmental conditions through an HVAC system, the module comprising:
 a display for providing a home screen configuration of a single mode of the wall mounted structure space module, wherein:
  the display includes one or more different areas for displaying information at predefined locations using one or more fixed segments and/or symbols, wherein each fixed segment and symbol has a separate and distinct fixed position on the display independent of the home screen configuration displayed on the display; and
  the display is associated with one or more soft keys, each soft key having a separate and distinct fixed location on the display wherein the soft keys include one or more labels, wherein each of the one or more labels is one of the fixed segments and has a separate and distinct fixed location in the soft key on the display;
 a processor connected to the display; and
 one or more sensors, for providing one or more HVAC system related parameters about an indoor space, connected to the processor; and
 wherein the wall mounted structure space module has a user mode and an installer mode:
 wherein one or more HVAC system related parameters can be changed at the wall mounted structure space module when in the user mode,
 wherein a quantity of HVAC system related parameters that can be changed at the wall mounted structure space module is customizable by interacting with the display when in the installer mode to configure a plurality of preconfigured home screen configurations and parameter types of HVAC system related parameters that can be changed at the wall mounted structure space module are customizable by interacting with the display when in the installer mode to configure the plurality of preconfigured home screen configurations;
 wherein the plurality of preconfigured home screen configurations are preloaded on the wall mounted structure space module; and
 wherein the home screen configuration of the single mode of the wall mounted structure space module is selected on the wall mounted structure space module from the plurality of preconfigured home screen configurations preloaded to and located on the wall mounted structure space module for the single mode and wherein the selected preconfigured home screen configuration has a parameter configuration layout that is modified at the wall mounted structure space module by interacting with the display when in the installer mode and displays information at predetermined locations using the fixed segments and/or symbols of the display by selectively enabling and/or disabling desired fixed segments and/or symbols and selectively displays a label of the one or more labels at its distinct and fixed location on the display in each of one or more of the one or more soft keys.

2. The module of claim 1, wherein the wall mounted structure space module is programmed and/or configured with a software configuration tool in connection with a building automation system to provide the wall mounted structure space module with customized access to the building automation system.

3. The module of claim 1, wherein a space module configuration is selectable from one or more predefined space module configurations.

4. The module of claim 1, wherein control of the space module is configurable.

5. The module of claim 1,
 wherein permission to access the installer mode and/or the user mode is customizable.

6. The module of claim 5, wherein an amount of information permitted to be viewed by a user is customizable.

7. The module of claim 1,
 wherein:
  the installer mode is for programming the wall mounted structure space module with a software configuration tool in connection with a building automation system; and
  programming permitted by the user mode is determined at the installer mode.

8. The module of claim 7, wherein the building automation system comprises:
 a controller connected to the space module and the HVAC system.

9. The module of claim 1, wherein the wall mounted structure space module comprises one or more soft keys connected to the processor.

10. The module of claim 9, wherein:
 an occupancy status is selectable at the wall mounted structure space module via the one or more soft keys; and/or
 a fan status is selectable at the wall mounted structure space module via the one or more soft keys.

11. The module of claim 9, wherein:
 each soft key is positioned offset from and adjacent to the display; and
 each soft key of the one or more soft keys has a label displayed on the display, where the label indicates an action if the soft key is pressed.

12. The module of claim 9, wherein:
 the one or more HVAC system related parameters are classified in one or more categories; and
 the one or more HVAC system related parameters are accessed from one or more categories by pressing the one or more soft keys via two-level navigation.

13. The module of claim 12, wherein in absence of a configured or selected two-level navigation menu, a default two-level navigation menu is provided.

14. The module of claim 9, further comprising:
 up and down keys; and
 wherein:
  the HVAC system related parameters are selectable at the wall mounted structure space module from a category with the one or more soft keys; and
  the HVAC system related parameters are adjustable with the up and down keys.

15. The module of claim 1, wherein:
 the display comprises one or more labels;
 each of the one or more labels is a one-or-more-character label; and
 each character of the label comprises one or more fixed display segments.

16. A method for operating a wall mounted thermostat module comprising:
- providing a display having one or more fixed segments and/or symbols, wherein each of the one or more fixed segments or symbols are fixed at predetermined separate and distinct locations on the display independent of a screen displayed on the display and are capable of being selectively enabled or disabled;
- providing one or more soft keys associated with the display, wherein each of the one or more soft keys include two or more labels at separate and distinct fixed locations within the soft key and each of the two or more labels are capable of being selectively enabled or disabled;
- sensing one or more environment control parameters with one or more sensors of the wall mounted thermostat module;
- loading a group of two or more preconfigured home screens for a single mode onto the wall mounted thermostat module, wherein the wall mounted thermostat module has an installer mode and a user mode;
- when in the installer mode, selecting by interacting with the display of the wall mounted thermostat module a preconfigured home screen from the loaded group of two or more preconfigured home screens for the single mode;
- modifying a preconfiguration of parameters on the selected preconfigured home screen by interacting with the display when in the installer mode;
- selectively enabling and/or disabling the one or more fixed segments and/or symbols of the display based on the modified preconfiguration of parameters on the selected preconfigured home screen;
- selectively enabling and/or disabling the two or more labels of the soft keys based on the modified preconfiguration of parameters on the selected preconfigured home screen;
- displaying the modified preconfigured home screen of a single mode for showing at least one value and/or setpoint of the one or more environment control parameters on a display of the wall mounted thermostat module;
- wherein the displayed preconfigured home screen displays one or more soft keys operable from the displayed preconfigured home screen on the display of the wall mounted thermostat module; and
- wherein the one or more environment control parameters that can be changed at wall mounted thermostat module is customizable by interacting with the display when in the installer mode to configure the group of two or more preconfigured home screens and parameter types of the one or more environment control parameters that can be changed at the wall mounted thermostat module are customizable by interacting with the display when in the installer mode to configure the group of two or more preconfigured home screens.

17. The method of claim 16 wherein:
- the preconfigured home screen is selected from the group of two or more preconfigured home screens by pressing one or more soft keys; and
- each of the one or more soft keys has a label displayed on the display for indicating an action if the soft key is pressed.

18. The method of claim 17, wherein:
- the one or more parameters are in one of one or more categories;
- a category is selected from the one or more categories for viewing by pressing one or more soft keys; and
- a parameter is selected from the category for viewing and/or editing by pressing one or more soft keys and/or up and down keys.

19. The method of claim 16, wherein:
- the wall mounted thermostat module is situated in a building and connected to a building automation system; and
- the building automation system in conjunction with the wall mounted thermostat module is for controlling environmental conditions in the building.

20. The method of claim 19, further comprising programming and/or configuring the wall mounted thermostat module with a configuration tool; and
- wherein the configuration tool is a software configuration tool having access to the building automation system.

21. A control system including a wall mounted device used to monitor and control an indoor environment, the control system comprising:
- one or more sensors for indicating one or more values of one or more indoor environment parameters sensed by the one or more sensors;
- a display of the wall mounted device for showing a preconfigured home screen of a mode of the control system, wherein the wall mounted device has a user mode and an installer mode;
- a processor connected to the one or more sensors and the display;
- one or more soft keys selectable and operable from the shown preconfigured home screen, wherein each of the one or more soft keys are located at a predetermined location on the shown preconfigured home screen;
- one or more labels associated with the one or more soft keys for indicating what appears on the screen if the one or more soft keys are pressed, wherein each of the one or more labels is located in a separate, distinct, and fixed predetermined location within the soft key;
- up and down keys configured on the wall mounted device;
- one or more indoor environment parameters and/or setpoints selectable by the one or more soft keys and adjustable by the up and down keys; and
- one or more fixed segment characters in the shown preconfigured home screen for displaying a value of the one or more indoor environment parameters and/or setpoints when the wall mounted device is in the user mode; and
- one or more fixed segment symbols in the shown preconfigured home screen are for displaying information about the one or more indoor environment parameters and/or setpoints when the wall mounted device is in the user mode; and
- wherein:
- each of the one or more fixed segment characters and the one or more fixed segment symbols are located at separate and distinct fixed locations on the display independent of the shown preconfigured home screen displayed on the display and are capable of being selectively enabled and/or disabled by interacting with the display when in the installer mode to configure the shown preconfigured home screen and a plurality of additional preconfigured home screens;
- the additional preconfigured home screens of the wall mounted device are preloaded and stored on the wall mounted device for selection and parameter layout modification at the wall mounted device in lieu of the shown preconfigured home screen on the display by interacting with the display when in the installer mode;
- the additional preconfigured home screens are downloaded to the wall mounted device; and a quantity of the one or more indoor environment parameters and/or setpoints that can be changed at the wall mounted device is customizable by interacting with the display when in the installer mode to configure the shown preconfigured home screen and the plurality of additional preconfigured home screens and parameter types of the one or more indoor environment parameters and/or setpoints that can be changed at the wall mounted device are customizable by interacting with the display when in the installer mode to configure the shown preconfigured home screen and the plurality of additional preconfigured home screens.

22. The system of claim 21, wherein the one or more sensors comprise a temperature sensor, a humidity sensor, a CO2 sensor and/or one or more other sensors.

23. The system of claim 21, further comprising:
an occupancy status selectable by the one or more soft keys; and
a fan status selectable by the one or more soft keys.

24. A control system including a wall mounted structure space module configured to monitor and control an indoor environment through an HVAC system, the control system comprising:
one or more sensors for indicating one or more values of one or more indoor environment parameters sensed by the one or more sensors;
a display of the wall mounted structure space module for showing a home screen configuration of a mode of the control system, wherein the wall mounted space structure module has an installer mode and a user mode;
a processor connected to the one or more sensors and the display;
one or more soft keys selectable and operable from the shown home screen configuration when the wall mounted structure space module is in the user mode, wherein each of the soft keys have a separate, distinct, and fixed predefined position within the display independent of the screen displayed on the display;
one or more labels associated with the one or more soft keys for indicating what appears on the the shown home screen configuration if the one or more soft keys are pressed when the wall mounted structure space module is in the user mode, wherein each of the one or more labels have a different and fixed predefined position within the soft key independent of the shown home screen configuration displayed on the display and each of the one or more labels are selectively displayed;
up and down keys configured on the wall mounted structure space module;
one or more indoor environment parameters and/or setpoints selectable by the one or more soft keys and adjustable by the up and down keys;
one or more fixed segment characters in the home screen configuration for displaying a value of the one or more parameters and/or setpoints when the wall mounted structure space module is in the user mode, where each of the one or more fixed segment characters have a separate, distinct, and fixed position within the display independent of the shown home screen configuration displayed on the display;
one or more fixed symbols in the shown home screen configuration for displaying the status of one or more indoor environment parameters and/or setpoints when the wall mounted structure space module is in the user mode, wherein each of the one or more fixed symbols are selectively displayed at different and fixed locations within the display independent of the shown home screen configuration displayed on the display;
wherein:
additional home screen configurations of the wall mounted structure space module are preloaded onto and stored on the wall mounted structure space module and the preloaded additional home screen configurations stored on the wall mounted structure space module can be selected when the wall mounted structure space module is in an installer mode by interacting with the display of the wall mounted structure space module in lieu of the shown home screen configuration on the display;
the shown home screen configuration and the additional home screen configurations have a preconfigured parameter configuration layout and are downloaded to the wall mounted structure space module from a configuration tool;
a quantity of the one or more indoor environment parameters and/or setpoints that can be changed at the wall mounted structure space module is customizable by interacting with the display when in the installer mode to configure the shown home screen configuration and the additional home screen configurations and parameter types of the one or more indoor environment parameters and/or setpoints that can be changed at the wall mounted structure space module are customizable by interacting with the display when in the installer mode to configure the shown home screen configuration and the additional home screen configurations; and
the wall mounted structure space module is configured to selectively modify a parameter configuration layout of the shown home screen configuration and the additional home screen configurations of the wall mounted structure space module by interacting with the display and selectively enabling and/or disabling the display of one or more of the labels within the soft keys, one or more of the fixed segment characters and one or more of the fixed symbols when the wall mounted structure space module is in the installer mode.

* * * * *